(12) United States Patent
Ng et al.

(10) Patent No.: US 9,060,321 B2
(45) Date of Patent: Jun. 16, 2015

(54) METHODS AND APPARATUS FOR DEMODULATION REFERENCE SIGNALS AND SYNCHRONIZATION SIGNALS IN EXTENSION CARRIER OF LTE ADVANCED

(71) Applicant: Samsung Electronics Co., LTD, Suwon-si, Gyeonggi-do (KR)

(72) Inventors: Boon Loong Ng, Dallas, TX (US); Young-Han Nam, Richardson, TX (US); Jianzhong Zhang, Plano, TX (US); Jin-Kyu Han, Allen, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 248 days.

(21) Appl. No.: 13/777,565

(22) Filed: Feb. 26, 2013

(65) Prior Publication Data

US 2014/0241150 A1   Aug. 28, 2014

(51) Int. Cl.
| | |
|---|---|
| H04W 24/00 | (2009.01) |
| H04W 56/00 | (2009.01) |
| H04W 48/00 | (2009.01) |
| H04W 52/02 | (2009.01) |
| H04W 88/00 | (2009.01) |
| H04L 1/00 | (2006.01) |
| H04L 5/00 | (2006.01) |
| H04W 28/06 | (2009.01) |
| H04W 28/18 | (2009.01) |

(52) U.S. Cl.
CPC ................ H04W 48/00 (2013.01); *H04L 1/00* (2013.01); *H04L 5/00* (2013.01); *H04W 28/06* (2013.01); *H04W 28/18* (2013.01); H04W 52/02 (2013.01); H04W 56/00 (2013.01); H04W 88/00 (2013.01); *Y02B 60/50* (2013.01)

(58) Field of Classification Search
USPC ................................... 370/252, 328, 329, 503
See application file for complete search history.

(56) References Cited

U.S. PATENT DOCUMENTS

| | | | | |
|---|---|---|---|---|
| 2005/0249169 | A1* | 11/2005 | Fong | 370/338 |
| 2007/0111746 | A1* | 5/2007 | Anderson | 455/522 |
| 2008/0123616 | A1* | 5/2008 | Lee | 370/344 |
| 2012/0113938 | A1* | 5/2012 | Larsson et al. | 370/329 |
| 2012/0269066 | A1* | 10/2012 | Ng | 370/235 |
| 2013/0201975 | A1* | 8/2013 | Chen et al. | 370/336 |
| 2013/0250882 | A1* | 9/2013 | Dinan | 370/329 |
| 2013/0265945 | A1* | 10/2013 | He et al. | 370/329 |
| 2013/0301491 | A1* | 11/2013 | Bashar et al. | 370/280 |
| 2014/0233466 | A1* | 8/2014 | Pourahmadi et al. | 370/329 |
| 2014/0254504 | A1* | 9/2014 | Bashar et al. | 370/329 |
| 2014/0334400 | A1* | 11/2014 | Chen et al. | 370/329 |

* cited by examiner

*Primary Examiner* — Andrew Lee

(57) ABSTRACT

A telecommunications system is configured to perform a method for mapping synchronization signals. The method includes transmitting data, reference signals, synchronization signals and control elements to at least one of the plurality of subscriber stations. The method also includes configuring DMRS parameters to avoid a collision between the DMRS and at least one of the synchronization signals in a middle 6 resource blocks (RBs) of a system bandwidth.

20 Claims, 45 Drawing Sheets

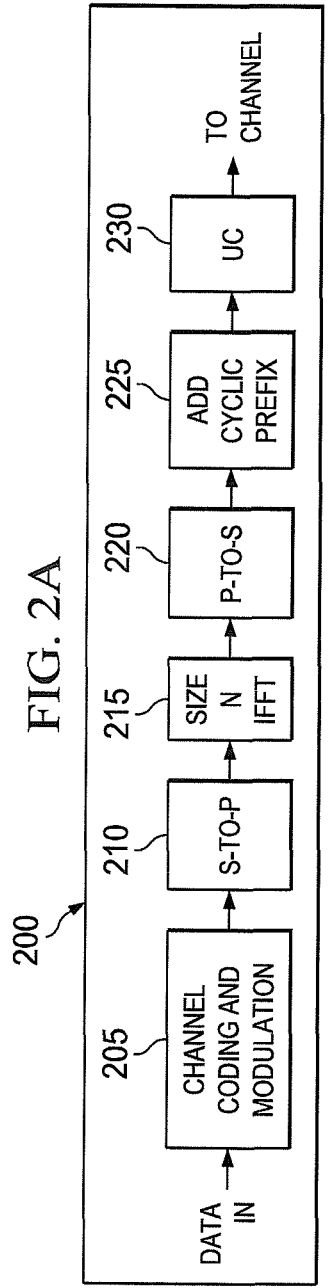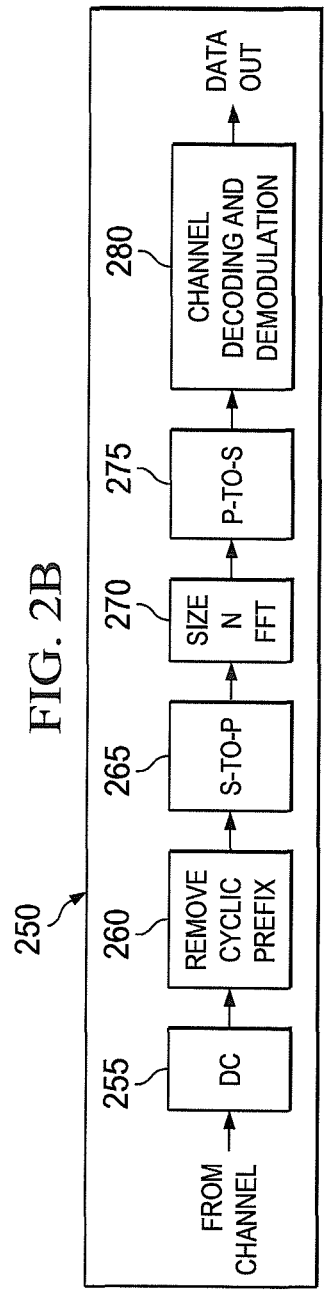

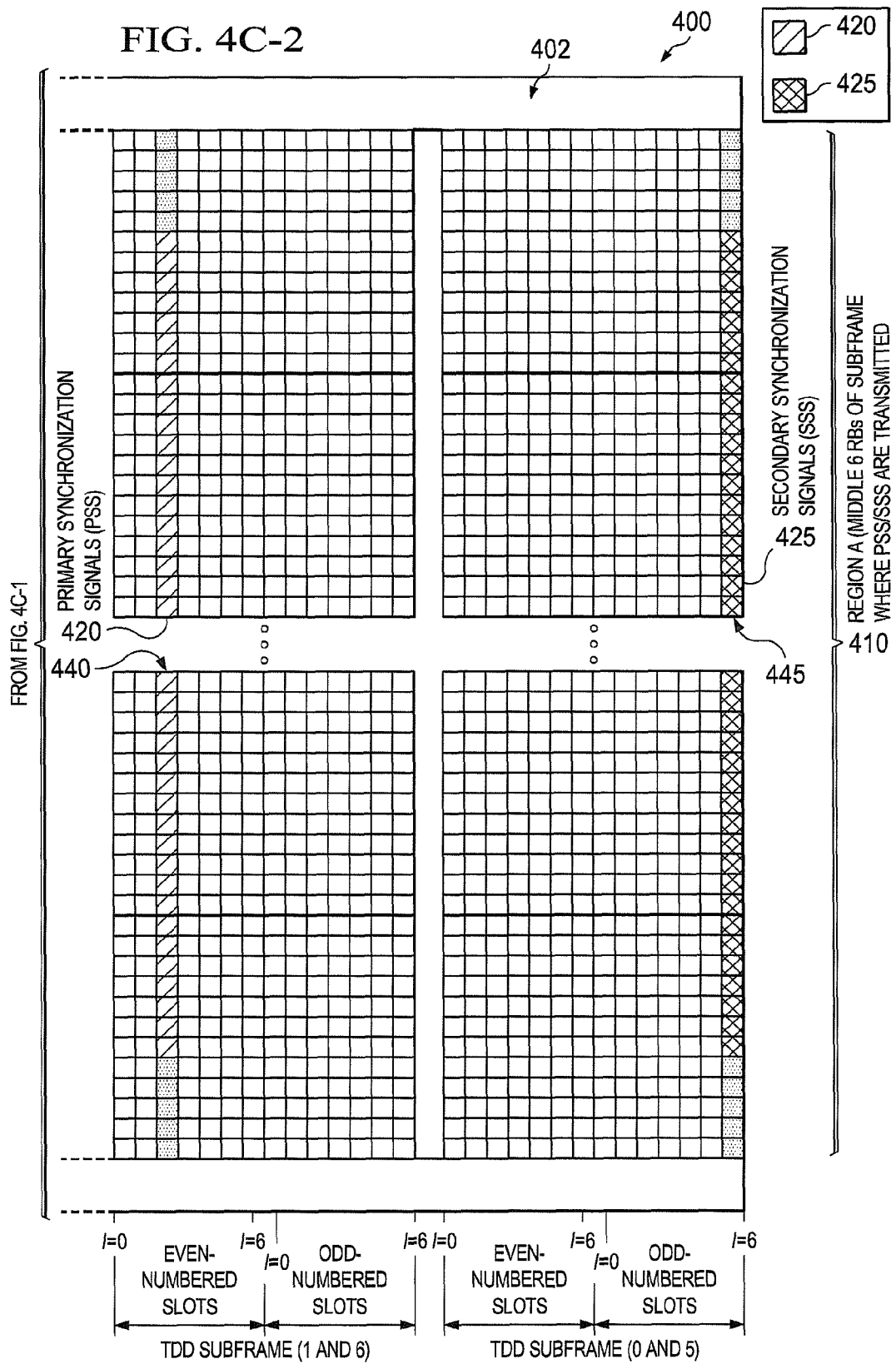

METHODS AND APPARATUS FOR DEMODULATION REFERENCE SIGNALS AND SYNCHRONIZATION SIGNALS IN EXTENSION CARRIER OF LTE ADVANCED

TECHNICAL FIELD

The present invention relates generally to wireless communication systems, and more particularly to a system and method for mitigating physical signal collisions.

BACKGROUND

In the 3GPP LTE systems, a physical resource block (PRB) pair is composed of two time slots. Rel-12 will introduce a new carrier type for improving spectral efficiency and energy efficiency by reducing or eliminating common control and reliance of legacy cell-specific reference signals by the user equipment for channel estimation for receiving the data channel. The user equipment may rely purely on the UE-specific reference signal (UE-RS) (or demodulation reference signal (DM-RS)) for channel estimation for receiving the data channel on the new carrier. A collision of UE-RS and PSS/SSS can result, causing an inability to use the center-6 PRBs for PDSCH transmissions in case they carry synchronization signals.

SUMMARY

A base station configured to communicate with a plurality of user equipments is provided. The base station includes a transmit path configured to transmit data, reference signals, synchronization signals and control elements to at least one of the plurality of subscriber stations. The base station also includes processing circuitry configured to configure demodulation reference signal (DMRS) parameters for each of a plurality of physical resource blocks to avoid a collision between the DMRS and at least one of the synchronization signals in a middle 6 resource blocks (RBs) of a system bandwidth.

A method for mapping synchronization signals is provided. The method includes transmitting data, reference signals, synchronization signals and control elements to at least one of the plurality of subscriber stations. The method also includes configuring DMRS parameters to avoid a collision between the DMRS and at least one of the synchronization signals in a middle 6 resource blocks (RBs) of a system bandwidth.

A subscriber station configured to communicate with at least one base station, which is configured to communicate with a plurality of base stations via a backhaul link, is provided. The subscriber station includes receiver configured to receive data, reference signals, synchronization signals and control elements from the base station. The subscriber station also includes processing circuitry configured to read physical resource blocks (PRBs) containing demodulation reference signals (DMRS) parameters that have been configured to avoid a collision between the DMRS and at least one of the synchronization signals in the middle 6 resource blocks (RBs) of a system bandwidth.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 2A illustrates a high-level diagram of a wireless transmit path according to an embodiment of this disclosure;

FIG. 2B illustrates a high-level diagram of a wireless receive path according to an embodiment of this disclosure;

FIGS. 4A-1 and 4A-2 illustrate a Release 10 downlink per physical resource block pair resource element map according to embodiments of the present disclosure;

FIGS. 4C-1 and 4C-2 illustrate a portion of a system bandwidth according to embodiments of the present disclosure;

DETAILED DESCRIPTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) 3GPP Technical Specification No. 36.211, version 10.3.0, "E-UTRA, Physical Channels and Modulation" (hereinafter "REF1"); (ii) 3GPP Technical Specification No. 36.212, version 10.3.0, "E-UTRA, Multiplexing and Channel Coding" (hereinafter "REF2"); (iii) 3GPP Technical Specification No. 36.213, version 10.3.0, "E-UTRA, Physical Layer Procedures" (hereinafter "REF3"); and (iv) 3GPP Technical Specification No. 36.214, version 10.3.0, "E-UTRA, Physical Layer Measurement" (hereinafter "REF4").

Figure 1:
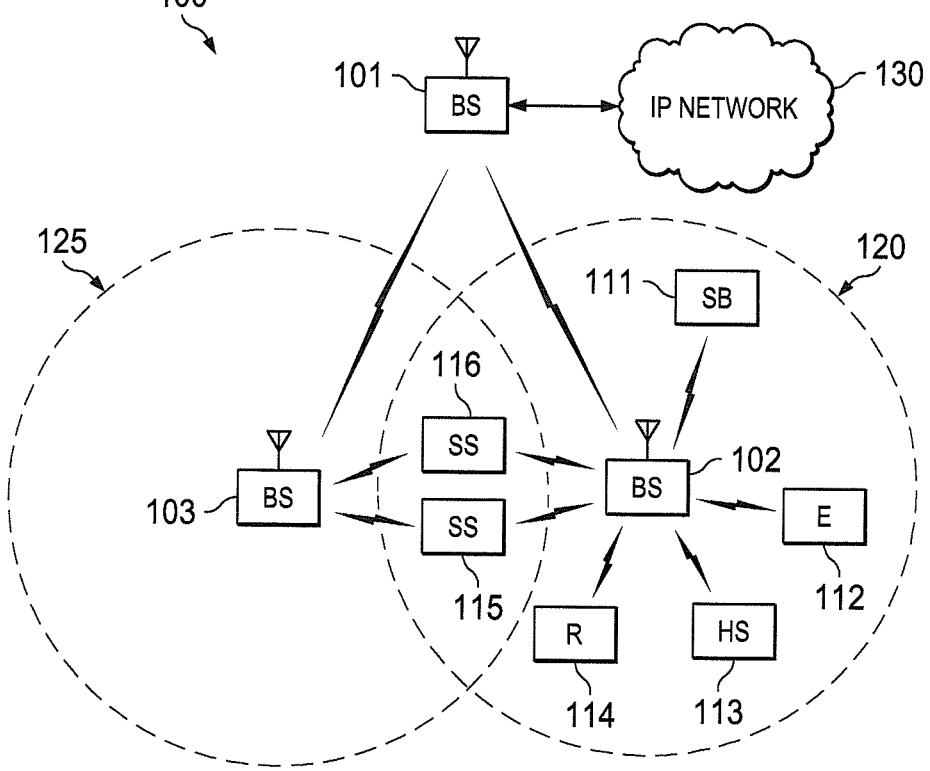
FIG. 1 illustrates a wireless network according to an embodiment of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term user equipment (UE) is used herein to refer to remote terminals that can be used by a consumer to access services via the wireless communications network. Other well know terms for the remote terminals include "mobile stations" and "subscriber stations."

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using LTE or LTE-A techniques including techniques for: mitigating collisions between demodulation reference signals (DMRS) and primary synchronization signals (PSS)/secondary synchronization signals (SSS) as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

FIG. 2A is a high-level diagram of a wireless transmit path. FIG. 2B is a high-level diagram of a wireless receive path. In FIGS. 2A and 2B, the transmit path 200 may be implemented, e.g., in eNB 102 and the receive path 250 may be implemented, e.g., in a UE, such as UE 116 of FIG. 1. It will be understood, however, that the receive path 250 could be implemented in an eNB (e.g. eNB 102 of FIG. 1) and the transmit path 200 could be implemented in a UE. In certain embodiments, transmit path 200 and receive path 250 are configured to perform methods for pilot scrambling for enhanced physical downlink control channels described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 3:
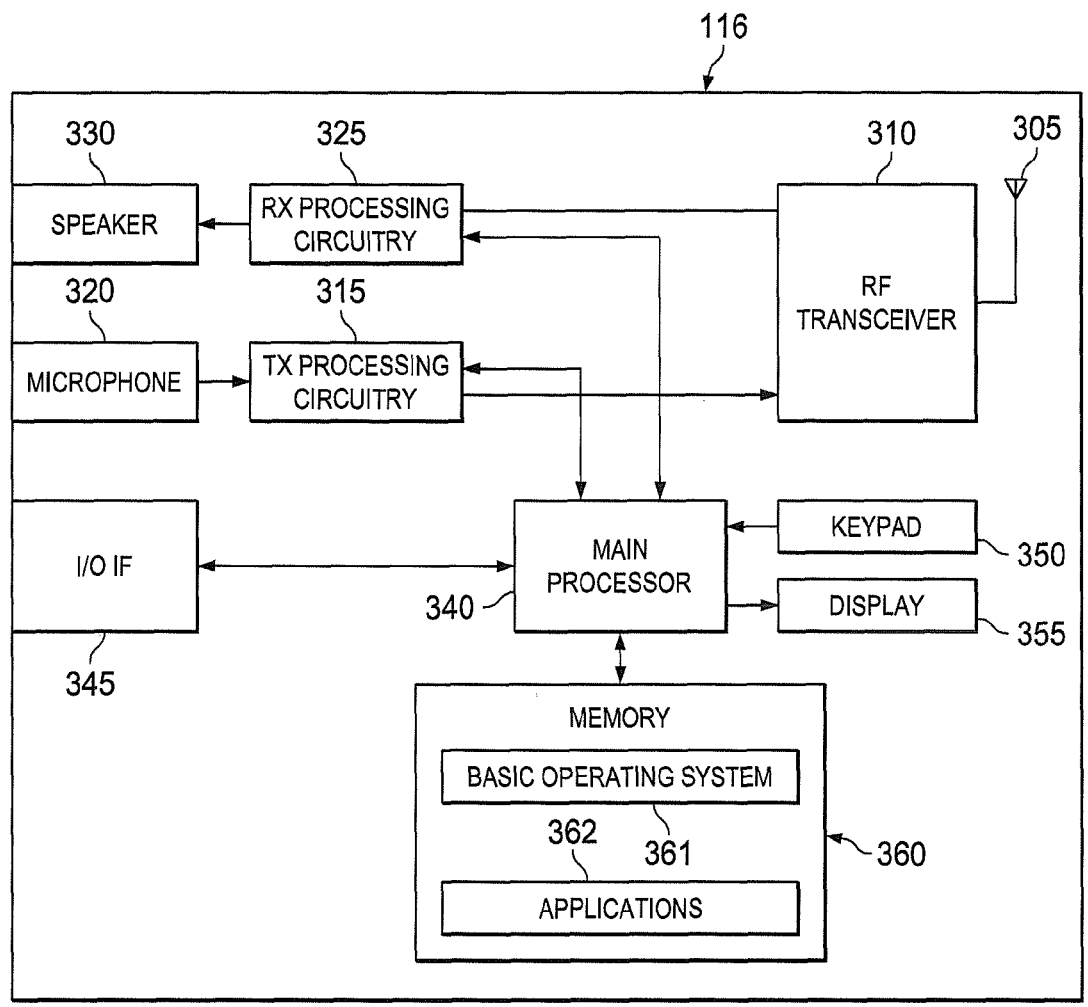
FIG. 3 illustrates a subscriber station according to an exemplary embodiment of the disclosure.

FIG. 3 illustrates a subscriber station according to embodiments of the present disclosure. The embodiment of subscribe station, such as UE 116, illustrated in FIG. 3 is for illustration only. Other embodiments of the wireless subscriber station could be used without departing from the scope of this disclosure.

UE 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for determining a new location for one or more of a DMRS or PSS/SSS as described in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Figures 1, 4A:
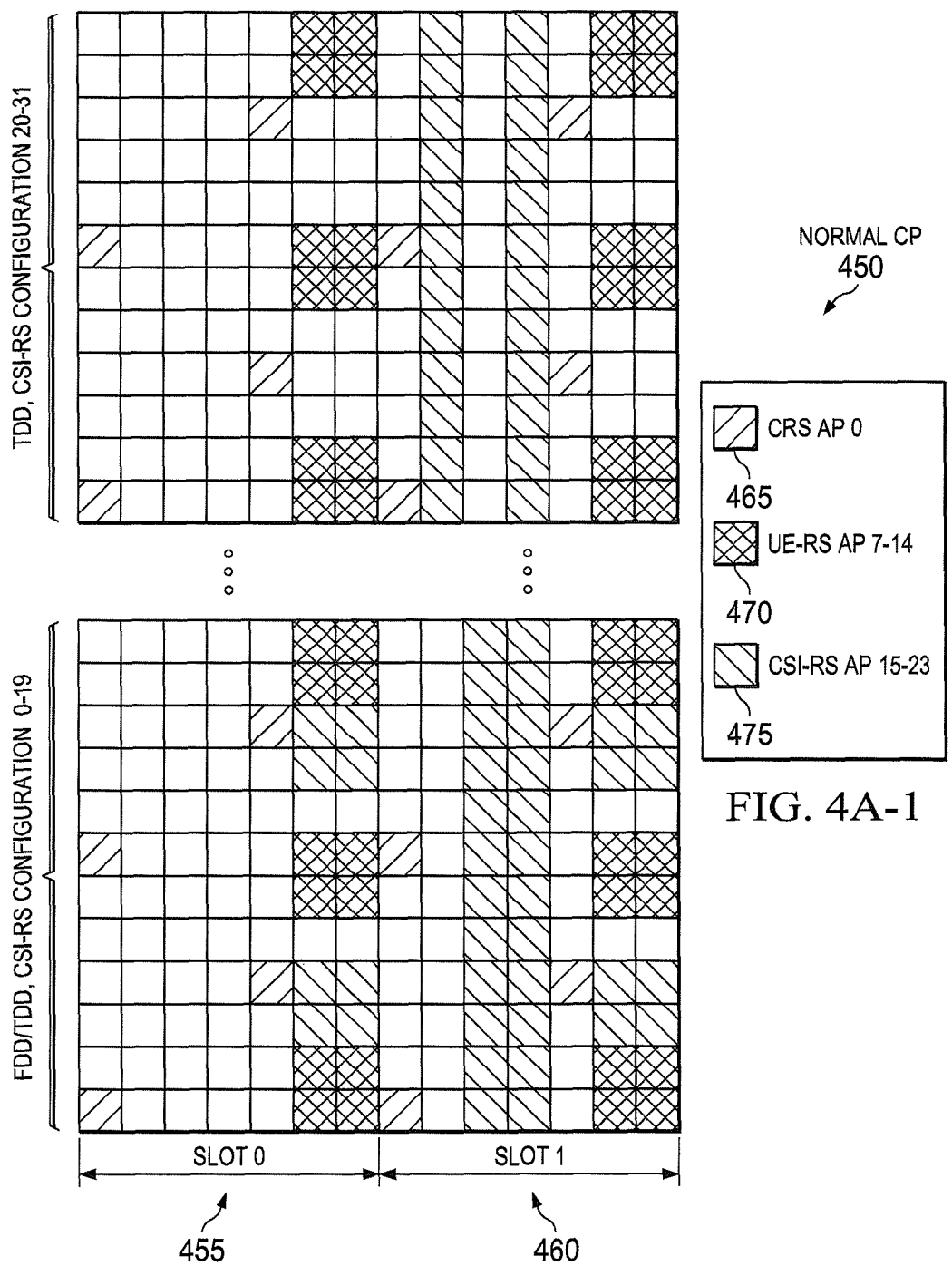
Figures 2, 4A:
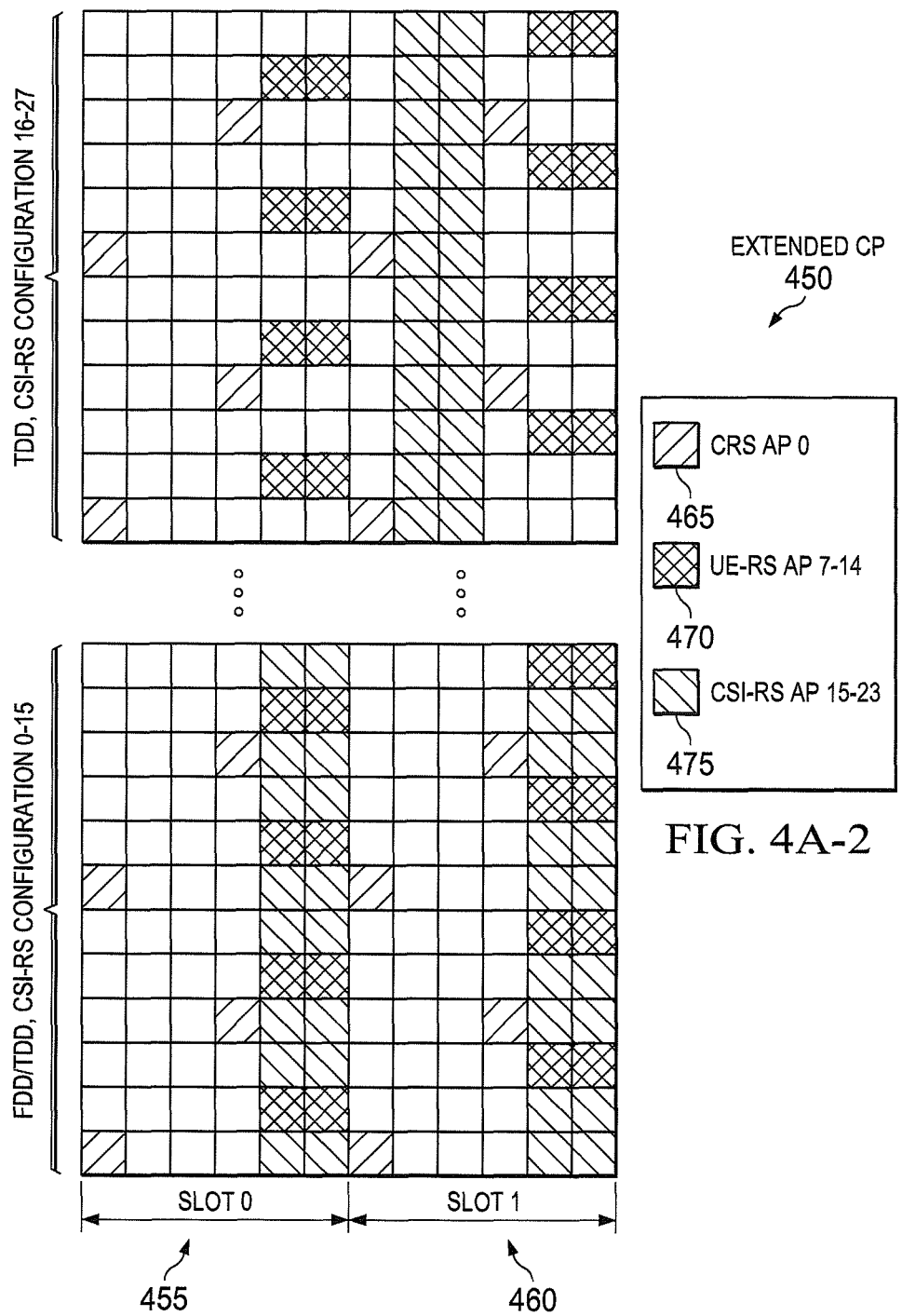

FIGS. 4A-1 and 4A-2 illustrate a 3GPP LTE Release 10 (Rel-10) downlink (DL) per-physical resource block (PRB) pair resource element (RE) map according to embodiments of the present disclosure. The embodiment of the Rel-10 DL per-PRB pair RE map 450 shown in FIGS. 4A-1 and 4A-2 is for illustration only. Other embodiments could be used without departing from the scope of this disclosure.

In the 3GPP LTE systems, a PRB pair is composed of two time slots, slot 0 455 and slot 1 465, and each slot comprises seven (7) OFDM symbols in normal-CP (cyclic prefix) subframes (shown in FIG. 4A-1) and six (6) OFDM symbols in extended-CP subframes (shown in FIG. 4A-2). FIGS. 4A-1 and 4A-2 describe CRS antenna port (AP) 0RE locations 465 and UE-specific reference signals (UE-RS) AP 7-14 RE locations 470 in normal-CP subframes and in extended-CP subframes, respectively. The REs for channel-state-information reference signals (CSI-RS) is determined by CSI reference signal configuration according to TABLE 1 for normal-CP subframes and TABLE 2 for extended-CP subframes. Each of TABLE 1 and TABLE 2 includes a first set of entries that can be used for frame structure types 1 and 2, and a second set of entries that can be used exclusively for frame structure type 2 (or time-division-duplex, TDD). For example, in TABLE 1, the entries corresponding to CSI-RS configuration number 0-19 comprise the first set; and the entries corresponding to CSI-RS configuration number 20-31 comprise the second set. Each of FIG. 4A-1 and FIG. 4A-2 separately describes the possible CSI-RS locations according to the first and the second set of entries on the left hand and the right hand side, respectively. In case of normal CP (FIG. 4A-1), the second set of entries is introduced to prevent collision between CSI-RS and AP 5. In case of extended CP (FIG. 4A-2), the second set of entries is introduced to increase number of CSI-RS reuse in the TDD system where number of DL subframes is limited.

For the CSI-RS RE mapping and subframe configuration, the following relates to mapping to resource elements.

In subframes configured for CSI reference signal, transmission, the reference signal sequence $r_{l,n_s}(m)$ shall be mapped to complex-valued modulation symbols $a_{k,l}^{(p)}$ used as reference symbols on antenna port p according to Equation 1:

$$a_{k,l}^{(p)} = w_{l''} \cdot r_{l,n_s}(m') \qquad \text{[Eqn. 1]}$$

Where:

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The quantity (k',l') and the necessary conditions on $n_s$ are given by Table 1 and Table 2 for normal and extended cyclic prefix, respectively Multiple CSI reference signal configurations can be used in a given cell. UE 116 can be configured with multiple sets of CSI reference signals:

up to three configurations for which UE 116 assumes non-zero transmission power for the CSI-RS; and zero or more configurations for which UE 116 assumes zero transmission power.

The CSI-RS configurations for which UE 116 assumes non-zero transmission power are provided by higher layers.

The CSI-RS configurations for which UE 116 assumes zero transmission power in a subframe are given by a bitmap derived according to Section 7.2.7 in 3GPP TS 36.213 v11.1.0, "E-UTRA, Physical Layer Procedures," the contents of which are hereby incorporated by reference. For each bit set to one in the 16-bit bitmap, UE 116 assumes zero transmission power for the resource elements corresponding to the four CSI reference signal column in TABLE 1 and TABLE 2 for normal and extended cyclic prefix, respectively, except for resource elements that overlap with those for which UE 116 assumes non-zero transmission power CSI-RS as configured by higher layers. The most significant bit corresponds to the lowest CSI reference signal configuration index and subsequent bits in the bitmap correspond to configurations with indices in increasing order.

CSI reference signals can only occur in:

downlink slots where $n_s$ mod 2 fulfils the condition in TABLE 1 and TABLE 2 for normal and extended cyclic prefix, respectively; and where the subframe number fulfils the conditions in Section 6.10.5.3. of 3GPP TS 36.211 v11.1.0, "E-UTRA, Physical channels and modulation, the contents of which are hereby incorporated by reference.

UE 116 assumes that CSI reference signals are not transmitted:

in the special subframe(s) in case of frame structure type 2;

in subframes where transmission of a CSI-RS would collide with transmission of synchronization signals, PBCH, or SystemInformationBlockType1 messages, in the primary cell in subframes configured for transmission of paging messages in the primary cell for any UE with the cell-specific paging configuration Resource elements (k,l) used for transmission of CSI reference signals on any of the antenna ports in the set S, where S={15}, S={15,16}, S={17,18}, S={19,20} or S={21,22} are:

not used for transmission of PDSCH on any antenna port in the same slot, and not be used for CSI reference signals on any antenna port other than those in S in the same slot.

TABLE 1

Mapping from CSI reference signal configuration to (k', l') for normal cyclic prefix.

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |

TABLE 1-continued

Mapping from CSI reference signal configuration to (k', l') for normal cyclic prefix.

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

TABLE 2

Mapping from CSI reference signal configuration to (k', l') for extended cyclic prefix.

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | 3, 1) | 1 |  |  |
|  | 22 | (8, 1) | 1 |  |  |  |  |
|  | 23 | (7, 1) | 1 |  |  |  |  |

TABLE 2-continued

Mapping from CSI reference signal configuration to (k', l') for extended cyclic prefix.

| CSI reference signal configuration | Number of CSI reference signals configured |   |   |   |   |   |
|---|---|---|---|---|---|---|
|   | 1 or 2 |   | 4 |   | 8 |   |
|   | (k', l') | $n_s$ mod 2 | (k', l') | $n_s$ mod 2 | (k', l') | $n_s$ mod 2 |
| 24 | (6, 1) | 1 | | | | |
| 25 | (2, 1) | 1 | | | | |
| 26 | (1, 1) | 1 | | | | |
| 27 | (0, 1) | 1 | | | | |

6.10.5.3 of 3GPP TS 36.211 v11.1.0, "E-UTRA, Physical channels and modulation describes CSI reference signal subframe configuration.

The subframe configuration period $T_{CSI\text{-}RS}$ and the subframe offset $\Delta_{CSI\text{-}RS}$ for the occurrence of CSI reference signals are listed in TABLE 3. The parameter $I_{CSI\text{-}RS}$ can be configured separately for CSI reference signals for which UE 116 assumes non-zero and zero transmission power. Subframes containing CSI reference signals shall satisfy Equation 2:

$$(10n_f + \lfloor n_s/2 \rfloor - \Delta_{CSI\text{-}RS}) \bmod T_{CSI\text{-}RS} \quad \text{[Eqn. 2]}.$$

TABLE 3

CSI reference signal subframe configuration.

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
|---|---|---|
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}RS}$-35 |
| 75-154 | 80 | $I_{CSI\text{-}RS}$-75 |

Rel-12 for LTE includes a new carrier type (NCT) for improving spectral efficiency and energy efficiency by reducing or eliminating) common control and overhead channels (i.e., PDCCH, PHICH, CRS APs 0-3, etc). An NCT cell is hence non-backward-compatible to the legacy LTE (non-backward compatible to Rel-11 LTE or earlier). An NCT cell can be deployed either as a secondary cell aggregated to a backward compatible primary cell or as a stand-alone cell.

Figure 4B:
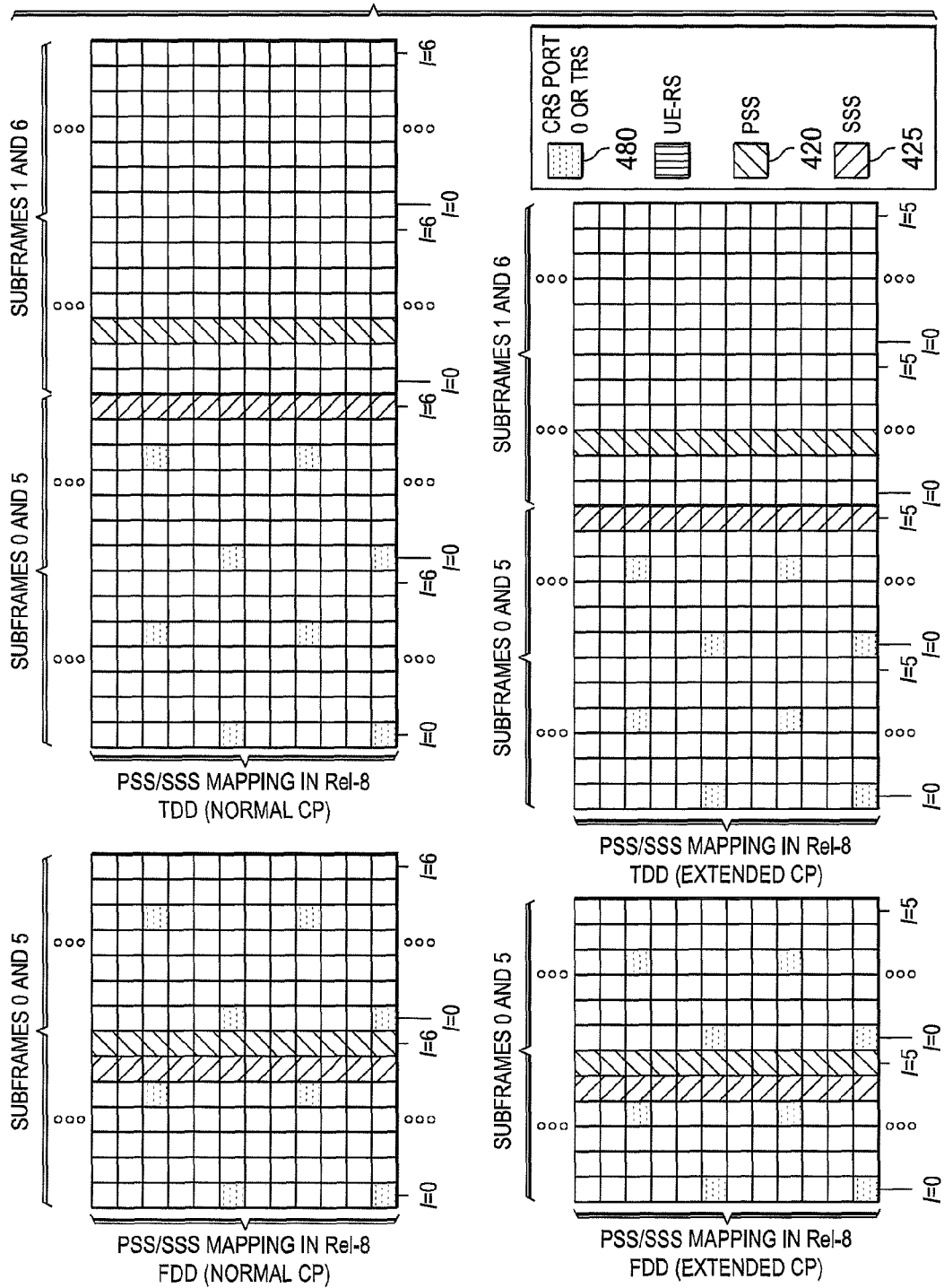
FIG. 4B illustrates a PSS/SSS mapping pattern according to embodiments of the present disclosure.

FIG. 4B illustrates a PSS/SSS mapping pattern according to embodiments of the present disclosure. The embodiment of the PSS/SSS mapping pattern shown in FIG. 4B is for illustration only. Other embodiments could be used without departing from the scope of this disclosure.

Upon removing the common overhead channels from the NOT serving cell, some issues may occur. For example, owing to collision of UE-RS and PSS/SSS, the center-6 PRBs cannot be used for PDSCH transmissions in case they carry synchronization signals. The PSS/SSS mapping shown in FIG. 4B relates to specifications of certain LTE systems. When compared to the UE-RS locations shown in FIGS. 4A-1 and 4A-2, it can be seen that the PSS/SSS collide with UE-RS in the last two OFDM symbols in the first time slot in case of FDD, and in the last OFDM symbol in the second time slot in case of TDD.

For resolving this issue, one approach proposed in certain embodiments of the present disclosure is to modify the UE-RS mapping for the NCT serving cells. In FIG. 4B, the CRS 480, PSS 420 and SSS 425 are shown for a Frequency Division Duplexing and for a Time Division Duplexing.

In certain embodiments, the new DMRS (i.e., UE-RS) pattern is configured to:

avoid collisions with PSS/SSS; and improve performance for data transmission in legacy control region (especially at high speed)

Figures 1, 4C:
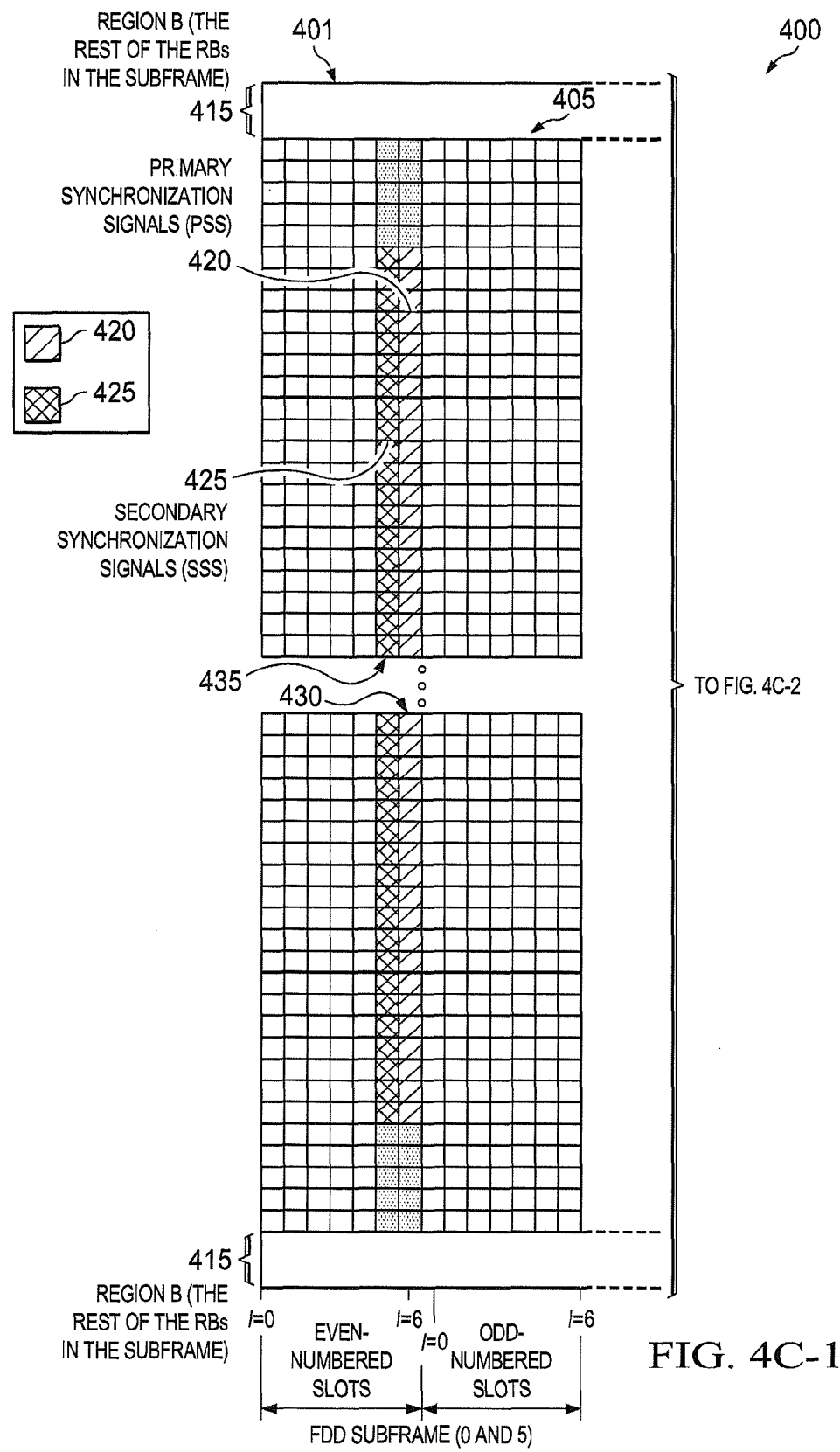

FIGS. 4C-1 and 4C-2 illustrate a portion of a system bandwidth according to embodiments of the present disclosure. The embodiment of the system bandwidth 400 shown in FIG. 4B is for illustration only. Other embodiments could be used without departing from the scope of this disclosure. In the embodiment shown in FIG. 4, the system bandwidth 400 is show for Frequency Division Duplexing (FDD) 401 and for Time Division Duplexing (TDD) 402.

The system bandwidth 400 includes a plurality of resource blocks (RBs) 405 contained within separate regions or portions. For example, a middle region, Region A 410, includes a number of RBs 405 and regions, Region B 415, include another number of RBs 405. That is, Region A 410 can include the middle six RBs 405 while each Region B 415 can include one or more RBs 405. The resource blocks in Region A 410 contain the PSS/SSS while the resource blocks in Region B 415 do not contain the PSS/SSS.

When communicating with a UE 116, eNB 102 transmits PSS/SSS in Region A 410. That is, in Region A, eNB 102 transmits the PSS 420 within a first set of RE's and the SSS 425 in a second set of RE's. In LTE Rel-8/9/10, the PSS 420 and the SSS 425 are mapped to resource grids in the following ways. For FDD 401 (frame structure type 1), the PSS 420 is mapped to the last OFDM symbol 430 of slot 0 and 10 in the middle 6 RBs (Region A 410), whereas the SSS 425 is mapped to the second last OFDM symbol 435 of slot 0 and 10 in the middle 6 RBs (Region A 410). For TDD 402 (frame structure type 2), the PSS 420 is mapped to the third OFDM symbol 440 of subframe 1 and subframe 6; whereas the SSS 425 is mapped to the last OFDM symbol 445 of slot 1 and 11 (subframe 0 and subframe 5).

LTE Rel-11 includes an extension carrier/non backward compatible carrier. This new carrier type (NCT) (e.g. extension carrier) may not transmit any Rel-8/9/10 cell-specific reference signals or Rel-8/9/10 PDCCH. For the purpose of synchronization, the NCT can transmit the Primary Synchronization Signal (PSS), the Secondary Synchronization Signals (SSS), and, in certain embodiments, a new wideband physical signal.

In LTE Rel-10, the UE 116 is configured to receive the Physical Downlink Shared Channel (PDSCH) as follows (see REF [3]):

For frame structure type 1:
- UE 116 does not expect to receive PDSCH resource blocks transmitted on antenna port 5 in any subframe in which the number of OFDM symbols for PDCCH with normal CP is equal to four;
- UE 116 does not expect to receive PDSCH resource blocks transmitted on antenna port 5, 7, 8, 9, 10, 11, 12, 13 or 14 in the two PRBs to which a pair of Virtual Resource Blocks (VRBs) is mapped if either one of the two PRBs overlaps in frequency with a transmission of either PBCH or primary or secondary synchronisation signals in the same subframe; and
- UE 116 does not expect to receive PDSCH resource blocks transmitted on antenna port 7 for which distributed VRB resource allocation is assigned.
- UE 116 can skip decoding the transport block(s) if UE 116 does not receive all assigned PDSCH resource blocks. If UE 116 skips decoding, the physical layer indicates to higher layer that the transport block(s) are not successfully decoded.

For frame structure type 2,
- UE 116 does not expect to receive PDSCH resource blocks transmitted on antenna port 5 in any subframe in which the number of OFDM symbols for PDCCH with normal CP is equal to four;
- UE 116 does not expect to receive PDSCH resource blocks transmitted on antenna port 5 in the two PRBs to which a pair of VRBs is mapped if either one of the two PRBs overlaps in frequency with a transmission of PBCH in the same subframe;
- UE 116 does not expect to receive PDSCH resource blocks transmitted on antenna port 7, 8, 9, 10, 11, 12, 13 or 14 in the two PRBs to which a pair of VRBs is mapped if either one of the two PRBs overlaps in frequency with a transmission of primary or secondary synchronisation signals in the same subframe;
- with normal CP configuration, UE 116 does not expect to receive PDSCH on antenna port 5 for which distributed VRB resource allocation is assigned in the special subframe with configuration #1 or #6;
- UE 116 does not expect to receive PDSCH on antenna port 7 for which distributed VRB resource allocation is assigned.
- UE 116 can skip decoding the transport block(s) if it does not receive all assigned PDSCH resource blocks. If UE 116 skips decoding, the physical layer indicates to higher layer that the transport block(s) are not successfully decoded.

Accordingly, for Rel-9/10/11, UE 116 is configured such that UE 116 does not expect to receive primary downlink shared channel (PDSCH) resource blocks (RBs) 405 transmitted on DMRS port 7-14 that overlap with RBs 405 used for PSS/SSS transmission in Region A 410, that is, the middle 6 RBs 405 of the system bandwidth 400. UE 116 does not expect to receive the PDSCH RBs 405 transmitted on DMRS port 7-14 due to collision between DMRS port 7-14 and PSS/SSS. However, PDSCH can still be transmitted on a common reference signal (CRS).

Therefore, UE 116 may not receive PDSCH on DMRS antenna ports 7-14 in the middle 6 Resource Blocks (RBs) in which the PSS 420 and/or SSS 425 may be transmitted. The location of PSS/SSS, the region in which UE 116 may not receive PDSCH on DMRS antenna port 7-14 is Region A 410 and the region in which UE 116 may receive PDSCH on DMRS antenna port 7-14 is Region B 415.

Since Rel-8 CRS may not be transmitted in the extension carrier, PDSCH may not be able to be received by UE 116 in Region A 410 of the NCT if DMRS pattern for Region A 410 is not defined. Embodiments of the present disclosure provide a DMRS pattern design for Region A 410 of the NCT. Embodiments of the present disclosure also provide a PSS/SSS design for the NCT. In the following embodiments, unless stated otherwise, the PSS and the SSS are assumed to be transmitted in the same location as that of Rel-8/9/10 on the NCT (e.g., the extension carrier), e.g., for FDD the last two OFDM symbols of the second slot of subframe 0 and subframe 5 in every frame.

Figure 5A:
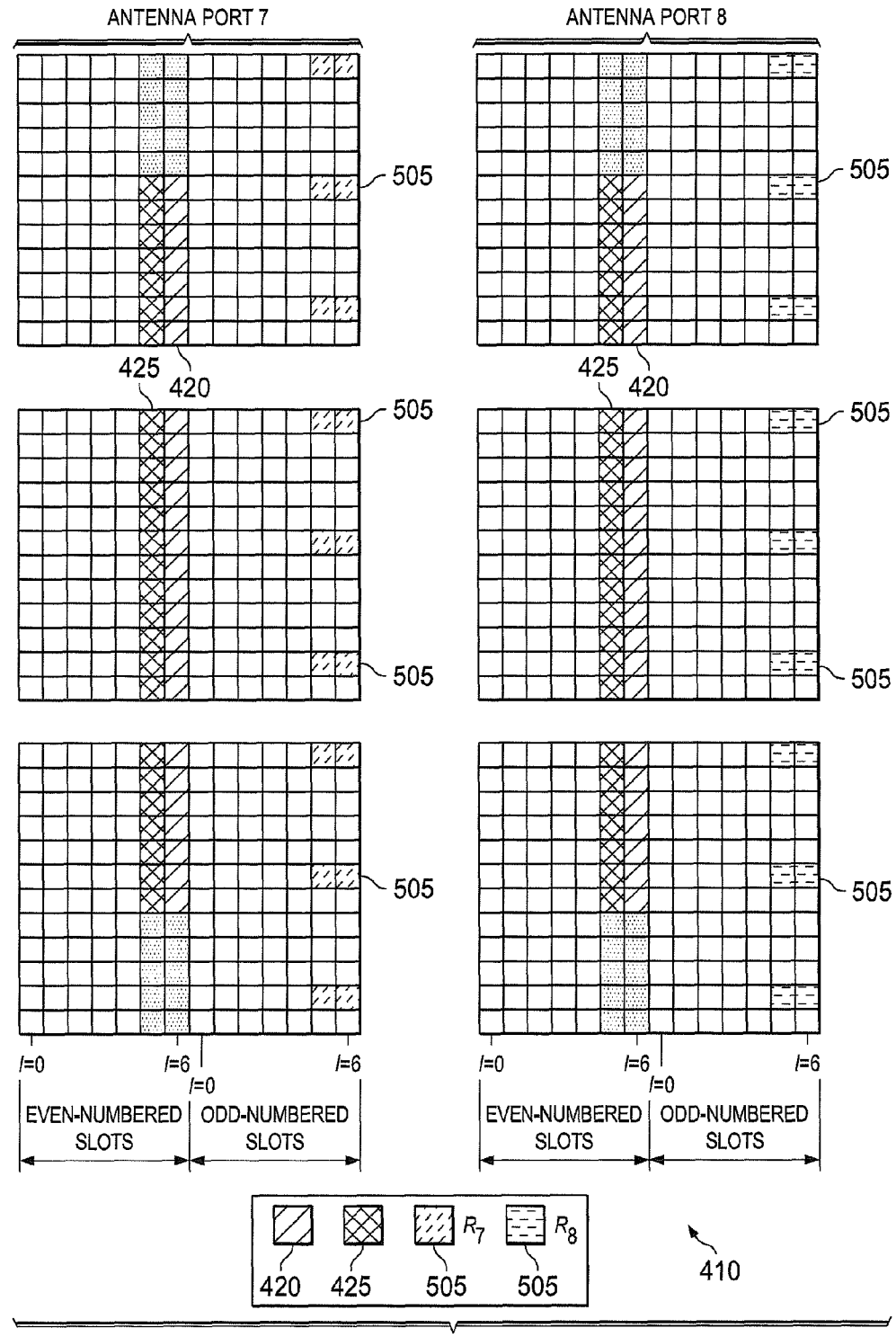
FIGS. 5A, 5B and 6 illustrate demodulation reference signal puncturing for collision avoidance according to embodiments of the present disclosure.
Figure 5B:
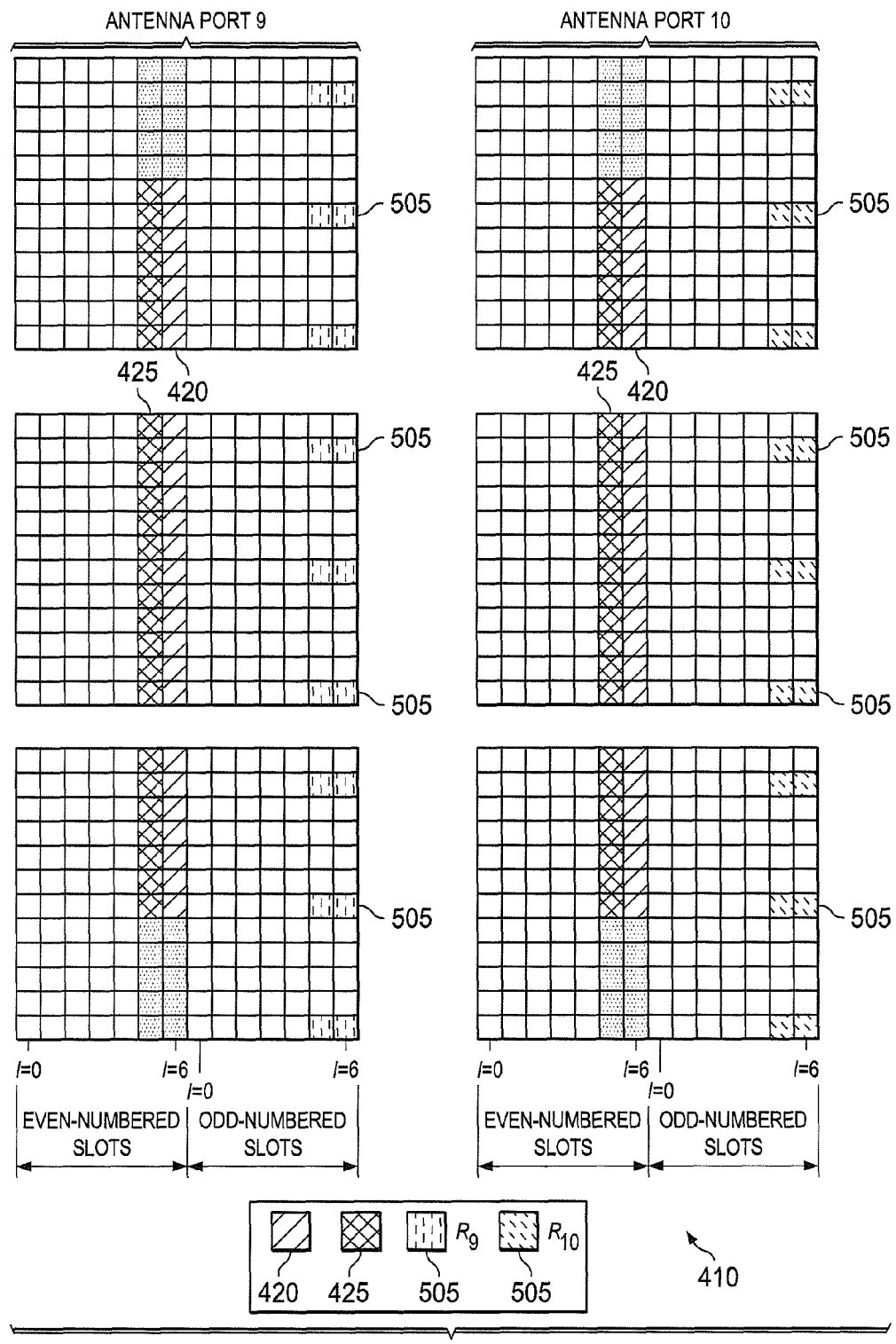
Figure 6:
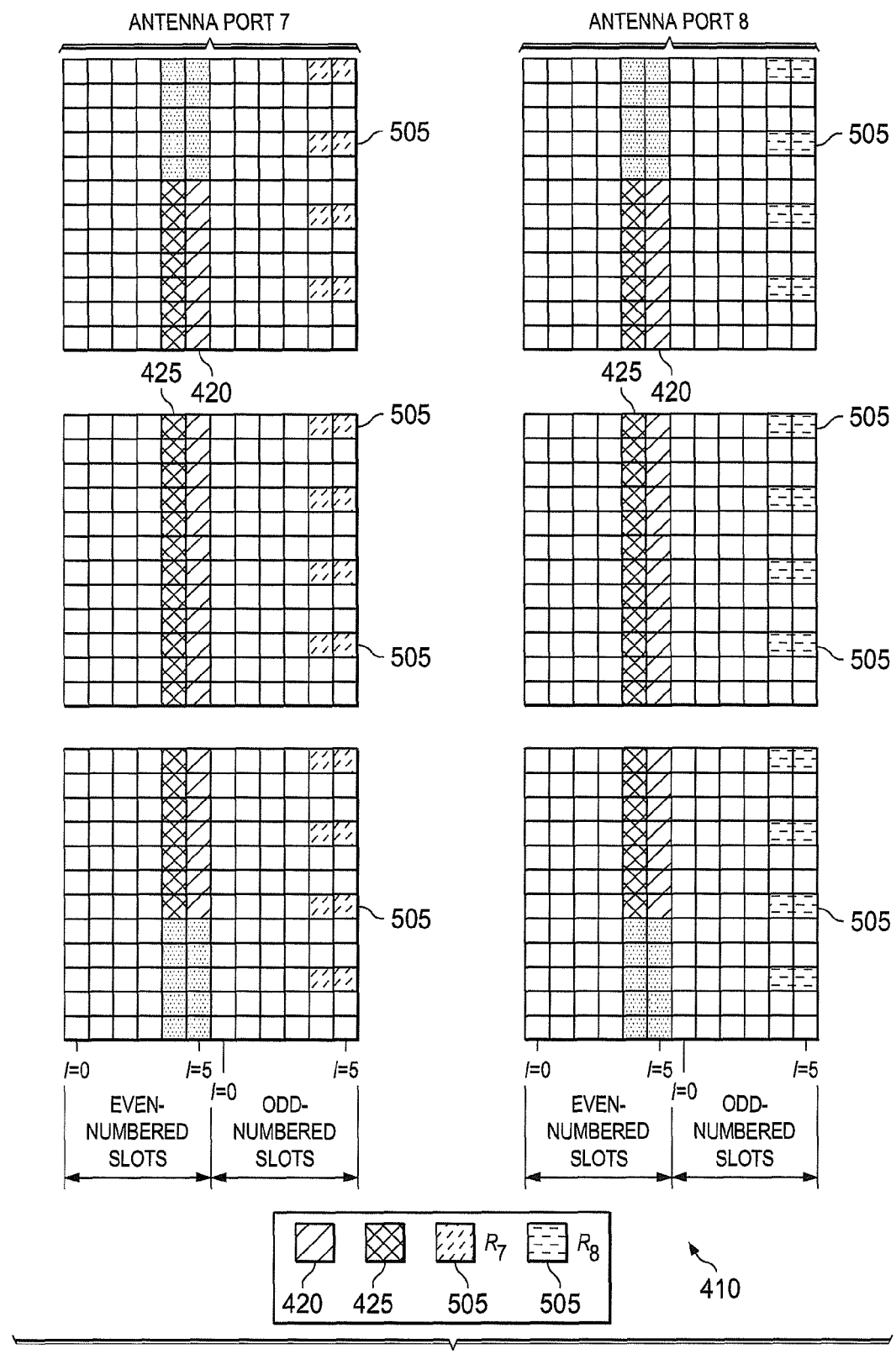

FIGS. 5A, 5B and 6 illustrate demodulation reference signal puncturing for collision avoidance according to embodiments of the present disclosure. The middle six RB's (e.g., Region A 410) are shown in FIGS. 5A and 5B. The embodiments of the Region A 410 RB's shown in FIGS. 5A and 5B are for illustration only. Other embodiments could be used without departing from the scope of this disclosure.

In certain embodiments, (referred herein as Embodiment 1—DMRS pattern), DMRSs 505 that collide with the PSS/SSS are removed. In Rel-10, DMRS 505 is not expected to be transmitted in Region A 410 (the middle six RBs of the subframes where PSS/SSS are transmitted). For those resource blocks, DMRS 505 based PDSCH transmission is not allowed and only CRS-based PDSCH transmission can is scheduled. For extension carrier/non-backward compatible carrier (e.g., NCT), since CRS may not be transmitted, the DMRS 505 based PDSCH transmission is specified in Region A 410 in order not to waste the resources not used for PSS/SSS and potentially PBCH.

Since PSS/SSS are important for synchronization purpose, the DMRS pattern for antenna port 7-14 for Region A 410 is designed such that it does not collide with the PSS/SSS. For FDD (frame structure type 1), some design alternatives that achieve the above objective are:

In a first alternative (Alt 1): The DMRS pattern is the same as that of Rel-10, except that the DMRSs 505 that collide with the PSS/SSS are removed. That is, BS 102 punctures the DMRSs 505 that collide with the PSS/SSS. UE 116 also removes the DMRSs 505 that collide with the PSS/SSS such that UE 116 does not expect to receive the DMRSs 505 in REs that collide with the PSS/SSS. For FDD, this means that the DMRSs 505 in the first slot are removed. This is illustrated in FIG. 5 for a normal CP and FIG. 6 for an extended CP. Puncturing the DMRSs 505 that collide with the PSS/SSS provides a low DMRS overhead.

Figure 7A:
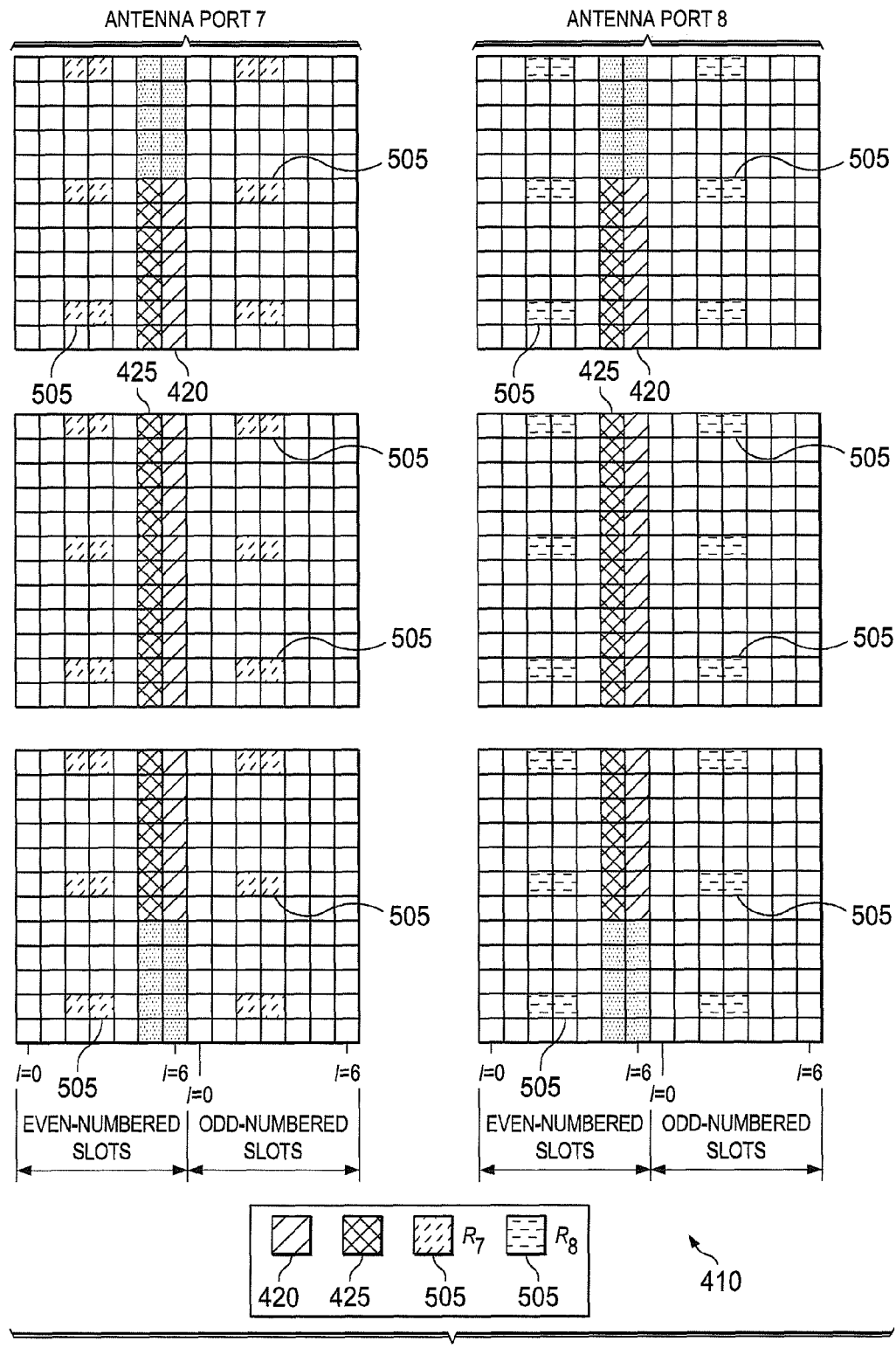
FIGS. 7A and 7B illustrate a Frequency Division Duplex demodulation reference signal reuse of a Time Division Duplex pattern for collision avoidance according to embodiments of the present disclosure.
Figure 7B:
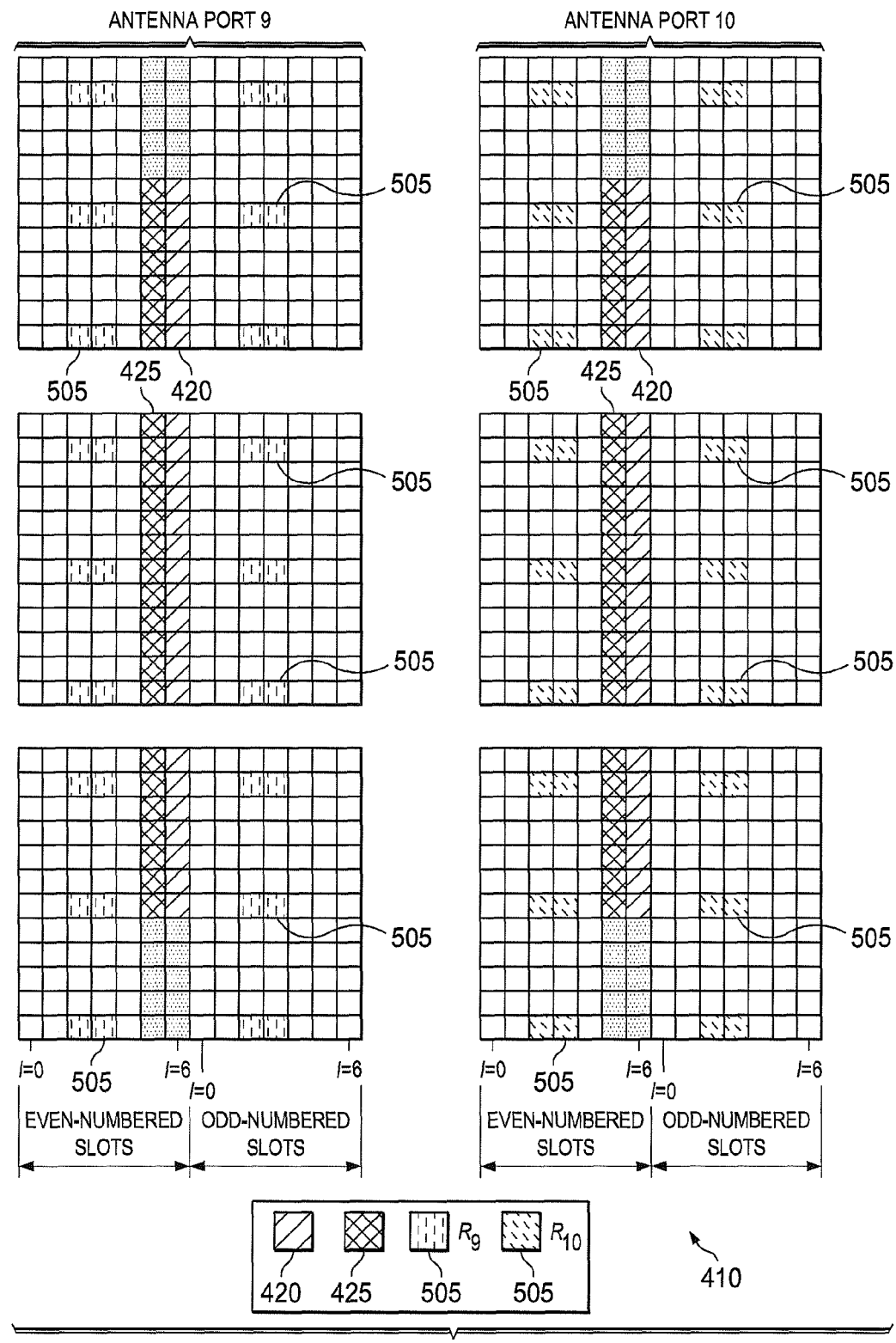

FIGS. 7A and 7B illustrate a Frequency Division Duplex demodulation reference signal reuse of a Time Division Duplex pattern for collision avoidance according to embodiments of the present disclosure. The middle six RB's (e.g., Region A 410) are shown in FIGS. 7A and 7B. The embodiments of the demodulation reference signal reuse of a Time Division Duplex pattern shown in FIGS. 7A and 7B are for illustration only. Other embodiments could be used without departing from the scope of this disclosure.

In a second alternative (Alt 2), the DMRS pattern is the same as that used for TDD subframe configuration 3, 4 and 8. This is illustrated in FIGS. 7A and 7B for a normal CP. By reusing an existing TDD DMRS pattern, a new DMRS pattern is not required to be designed or configured. Additionally, reusing the existing TDD DMRS pattern offers better channel estimation performance than puncturing the DMRSs 505 (Alt 1) at the expense of higher DMRS overhead.

Figure 8A:
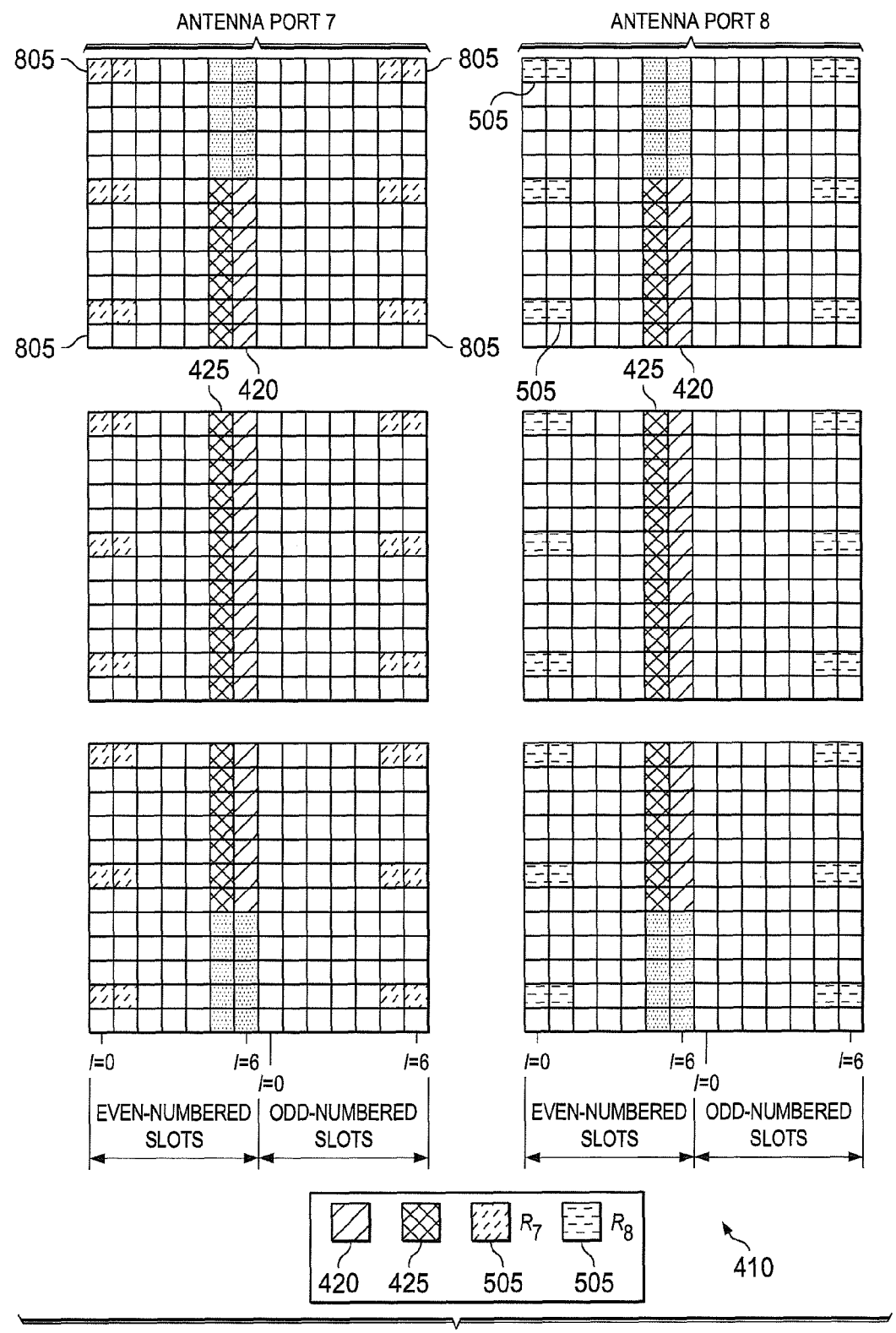
FIGS. 8A, 8B and 9 illustrate a new demodulation reference signal for a Frequency Division Duplex demodulation reference signal for collision avoidance according to embodiments of the present disclosure.
Figure 8B:
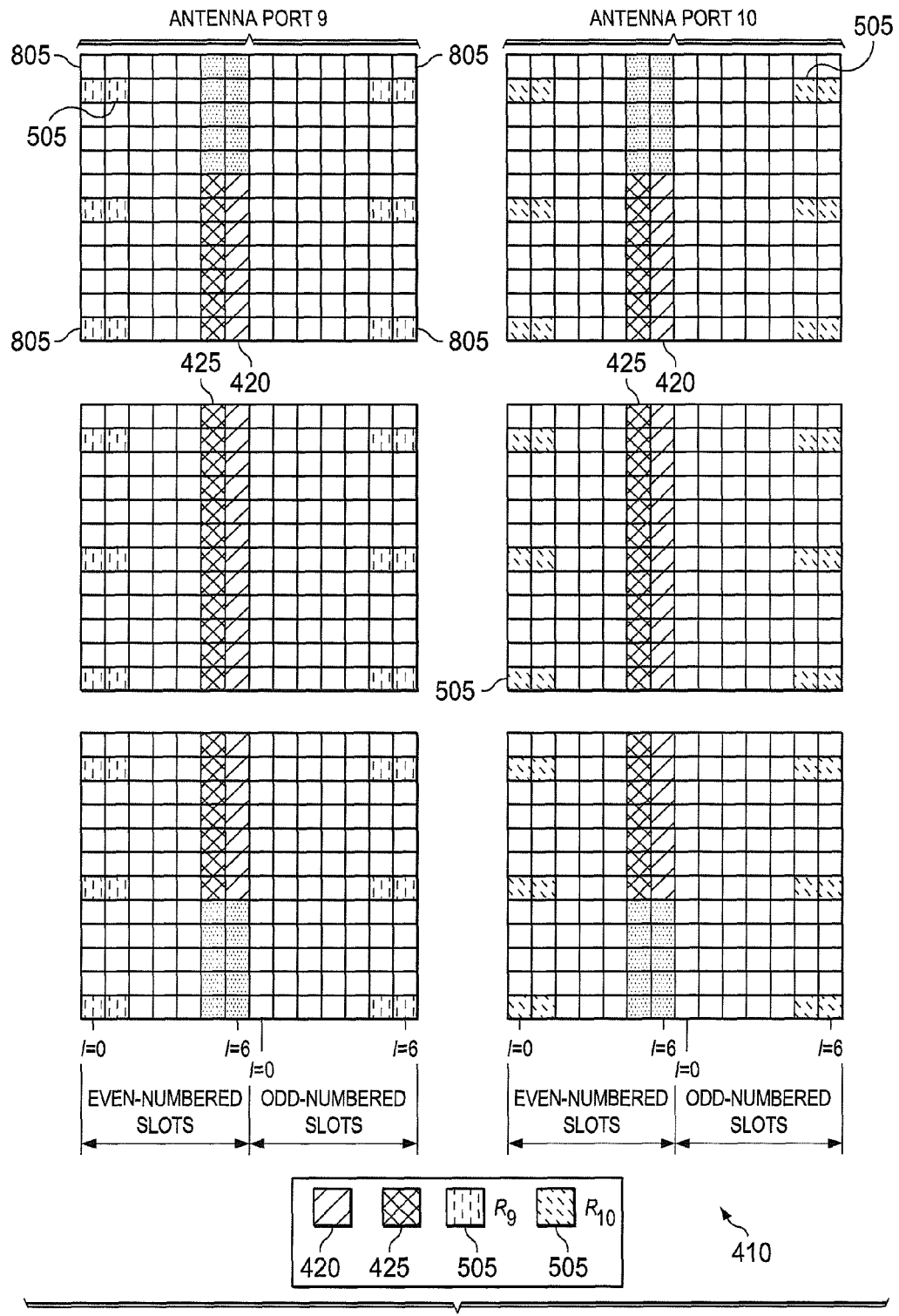
Figure 9:
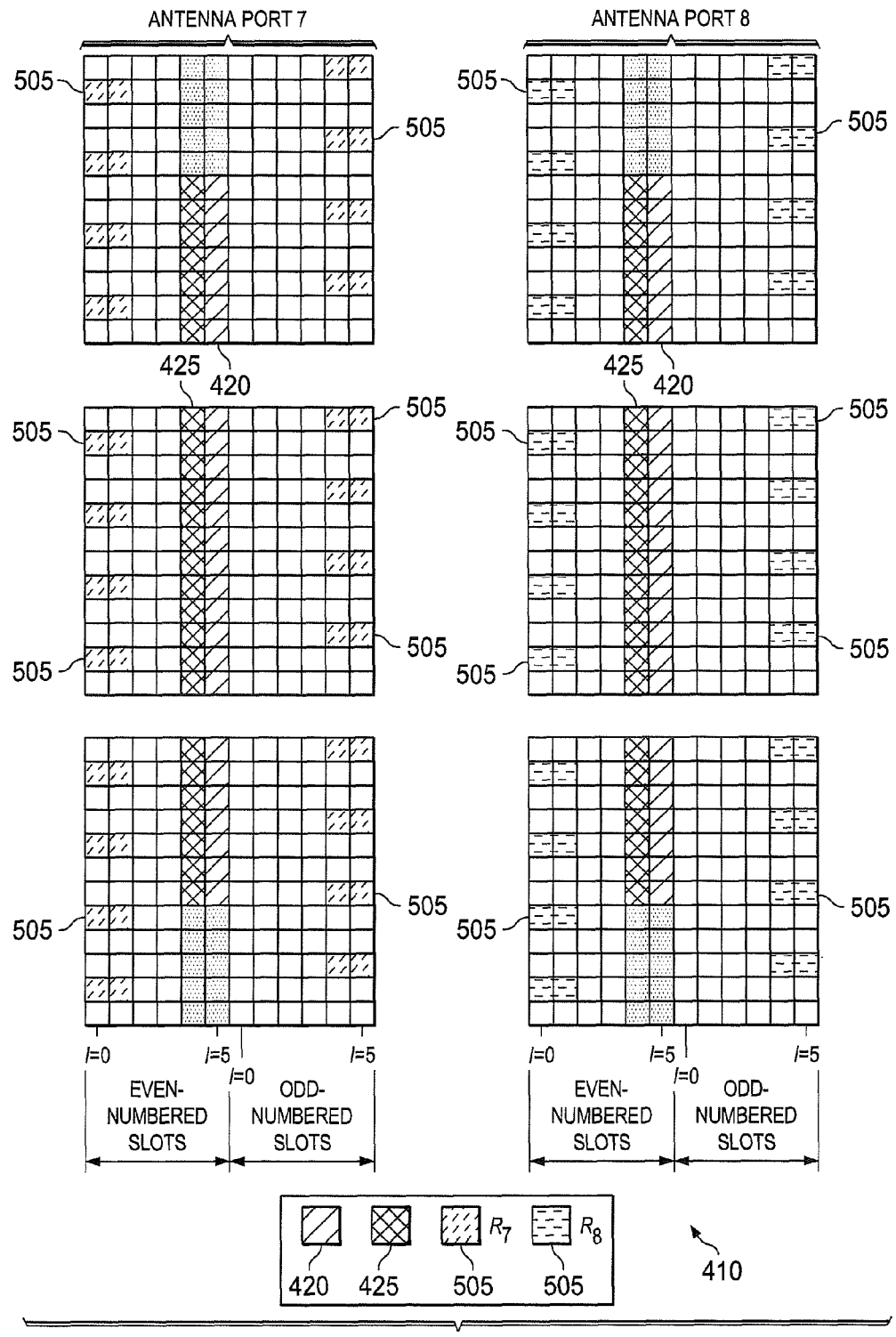

FIGS. 8A, 8B and 9 illustrate a new demodulation reference signal for a Frequency Division Duplex demodulation reference signal for collision avoidance according to embodiments of the present disclosure. The middle six RB's (e.g., Region A 410) is shown in FIGS. 8A, 8B and 9. The embodiments of the new demodulation reference signal shown in FIGS. 8A, 8B and 9 are for illustration only. Other embodiments could be used without departing from the scope of this disclosure.

In a third alternative (Alt 3), the DMRS 505 that collides with the PSS/SSS are shifted to avoid the collision. An example is shown in FIGS. 8A, 8B for normal CP and FIG. 9 for extended CP. Shifting the DMRS 505 can provide the best channel estimation performance, as the DMRS 505 is transmitted from REs close to the four corners 805 of each PRB. In certain embodiments, if tracking signal based on CRS port 0 or/and 1 also exists in the same subframe, BS 102 is configured to adjust the DMRS 505 to avoid collision with the tracking signals. UE 116 also is configured to receive a DMRS 505 that has been adjusted to avoid collision with the tracking signals.

FIGS. 10A, 10B, 11A, 11B, 12A, 12B, 13A, 13B, 14 and 15 illustrate a Time Division Duplex demodulation reference signal in subframes with a primary synchronization signal for collision avoidance according to embodiments of the present disclosure. The middle six RB's (e.g., Region A 410) is shown in FIGS. 10A, 10B, 11A, 11B, 12A, 12B, 13A, 13B, 14 and 15. The embodiments of the new demodulation reference signal shown in FIGS. 10A, 10B, 11A, 11B, 12A, 12B, 13A, 13B, 14 and 15 are for illustration only. Other embodiments could be used without departing from the scope of this disclosure.

Figure 10A:
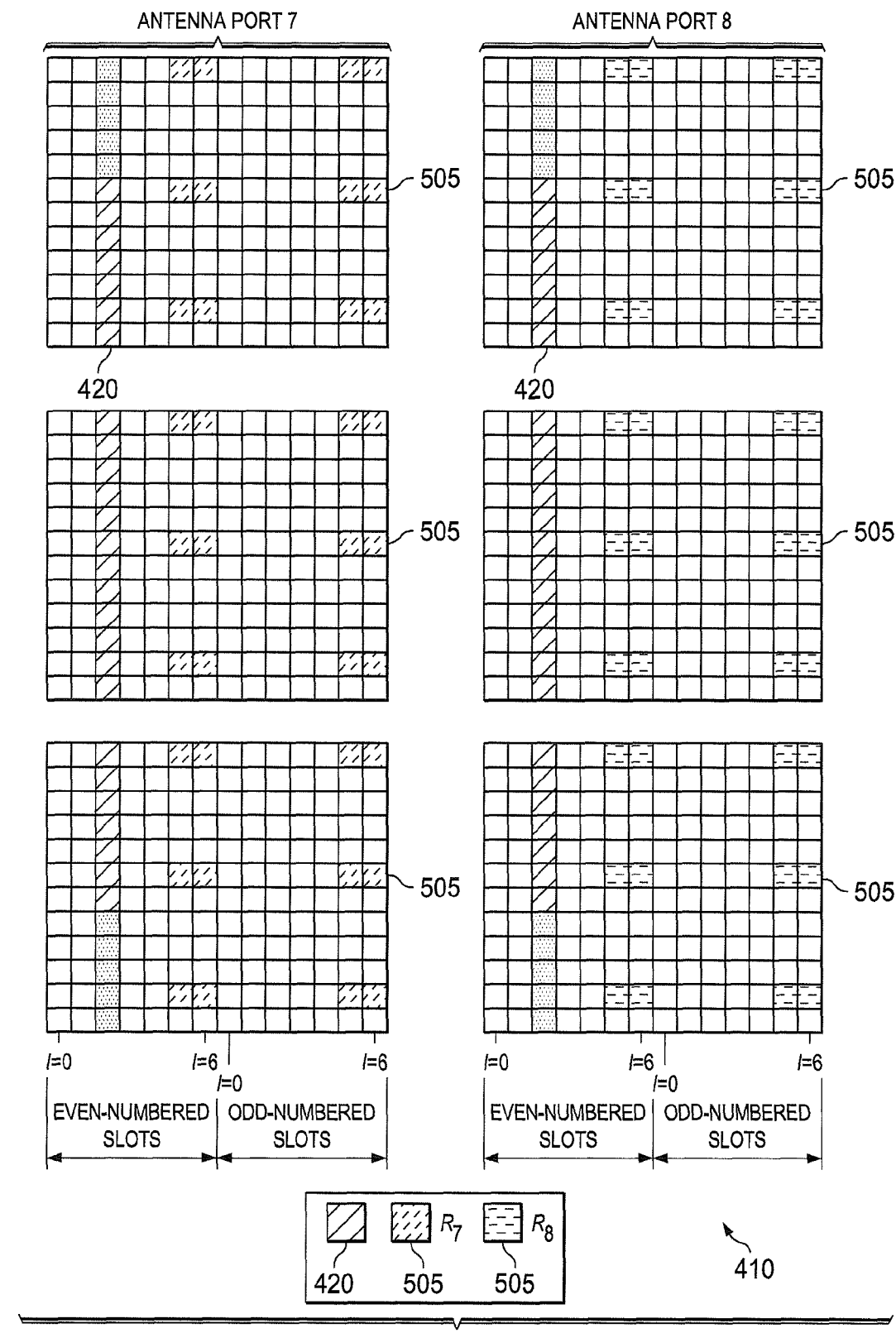
FIGS. 10A, 10B, 11A, 11B, 12A, 12B, 13A, 13B, 14 and 15 illustrate a Time Division Duplex demodulation reference signal in subframes with a primary synchronization signal for collision avoidance according to embodiments of the present disclosure.
Figure 10B:
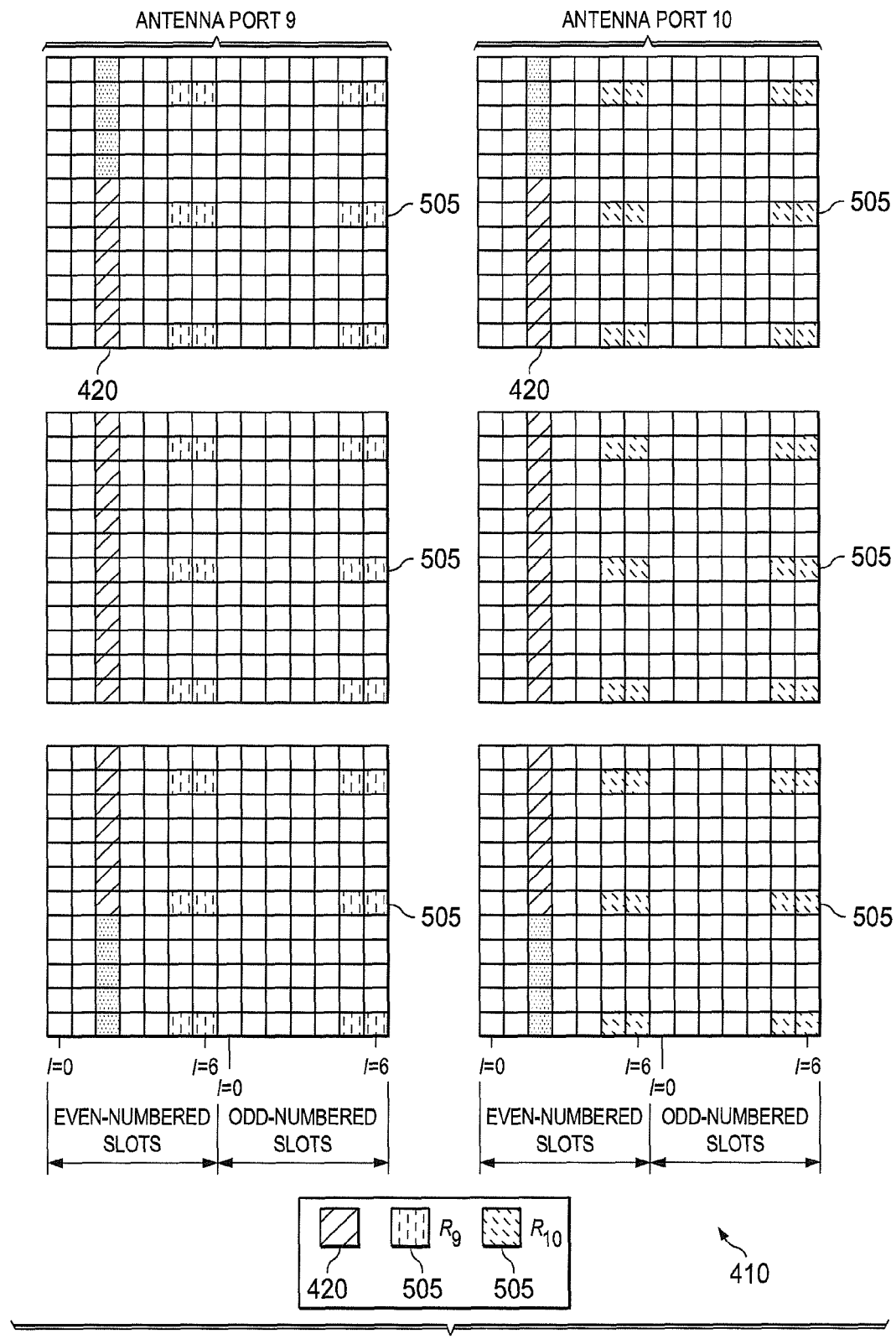

For TDD (frame structure type 2), the Rel-10 DMRS 505 can be reused in subframes with PSS where the subframe is a normal subframe (subframe 6 for UL-DL configuration 3, 4, and 5) since they don't collide with PSS. This is shown in FIGS. 10A and 10B for normal CP and FIG. 14 for an extended CP.

If the subframe with PSS is a special subframe (subframe 1 for all UL-DL configurations and subframe 6 for UL-DL configuration 0, 1, 2 and 6), and the CP length is normal CP, the Rel-10 DMRS 505 collides with the PSS. The BS 102 and UE 116 are configured to utilize one or more of the following design alternatives.

Figure 11A:
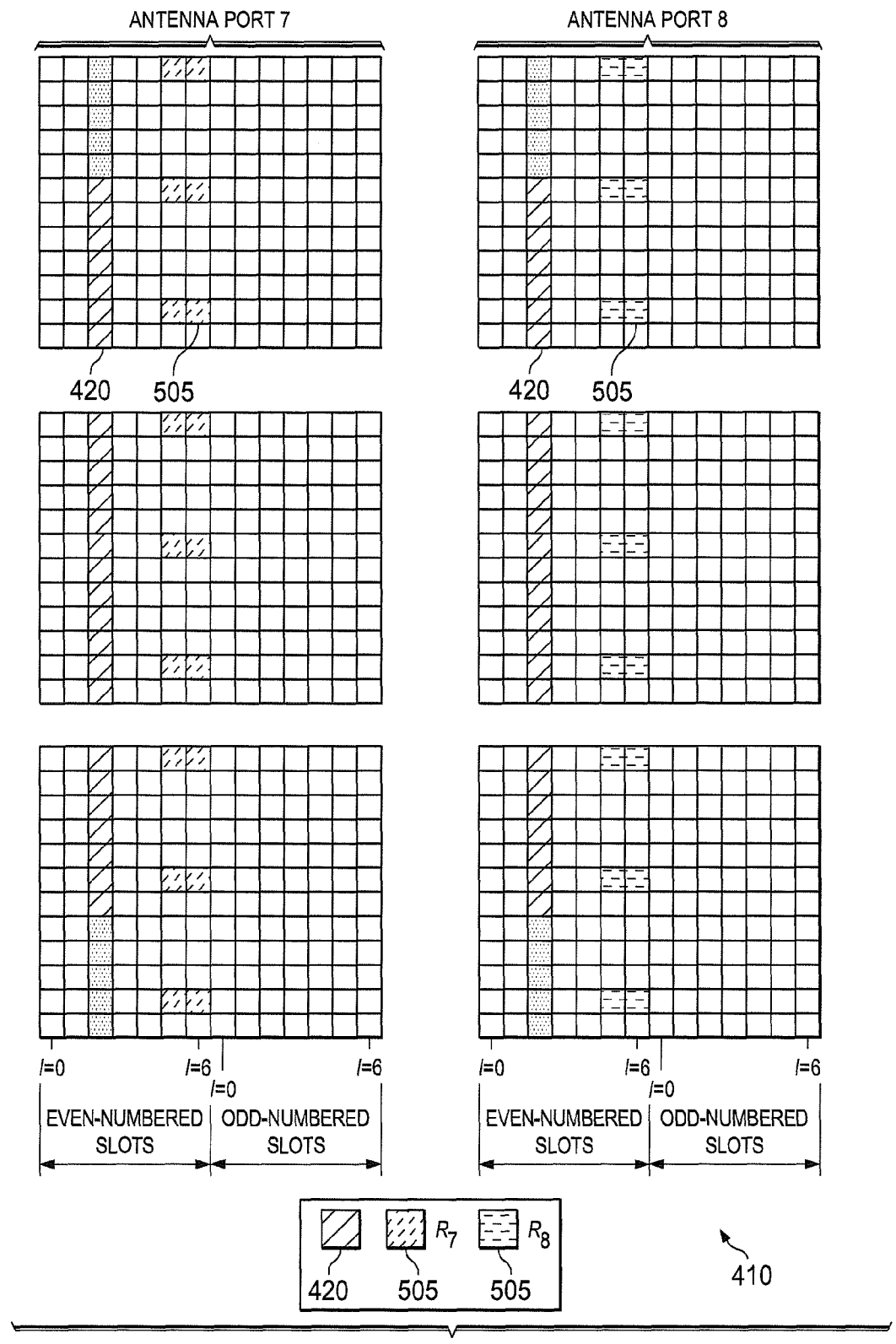
Figure 11B:
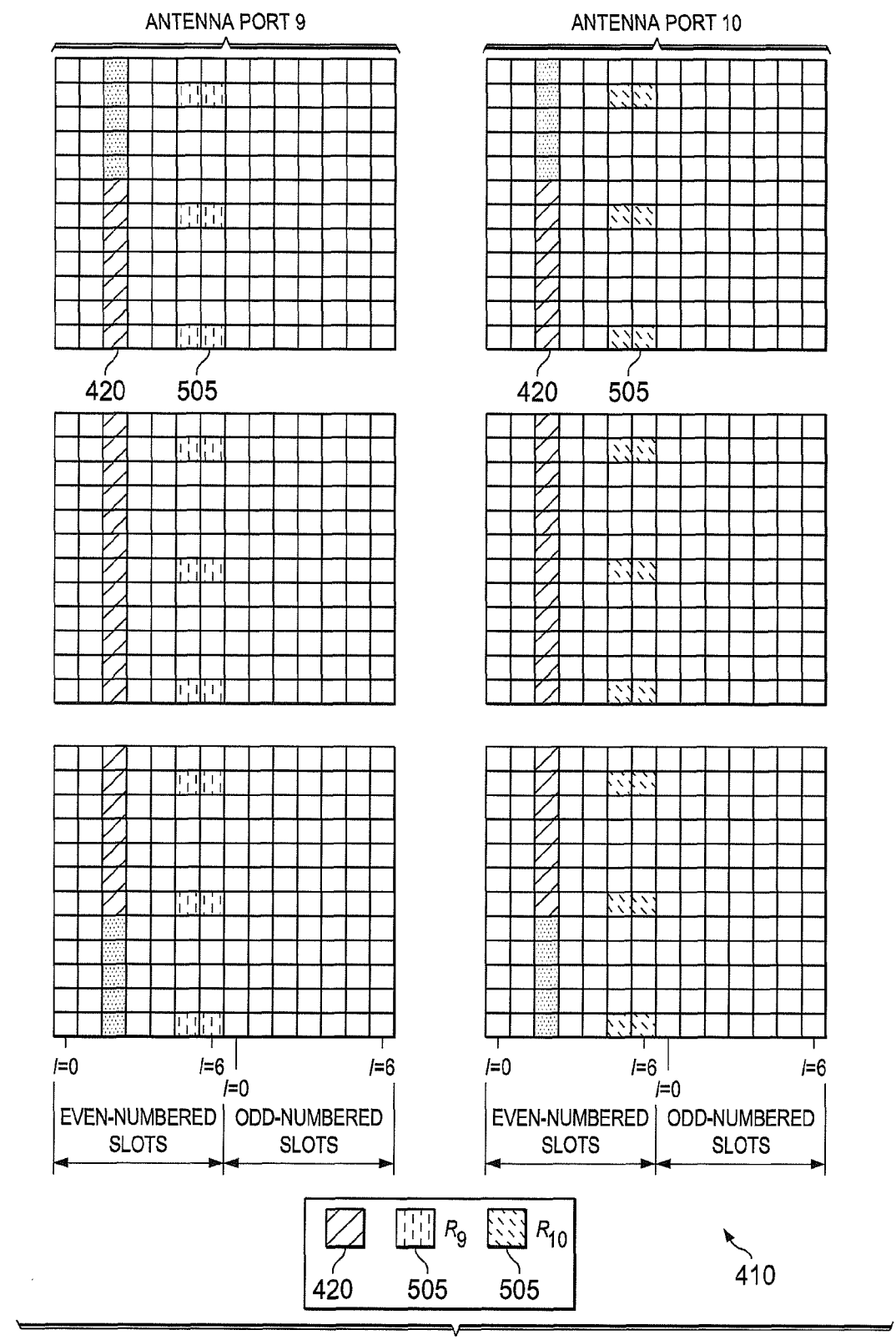
Figure 12A:
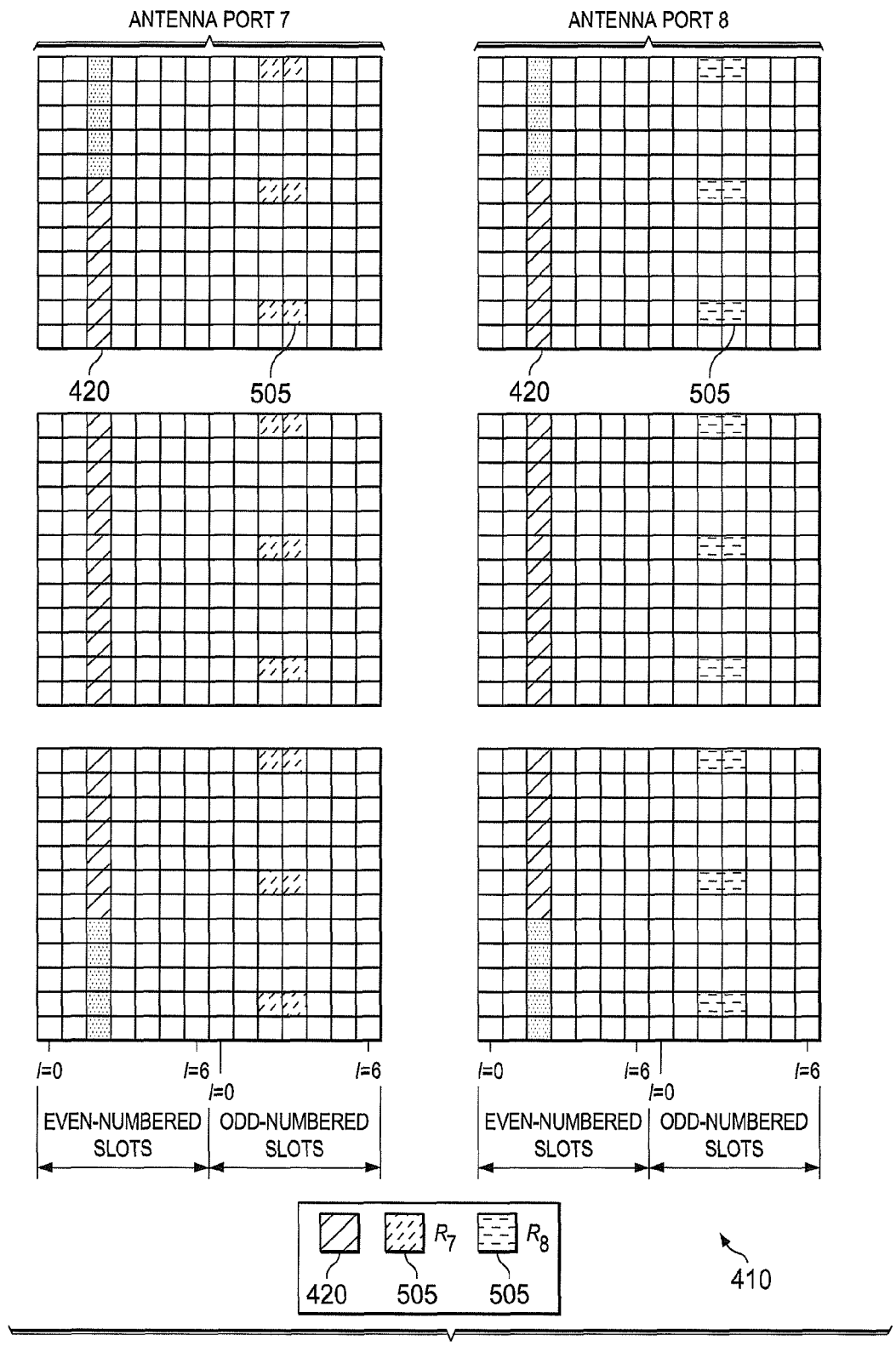
Figure 12B:
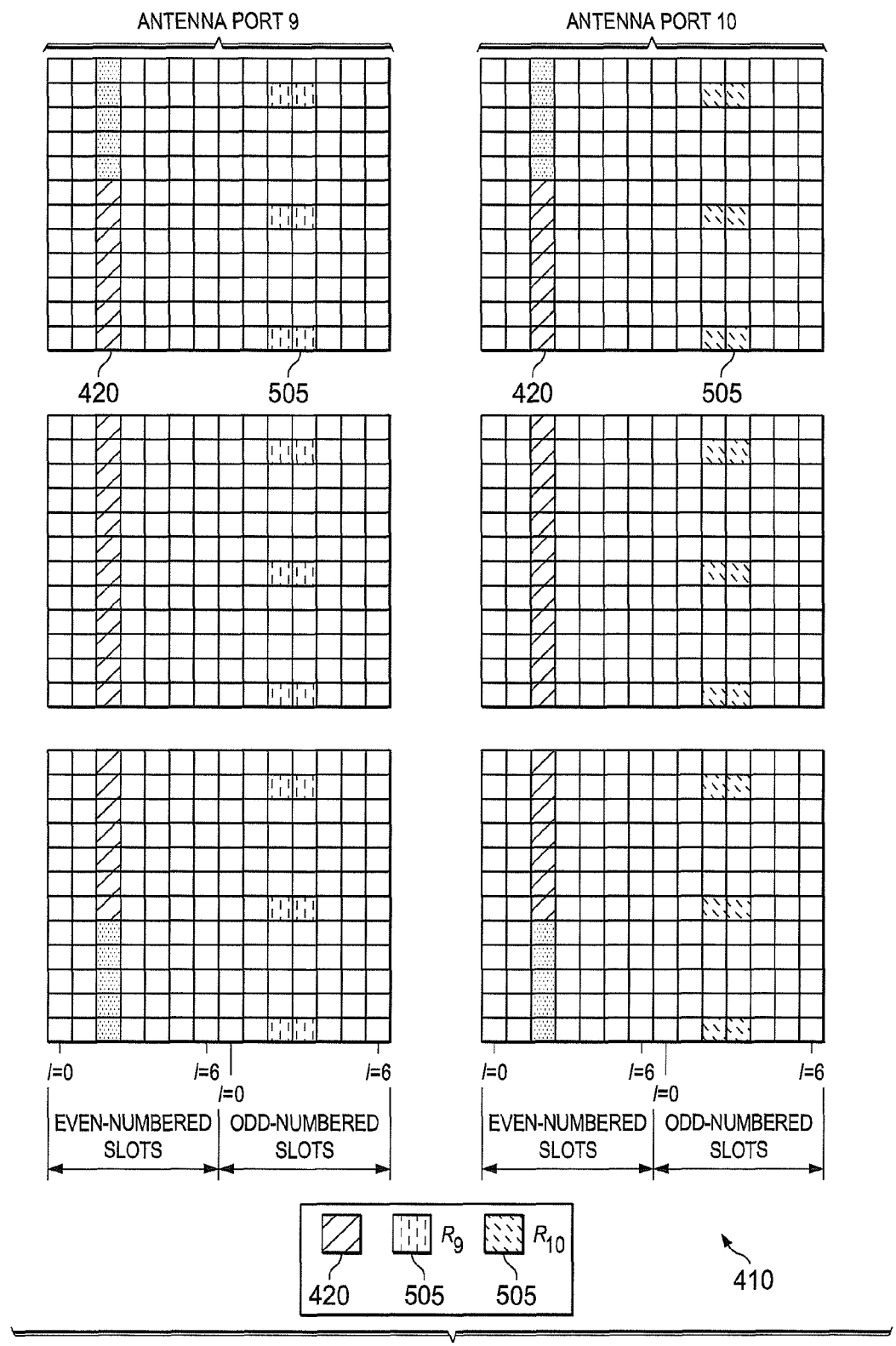

In a first alternative (Alt 1-TDD), the DMRS pattern is the same as that of Rel-10, except that the DMRSs 505 that collide with the PSS 420 are removed. That is, BS 102 punctures the DMRSs 505 that collide with the PSS 420. UE 116 also removes the DMRSs 505 that collide with the PSS 420 such that UE 116 does not expect to receive the DMRSs 505 in REs that collide with the PSS 420. This is illustrated in FIGS. 11A and 11B for a normal CP and FIGS. 12A and 12B for an extended CP. FIGS. 11A and 11B illustrate Alt 1-TDD, DMRS 505 for subframes with PSS (Special subframe configuration 1, 2, 6 or 7) (Normal CP). FIGS. 12A and 12B illustrate Alt 1-TDD, DMRS 505 for subframes with PSS (Special subframe configuration 3, 4, or 8) (Normal CP). Puncturing the DMRSs 505 that collide with the PSS 420 provides a low DMRS 505 overhead.

Figure 13A:
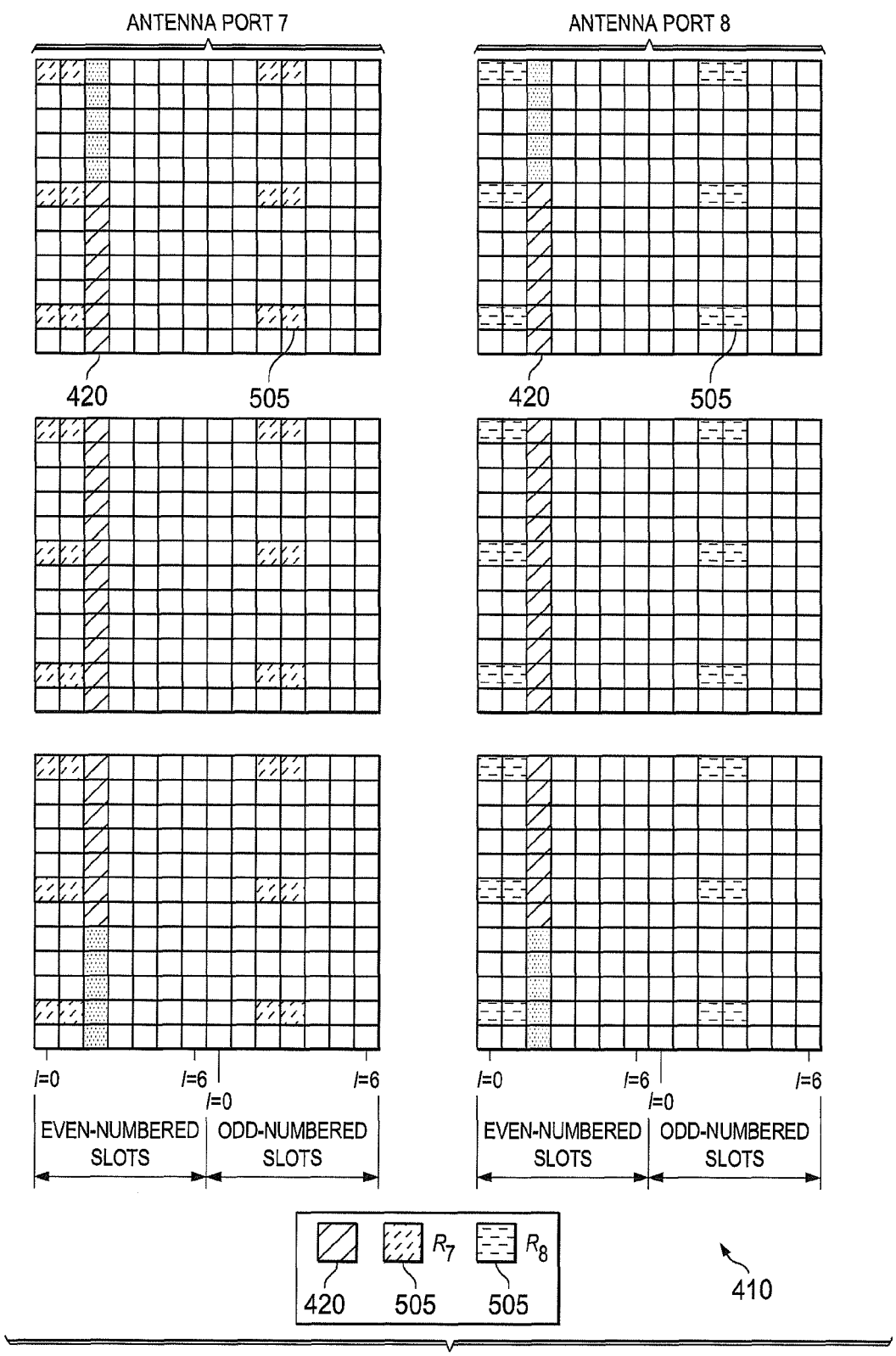
Figure 13B:
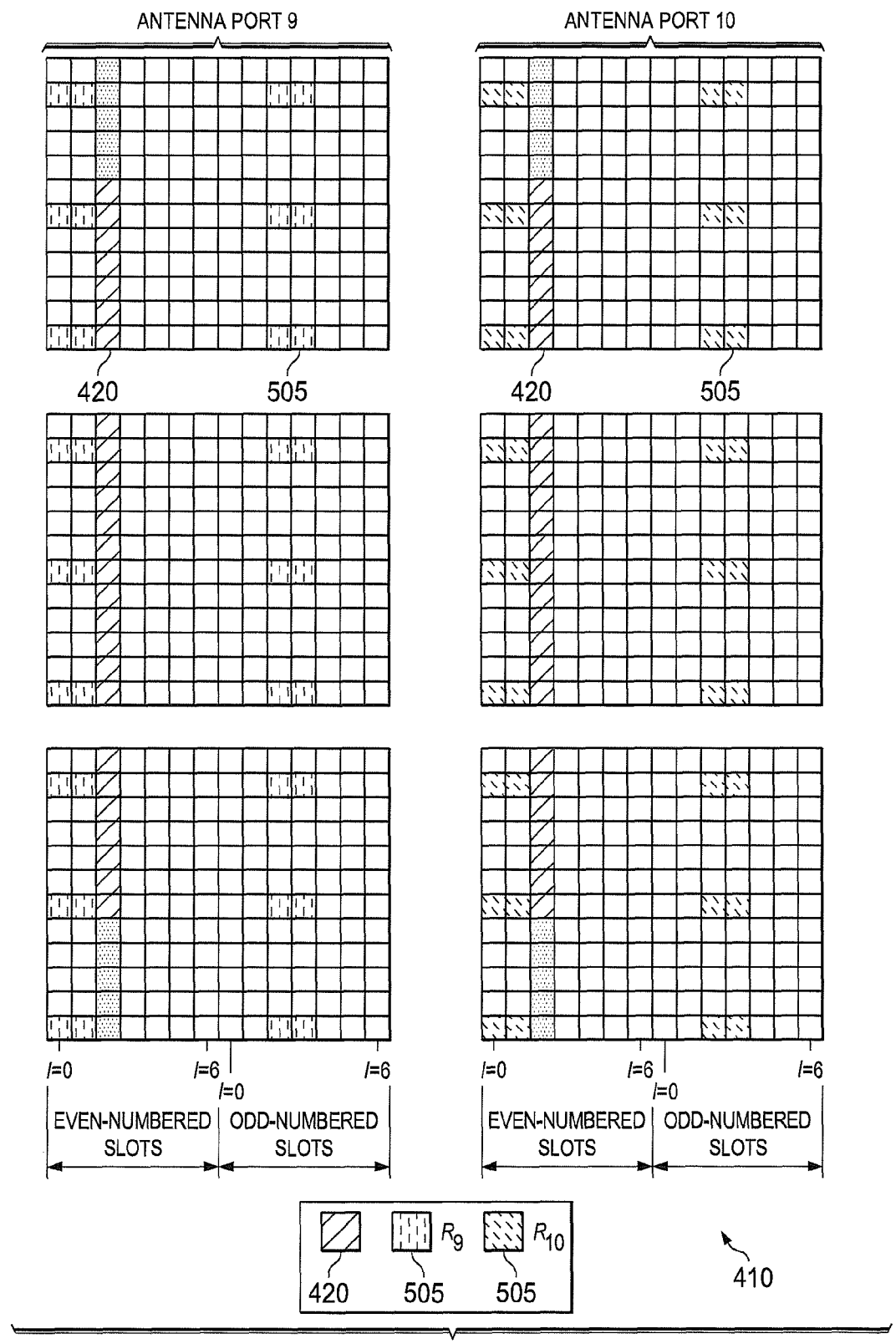
Figure 14:
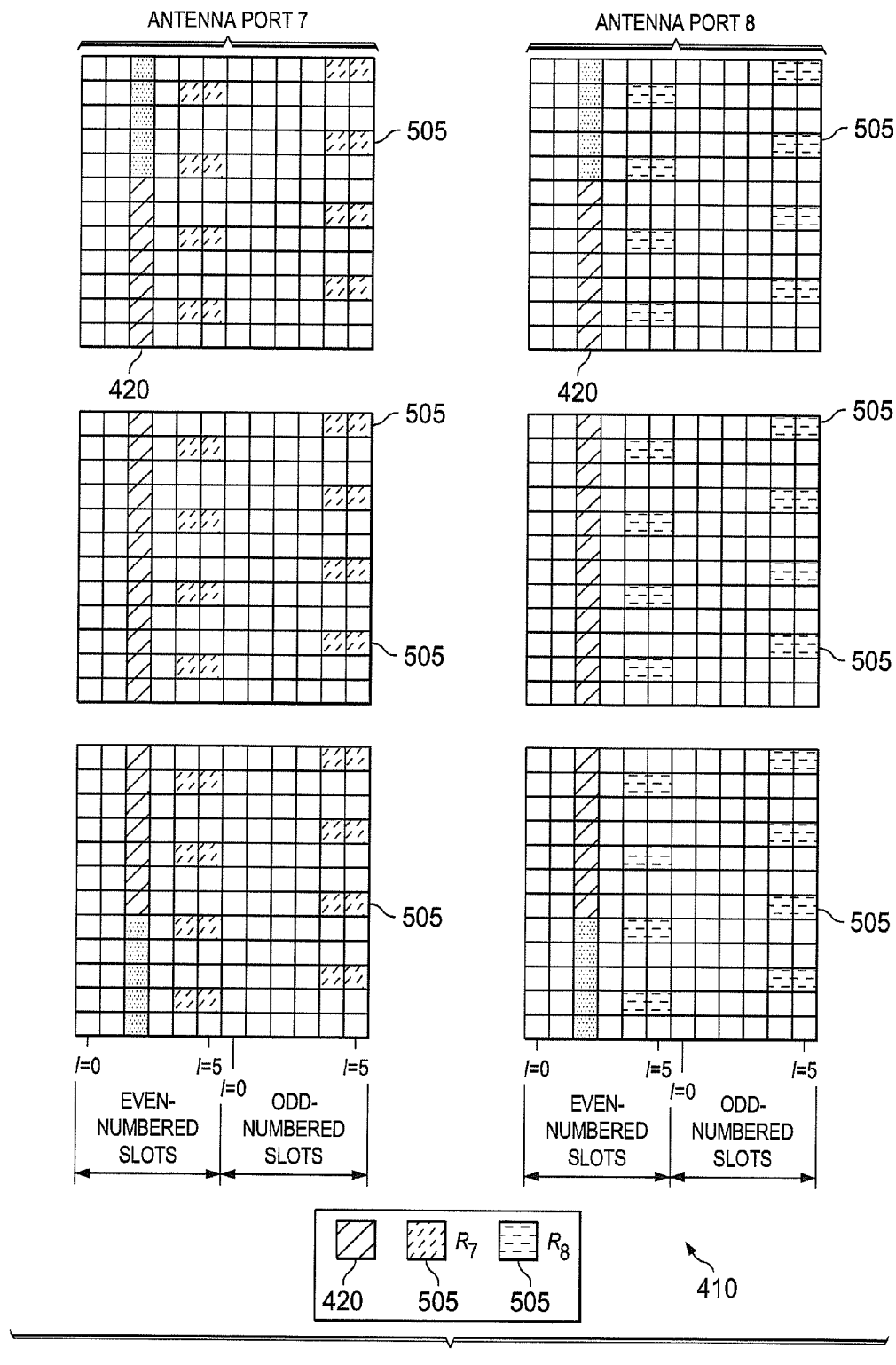

In another alternative (Alt 3-TDD), the DMRS 505 that collides with the PSS 420 are shifted to avoid the collision. For example, BS 102 shifts the DMRS 505 to avoid a collision with the PSS 420. This is illustrated in FIGS. 13A and 13B for Alt 3-TDD, DMRS 505 for subframes with PSS (Special subframe configuration 3, 4, or 8) (Normal CP). Shifting the DMRS 505 to avoid collision with the PSS 420 can provide the best channel estimation performance, as the DMRS 505 is transmitted from REs close to the four corners 1305 of each PRB.

In certain embodiments, if tracking signal based on CRS port 0 or/and 1 also exists in the same subframe, BS 102 is configured to adjust the DMRS 505 to avoid collision with the tracking signals. UE 116 also is configured to receive a DMRS 505 that has been adjusted to avoid collision with the tracking signals.

Figure 15:
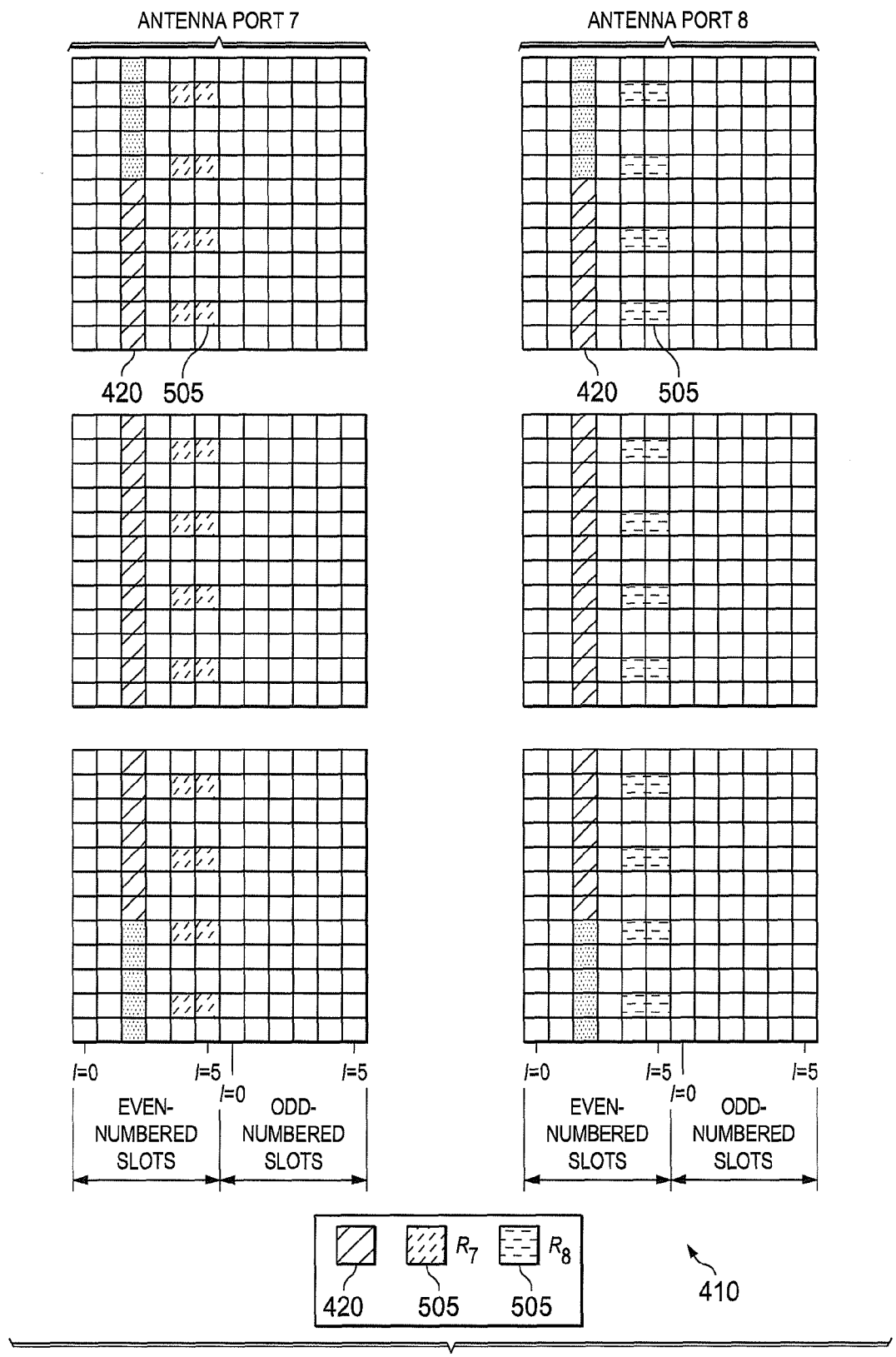

If the subframe with PSS is a special subframe (subframe 1 for all UL-DL configurations and subframe 6 for UL-DL configuration 0, 1, 2 and 6), and the CP length is extended CP, the Rel-10 DMRS 505 can be reused since the DMRS 505 does not collide with the PSS 420. This is shown in FIG. 15 for TDD, DMRS 505 for subframes with PSS (Special subframe configuration 1, 2, 3, 5 and 6) (Extended CP).

FIGS. 16A, 16B, 17A, 17B, 18A, 18B, 19A, 19B, 20, 21 and 22 illustrate a Time Division Duplex demodulation reference signal in subframes with a secondary synchronization signal for collision avoidance according to embodiments of the present disclosure. The middle six RB's (e.g., Region A 410) is shown in FIGS. 16A, 16B, 17A, 17B, 18A, 18B, 19A, 19B, 20, 21 and 22. The embodiments of the new demodulation reference signal shown in FIGS. 16A, 16B, 17A, 17B, 18A, 18B, 19A, 19B, 20, 21 and 22 are for illustration only. Other embodiments could be used without departing from the scope of this disclosure.

For subframes with SSS 425, some design alternatives for DMRS 505 that avoid collision with SSS 425 are as follows.

Figure 16A:
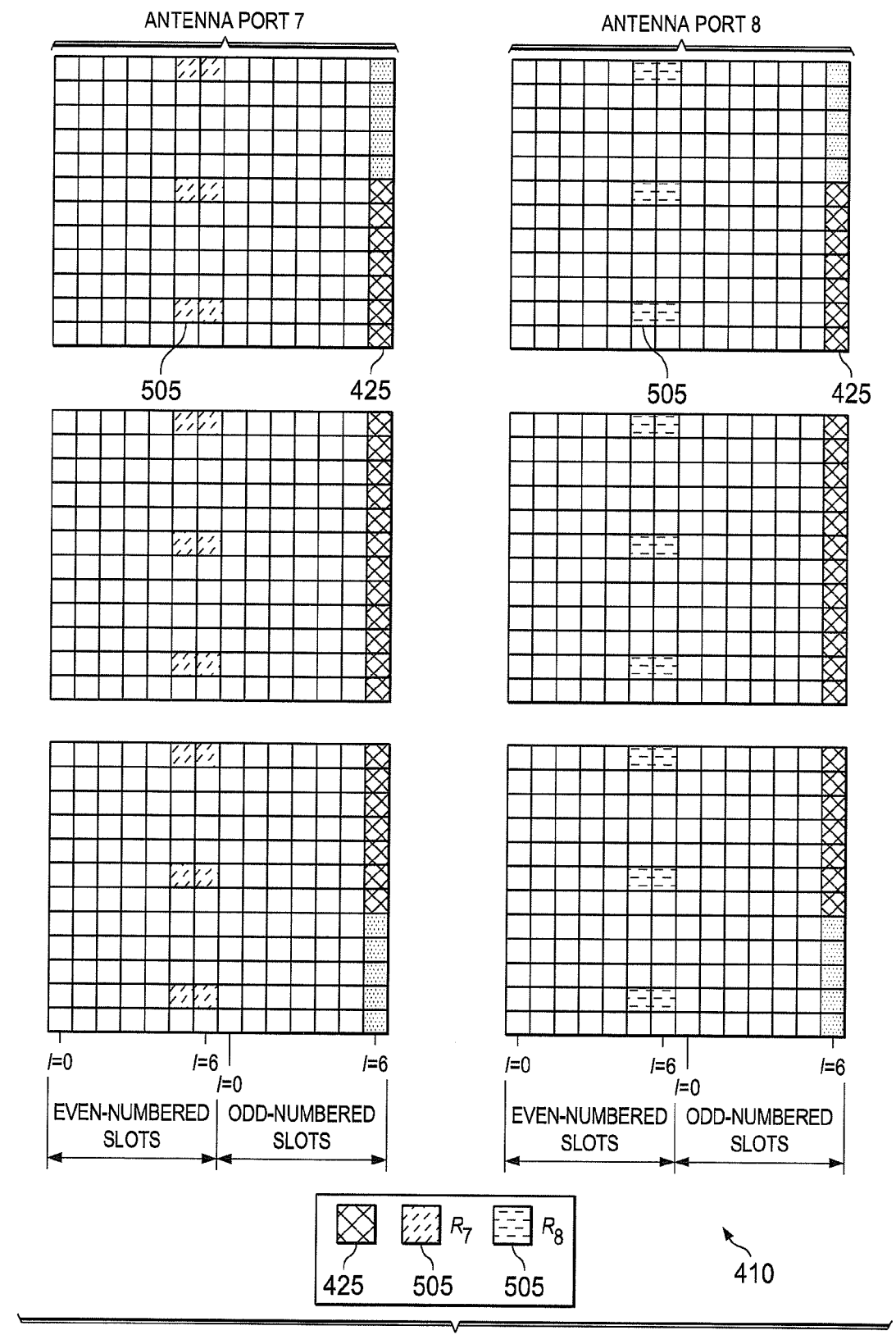
FIGS. 16A, 16B, 17A, 17B, 18A, 18B, 19A, 19B, 20, 21 and 22 illustrate a Time Division Duplex demodulation reference signal in subframes with a secondary synchronization signal for collision avoidance according to embodiments of the present disclosure.
Figure 16B:
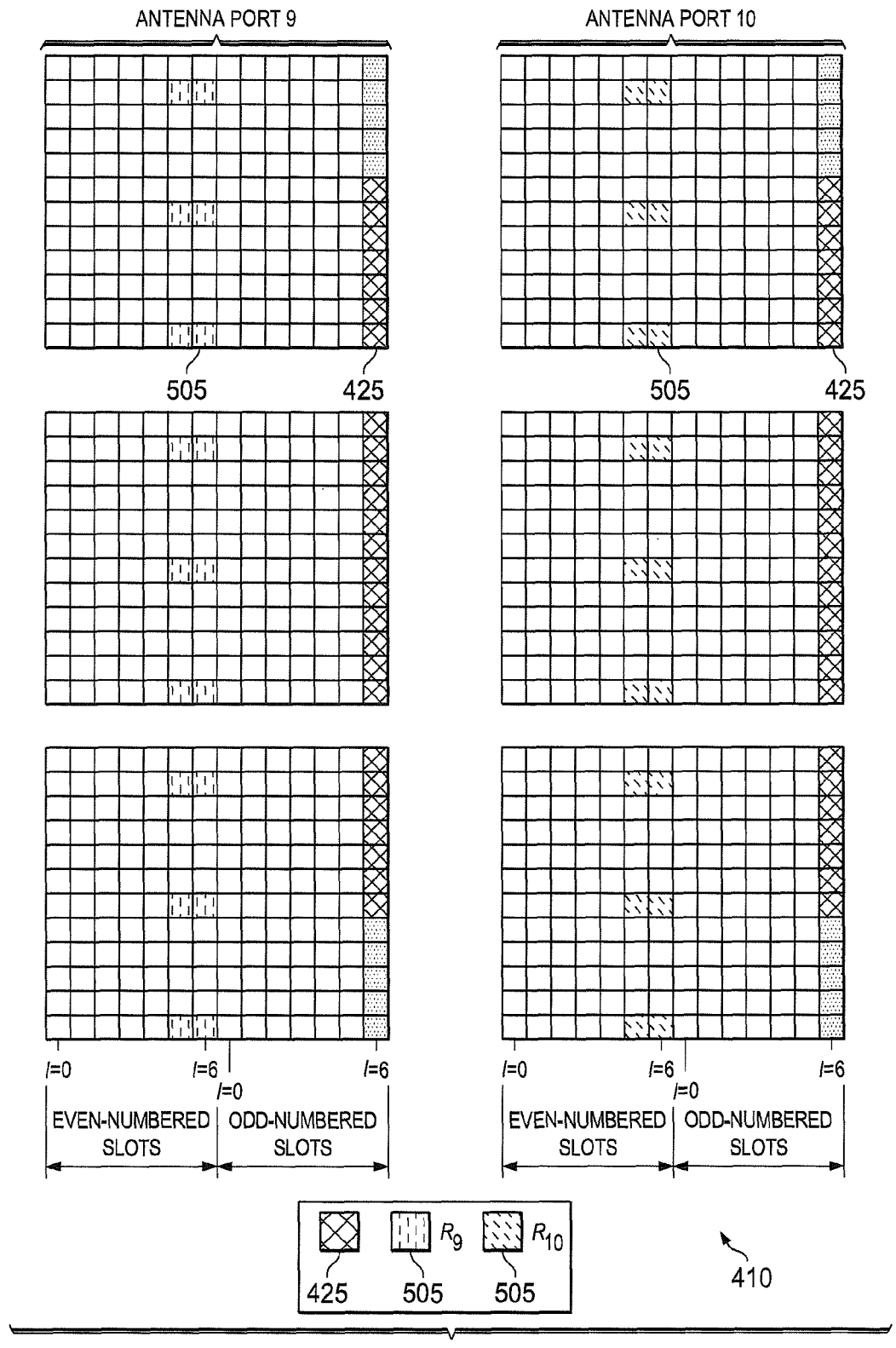
Figure 20:
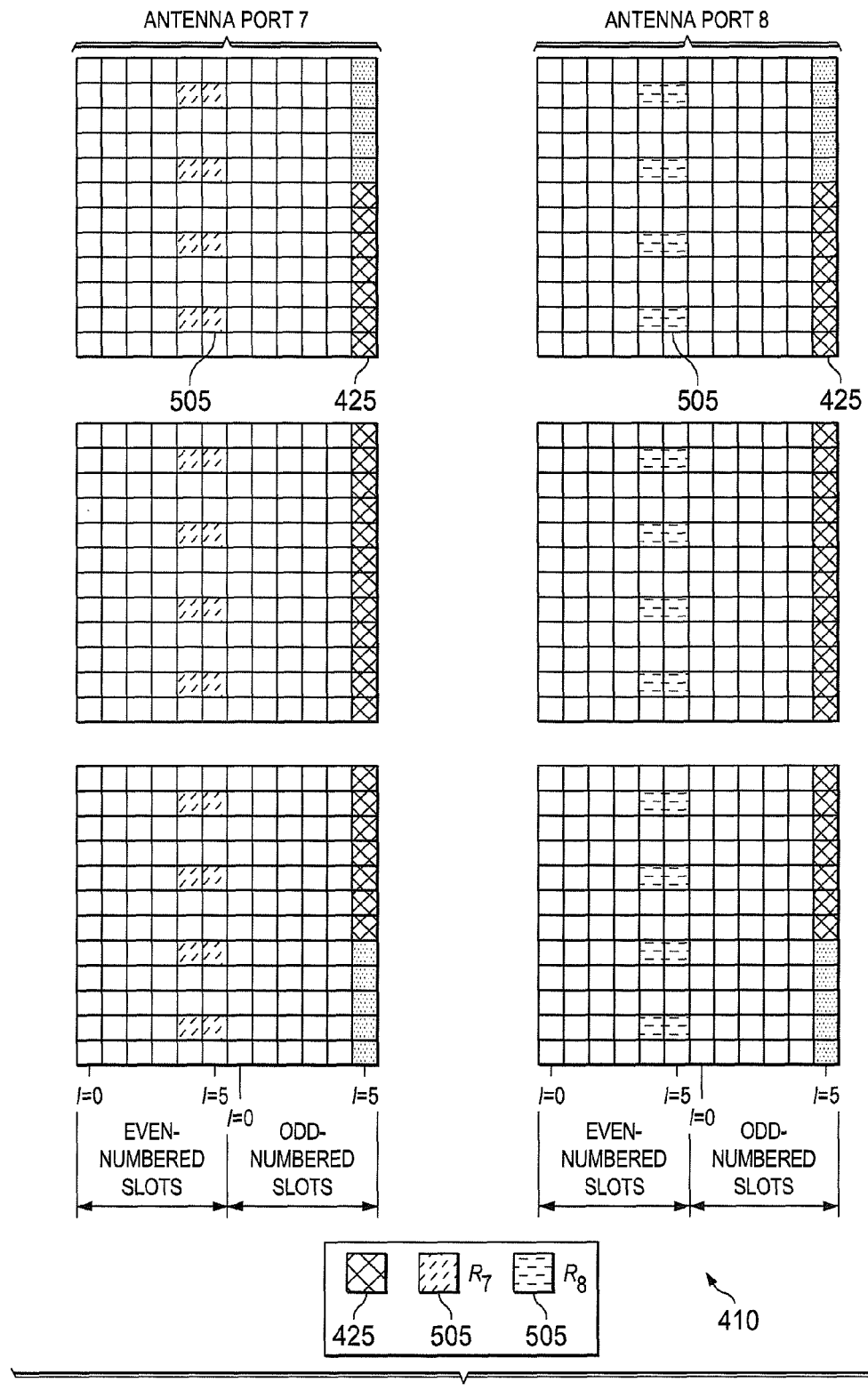

In a first alternative (Alt 1-TDD SSS), the DMRS pattern is the same as that of Rel-10, except that the DMRSs 505 that collide with the SSS are removed. That is, BS 102 is configured to remove (e.g., puncture) the DMRSs 505 in the second slot. This is illustrated in FIGS. 16A and 16B showing Alt 1-TDD SSS, DMRS 505 for subframes with SSS (Normal CP) and in FIG. 20 showing Alt 1-TDD SSS, DMRS 505 for subframes with SSS (Extended CP). Puncturing the DMRSs 505 that collide with the SSS 425 provides a low DMRS overhead.

Figure 17A:
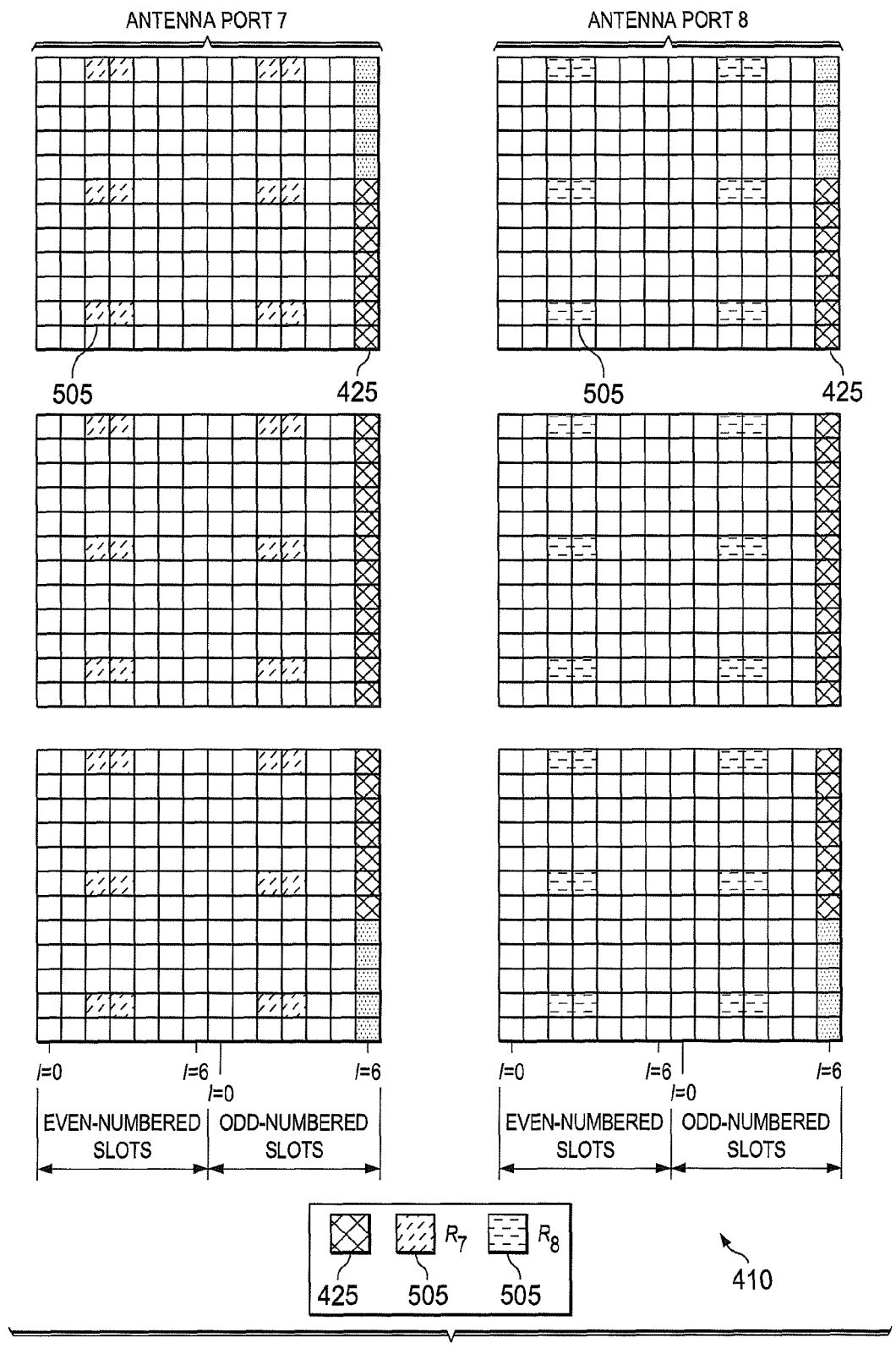
Figure 17B:
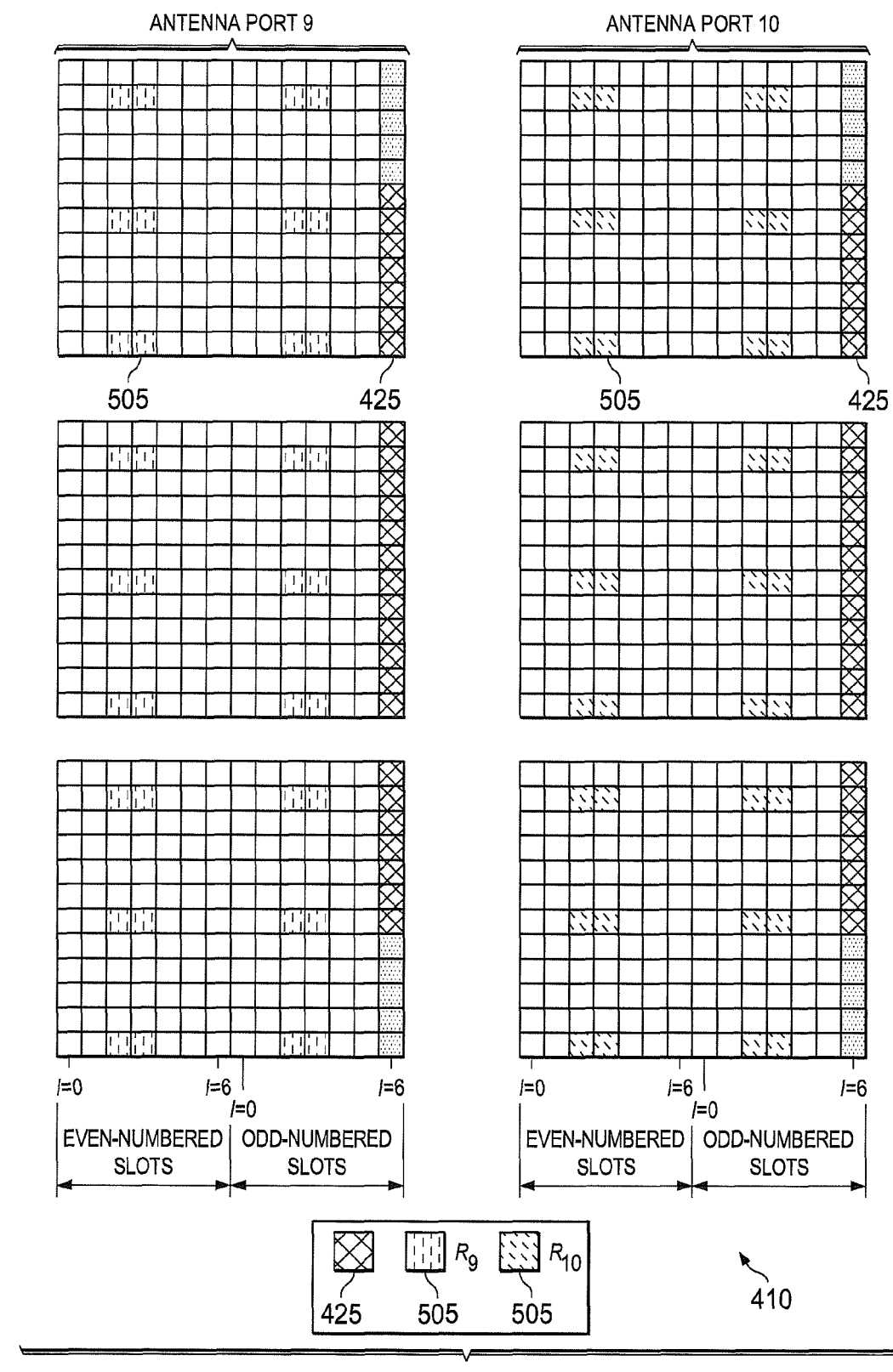

In a second alternative (Alt 2-TDD SSS), the DMRS pattern is the same as that used for TDD subframe configuration 3, 4 and 8. This is illustrated in FIGS. 17A and 17B showing Alt 2-TDD SSS, DMRS patterns for subframes with SSS—Reuse of DMRS pattern of TDD subframe configuration 3, 4, 8 (Normal CP). By reusing an existing TDD DMRS pattern, a new DMRS pattern is not required to be designed or configured. Additionally, reusing the existing TDD DMRS pattern offers better channel estimation performance than puncturing the DMRSs 505 (Alt 1-TDD SSS) at the expense of higher DMRS overhead.

Figure 18A:
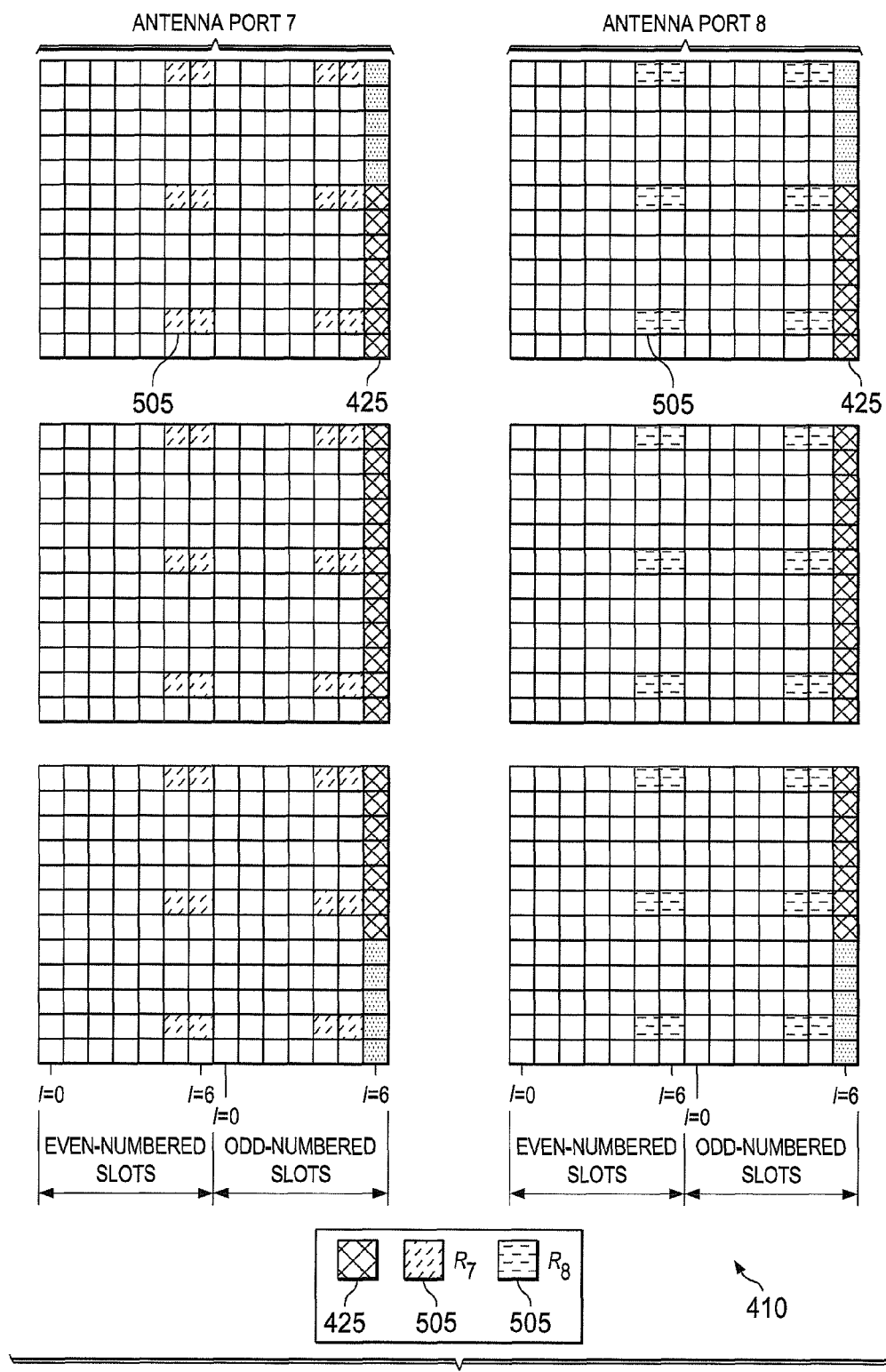
Figure 18B:
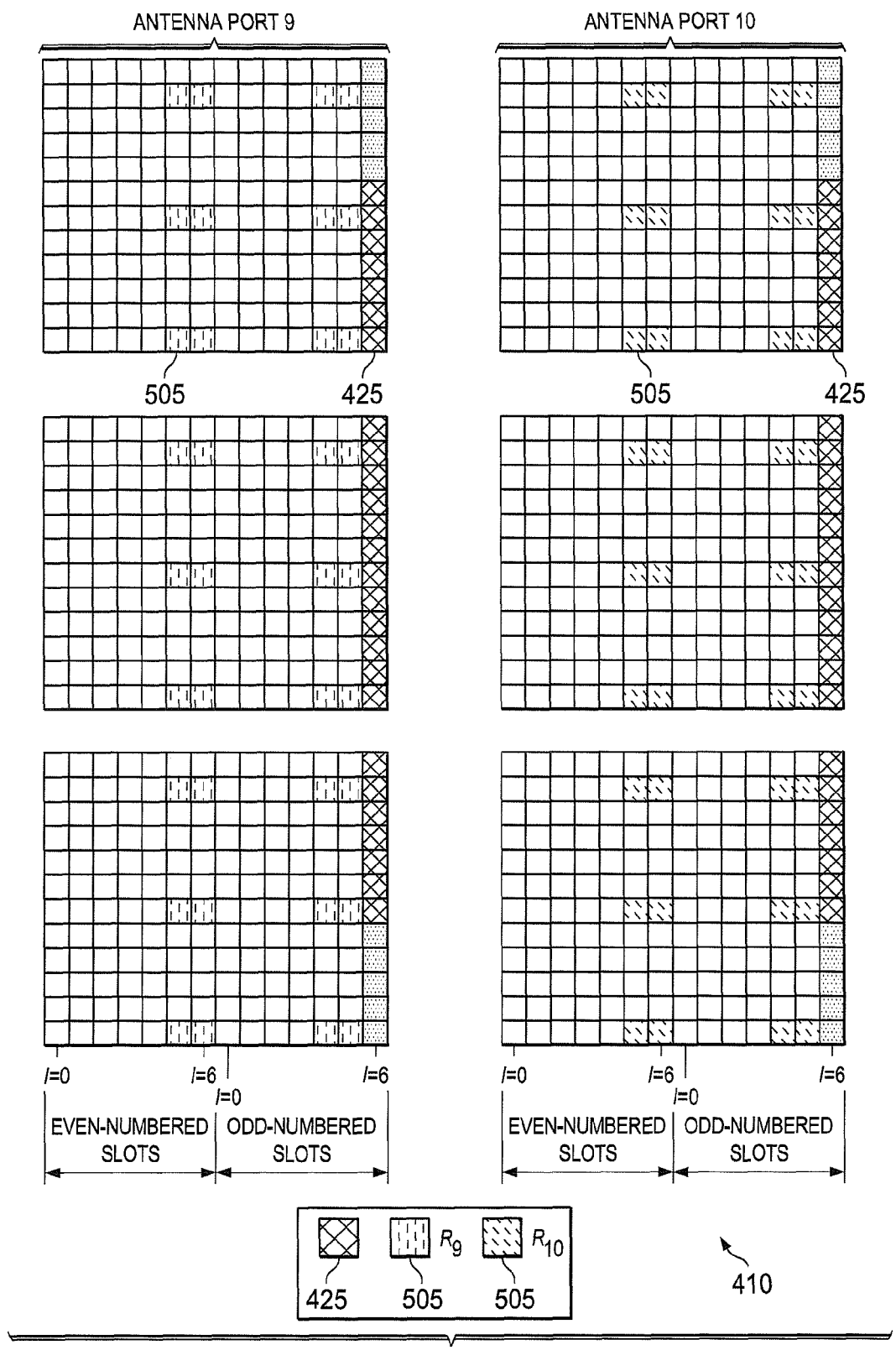
Figure 19A:
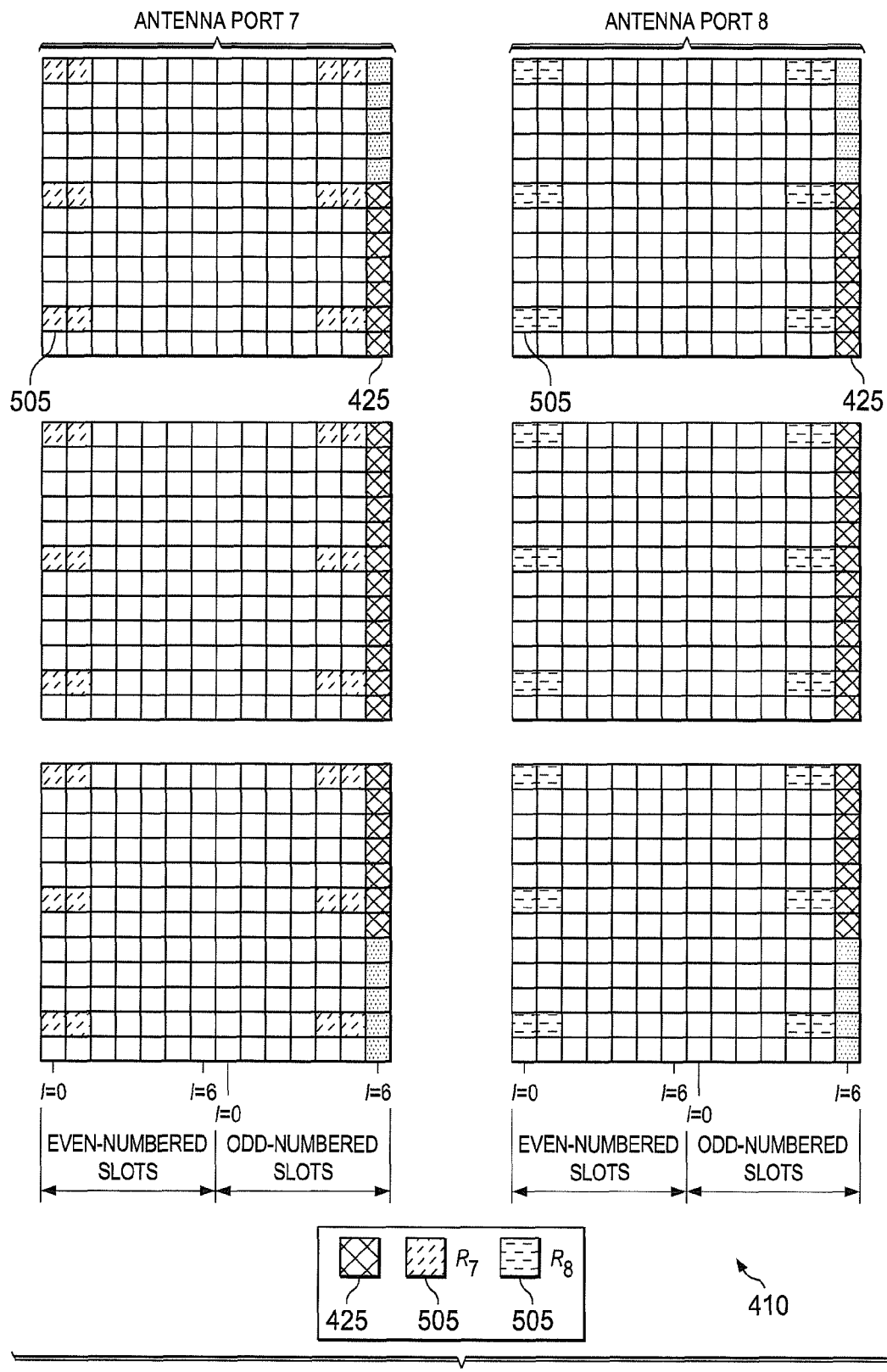
Figure 19B:
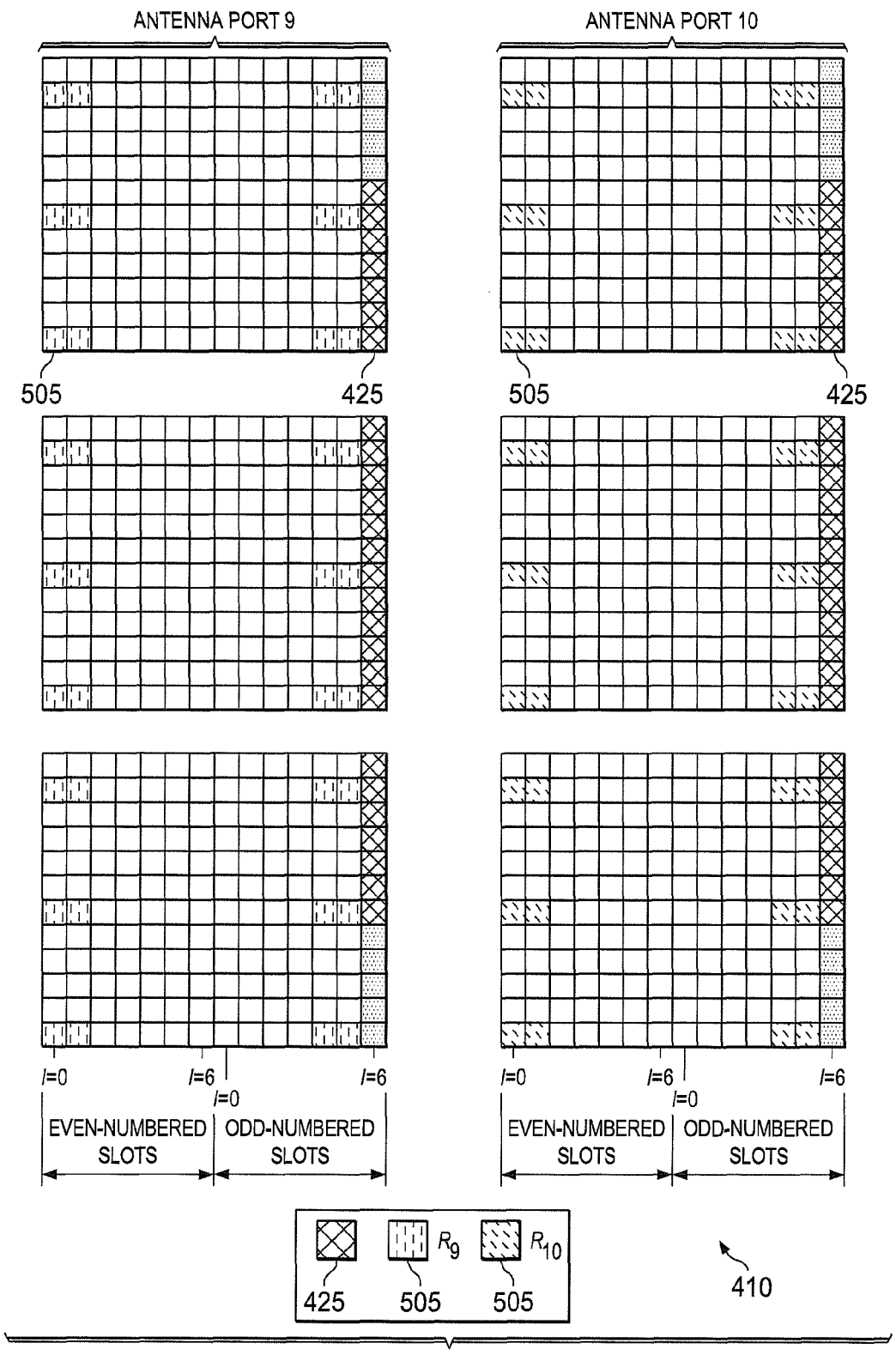
Figure 21:
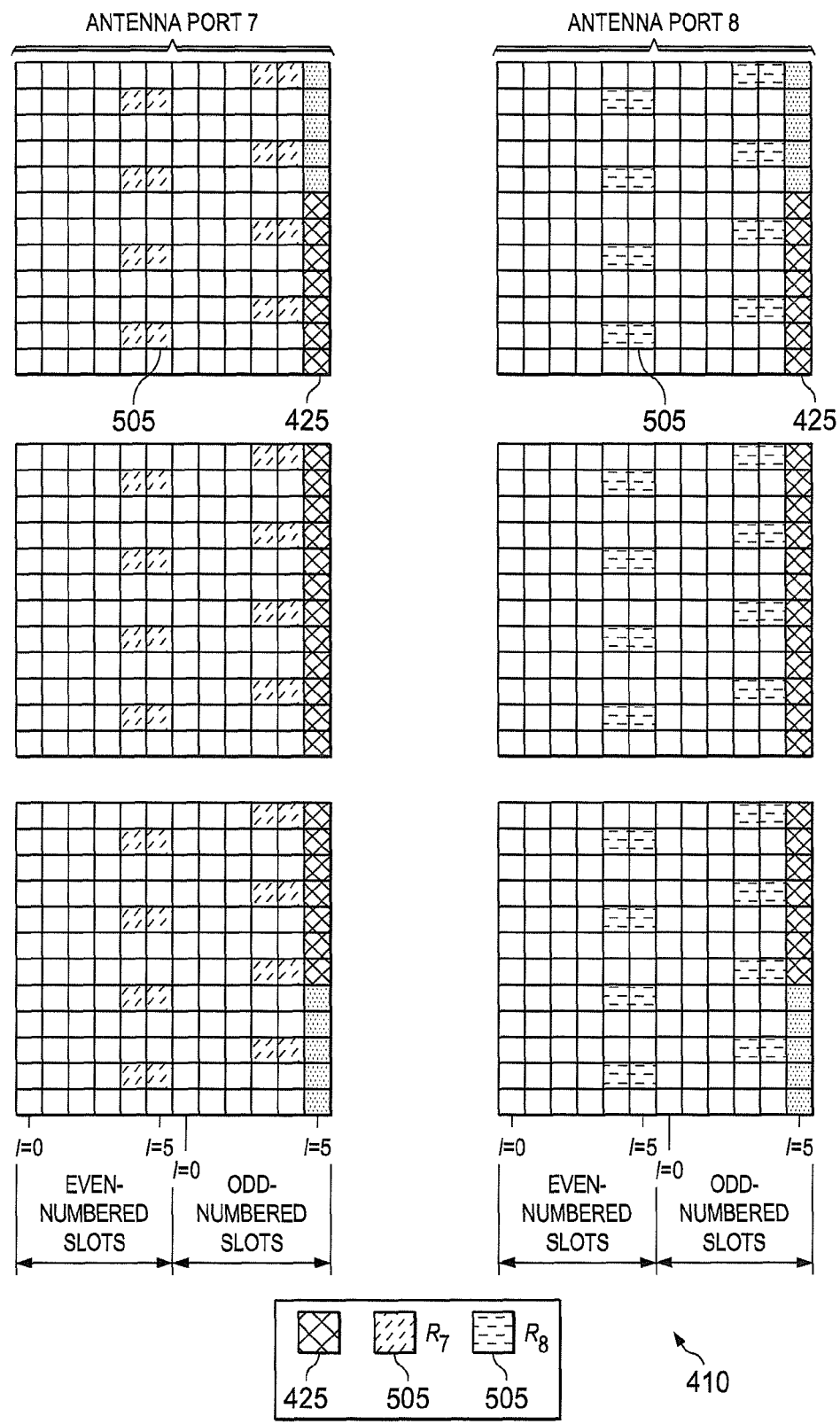
Figure 22:
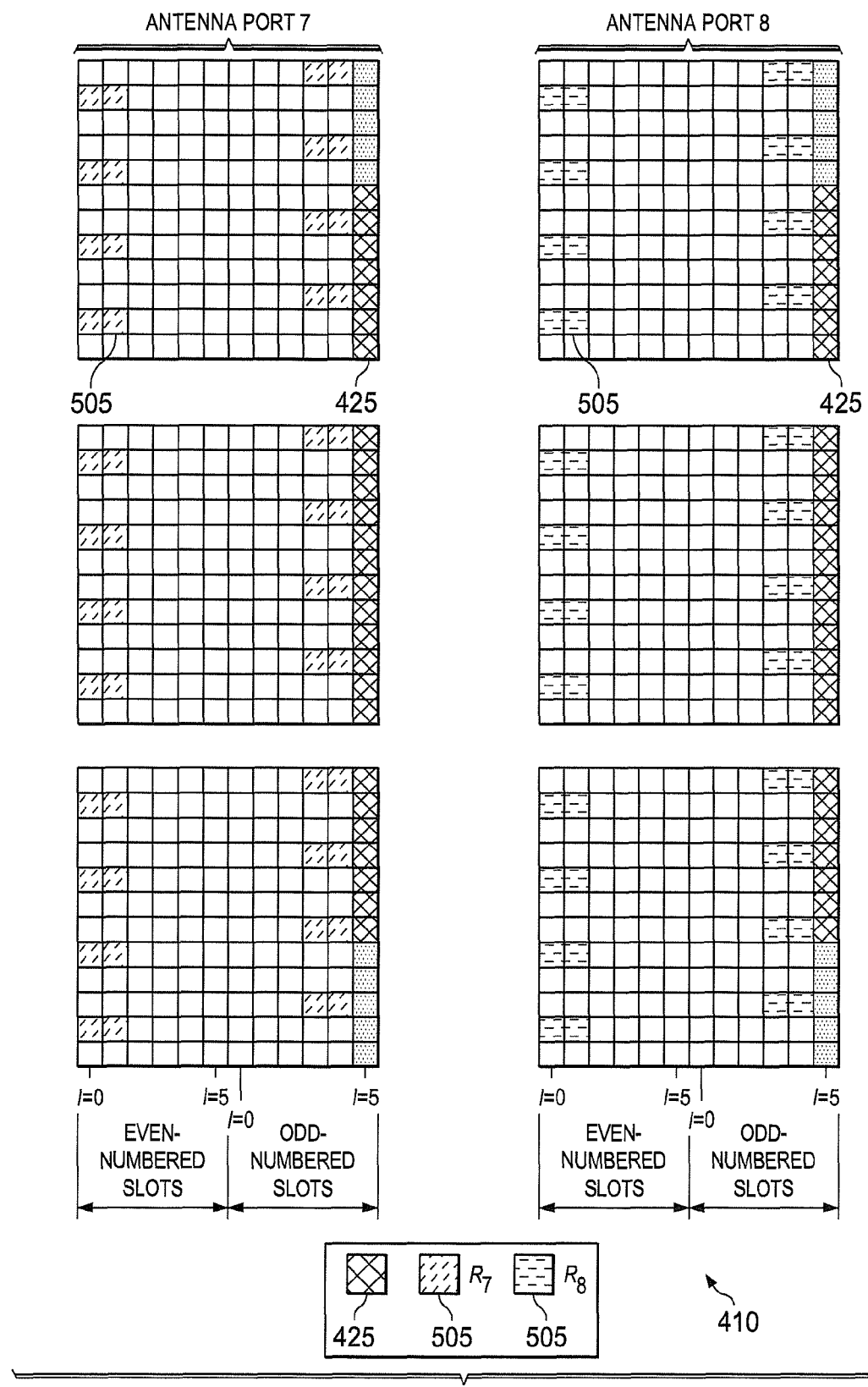

In a third alternative (Alt 3-TDD SSS), the DMRS 505 that collides with the SSS 425 are shifted to avoid the collision. For example, BS 102 shifts the DMRS 505 to avoid a collision with the SSS 425. FIGS. 18A and 18B show a DMRS shift for a normal CP (Design 1); FIGS. 19A and 19B show another DMRS shift for a normal CP (Design 2); FIG. 21 shows a DMRS shift for an extended CP (Design 1); and FIG. 22 shows another DMRS shift for an extended CP (Design 2). Shifting the DMRS 505 to avoid collision can provide the best channel estimation performance. In certain embodiments, if the tracking signal based on CRS port 0 or/and 1 also exists in the same subframe, BS 102 is configured to adjust the DMRS to avoid collision with the tracking signals. UE 116 also is configured to receive a DMRS 505 that has been adjusted to avoid collision with the tracking signals.

In certain embodiments, for Alt1, Alt2 and Alt3 for both FDD and TDD, in order to reduce the DMRS overhead, the rank or the number of ports used to receive PDSCH in the middle 6 RBs concerned is either 1 or 2, corresponding to the use of port 7, or port 7 and 8. Assuming the DMRS 505 is transmitted in both slots of a subframe (e.g. Alt 2 or 3), this maintains the DMRS overhead in a PRB-pair to be twelve REs, rather than twenty-four REs. For Alt 1 embodiments, this maintains the DMRS overhead to be six REs, rather than twelve REs.

In Rel-10 LTE, for FDD (frame structure type 1), UE 116 does not expect to receive PDSCH resource blocks transmitted on antenna ports 5, 7, 8, 9, 10, 11, 12, 13 or 14 in the two PRBs to which a pair of VRBs is mapped if either one of the two PRBs overlaps in frequency with a transmission of either PBCH or PSS 420 or SSS 425 the same subframe. For TDD (frame structure type 2), UE 116 does not expect to receive PDSCH resource blocks transmitted on antenna ports 7, 8, 9, 10, 11, 12, 13 or 14 in the two PRBs to which a pair of VRBs is mapped if either one of the two PRBs overlaps in frequency with a transmission of PSS 420 or SSS 425 in the same subframe.

In certain embodiments (referenced as "Option 1" and/or "Implicit Configuration According to Carrier Type"), UE 116 is configured to implicitly determine the DMRS configuration. For example, UE 116 implicitly determines the DMRS configuration according to carrier type. A DMRS pattern that UE 116 uses for channel estimation in region A 410 is implicitly configured depending on the carrier type. For the PDSCH transmitted in region A 410 in a component carrier, UE 116 uses the following DMRS depending on the type of the component carrier:

if the carrier type is a first carrier type, UE 116 uses a first DMRS pattern; and if the carrier type is a second carrier type, UE 116 uses a second DMRS pattern.

In certain embodiments, the first and the second carrier types are Rel-8 compatible carrier type and the new carrier type. In certain embodiments, the first and the second DMRS patterns are the Rel-10 DMRS pattern and a new DMRS pattern, such as those illustrated with respect to FIGS. 4A through 22, respectively. Furthermore, in certain embodiments, the carrier type of the component carrier is transmitted to UE 116 by UE-specific signaling in the RRC layer or through a broadcast signaling. In certain embodiments, when UE 116 is configured a secondary cell, an RRC configuration configuring the secondary cell includes an information field indicating the carrier type. For example, when the information field is 1, the secondary cell is the first carrier type; when the information field is 0, the secondary cell is the second carrier type.

One example of Option 1 is described below:

If the carrier is an extension carrier/non-backward compatible carrier (such as the NCT):

for FDD (frame structure type 1), BS 102 transmits PDSCH resource blocks on antenna port 7, 8, 9, 10, 11, 12, 13 or 14 in the two PRBs to which a pair of VRBs is mapped if either one of the two PRBs overlaps in frequency with a transmission of either PBCH, PSS 420 or SSS 425 in the same subframe. Additionally, UE 116 receives PDSCH resource blocks that were transmitted on antenna port 7, 8, 9, 10, 11, 12, 13 or 14 in the two PRBs to which a pair of VRBs is mapped if either one of the two PRBs overlaps in frequency with a transmission of PSS 420 or SSS 425 in the same subframe. In certain embodiments, BS 102 transmits, and UE 116 receives, PDSCH resource blocks transmitted on a subset of antenna ports. For example, BS 102 can transmit PDSCH resource blocks on port 7 only. In another example, BS 102 transmits PDSCH resource blocks on ports 7 and 8 only. Example DMRS patters for antenna port 7, 8, 9, 10, 11, 12, 13 or 14 can be as illustrated with respect to FIGS. 4 through 22, respectively.

for TDD (frame structure type 2), BS 102 network transmits PDSCH resource blocks on antenna port 7, 8, 9, 10, 11, 12, 13 or 14 in the two PRBs to which a pair of VRBs is mapped if either one of the two PRBs overlaps in frequency with a transmission of PSS 420 or SSS 425 in the same subframe. Additionally, UE 116 receives PDSCH resource blocks that were transmitted on antenna port 7, 8, 9, 10, 11, 12, 13 or 14 in the two PRBs to which a pair of VRBs is mapped if either one of the two PRBs overlaps in frequency with a transmission of PSS 420 or SSS 425 in the same subframe. In certain embodiments, BS 102 transmits, and UE 116 receives, PDSCH resource blocks transmitted on a subset of antenna ports. For example, BS 102 can transmit PDSCH resource blocks on port 7 only. In another example, BS 102 transmits PDSCH resource blocks on ports 7 and 8 only. Example DMRS patters for antenna port 7, 8, 9, 10, 11, 12, 13 or 14 can be as illustrated with respect to FIGS. 4A through 22, respectively.

In certain embodiments, if the carrier is Rel-10 carrier/backward compatible carrier, UE 116 follows the Rel-10 behavior as described herein above.

In certain embodiments, (referenced as "Option 2" and/or explicit configuration according to network signaling") UE 116 is configured to receive an explicit configuration to determine the DMRS configuration. For example, UE 116 receives an explicit DMRS configuration according to network signaling. UE 116 uses a DMRS pattern for channel estimation in region A 410 that is explicitly configured by an RRC signaling. For the PDSCH transmitted in region A 410 in a component carrier, UE 116 uses the following DMRS depending on the RRC signaling:

When no RRC signaling associated with the DMRS pattern in region A 410 is received, UE 116 uses a first DMRS pattern;

When an RRC signaling associated with the DMRS pattern in region A 410 is received, UE 116 uses the first DMRS pattern if an information field configuring the DMRS pattern in region A 410 indicates to use the first DMRS pattern, or UE 116 uses a second DMRS pattern if the information field configuring the DMRS pattern in region A 410 indicates to use the second DMRS pattern.

In certain embodiments, the first and the second DMRS patterns are the Rel-10 DMRS pattern and a new DMRS pattern whose examples can be found illustrated with respect to FIGS. 4A through 22, respectively.

One example of Option 2 is described below:

If UE 116 receives the RRC signaling containing the information field configuring the DMRS pattern in region A 410, and the information field indicates to use the second DMRS pattern:

for FDD (frame structure type 1), UE 116 receives PDSCH resource blocks transmitted on antenna ports 7, 8, 9, 10, 11, 12, 13 or 14 in the two PRBs to which a pair of VRBs is mapped if either one of the two PRBs overlaps in frequency with a transmission of either PBCH or PSS 420 or SSS 425 in the same subframe. In certain embodiments, UE 116 receives PDSCH resource blocks transmitted on a subset of antenna ports such as on only port 7, or on ports 7 and 8 only. Examples of the DMRS patterns for antenna port 7, 8, 9, 10, 11, 12, 13 or 14 are illustrated with respect to FIGS. 4A through 22, respectively.

For TDD (frame structure type 2), BS 102 transmits PDSCH resource blocks on antenna ports 7, 8, 9, 10, 11, 12, 13 or 14 in the two PRBs to which a pair of VRBs is mapped if either one of the two PRBs overlaps in frequency with a transmission of PSS 420 or SSS 425 in the same subframe. Additionally, UE 116 receives PDSCH resource blocks that were transmitted on antenna port 7, 8, 9, 10, 11, 12, 13 or 14 in the two PRBs to which a pair of VRBs is mapped if either one of the two PRBs overlaps in frequency with transmission of PSS 420 or SSS 425 in the same subframe. In certain embodiments, BS 102 transmits, and UE 116 receives, PDSCH resource blocks transmitted on a subset of antenna ports. For example, BS 102 can transmit PDSCH resource blocks on port 7 only. In another example, BS 102 transmits PDSCH resource blocks on ports 7 and 8 only. Examples of the DMRS patterns for antenna port 7, 8, 9, 10, 11, 12, 13 or 14 are illustrated with respect to FIGS. 4A through 22, respectively.

Otherwise, UE 116 follows the Rel-10 behavior as described herein above. Option 2 (Explicit configuration according to network signaling) allows the possibility for UE 116 also receiving DMRS 505 in Region A 410 in a backward compatible carrier.

In certain embodiments, UE 116 is configured to determine an option for the DMRS pattern used by the network. Since the DMRS pattern for the middle 6 RBs of a subframe with PSS/SSS (Region A 410) may be different from the DMRS pattern for the other resource blocks (RBs) (Region B 415), if UE 116 is assigned some RBs in Region A 410 and some RBs in Region B 415, two options can exist for the DMRS patterns used by the network and UE 116.

If none of the RBs scheduled to UE 116 belong to Region A 410, UE 116 uses a first DMRS pattern.

If all the RBs scheduled to UE 116 belong to Region A 410, UE 116 uses a second DMRS pattern.

If the RBs assigned to UE 116 consist of some RBs in Region A 410 and some RBs in Region B 415, two options exist:

In a first (Option 1): For RB in Region A 410, UE 116 uses the second DMRS pattern. For RB in Region B 415, UE 116 uses the first DMRS pattern. That is, the DMRS pattern of an RB depends on whether the RB concerned belongs to Region A 410 or Region B 415. This allows consistent DMRS patterns according to region type.

Option 2: UE 116 uses the same DMRS patterns for all the RBs in the subframe. In particular, UE 116 uses the second DMRS pattern even for the assigned RBs belonging to Region B 415. This option allows consistent DMRS pattern for all RBs assigned in the same subframe.

In certain embodiments, the first DMRS pattern and the second DMRS pattern are the Rel-10 DMRS pattern and a new DMRS pattern, examples of which are illustrated with respect to FIGS. 4A through 22, respectively.

In certain embodiments, for dynamic scheduling, since assigned RBs can change on subframe basis, the DMRS pattern used also changes on subframe basis.

FIGS. 23A, 23B, 24A, 24B, 25A, 25B, 26A and 26B illustrate new primary synchronization signal/secondary synchronization signal locations for collision avoidance according to embodiments of the present disclosure. The middle six RB's (e.g., Region A 410) is shown in FIGS. 23A, 23B, 24A, 24B, 25A, 25B, 26A and 26B. The embodiments of the PSSS/SSS signal locations shown in FIGS. 23A, 23B, 24A, 24B, 25A, 25B, 26A and 26B are for illustration only. Other embodiments could be used without departing from the scope of this disclosure.

In certain embodiments, the PSS/SSS locations are adjusted for collision avoidance. Instead of changing the Rel-10 DMRS pattern for Region A 410, another approach to resolve the DMRS and PSS/SSS collision is to move the colliding PSS/SSS to another location so that the DMRS pattern of Rel-10 can be reused in Region A 410.

Additionally, if RS for frequency and time synchronization purpose (called tracking RS) is configured/present for the extension carrier, it may also be desirable to move the PSS/SSS location to order to avoid collision with the tracking RS. One example of the tracking signal can be the CRS port 0 and/or 1 with low-duty cycle (e.g. periodicity of 5 ms). The avoidance with the tracking RS needs to be considered if they are transmitted in the same subframe as the PSS/SSS.

If CSI-RS is configured in the same subframe, it is also desirable to avoid collision between the PSS/SSS and the CSI-RS. However, if collision occurs for certain cases, (according to Rel-10) UE 116 assumes that CSI reference signals are not transmitted in subframes where transmission of a CSI-RS would collide with transmission of synchronization signals. The same behavior can also be applied for the extension carrier.

If PBCH is transmitted in the same subframe, it is desirable to avoid collision between the PSS/SSS and the PBCH so that MIB can be protected.

Furthermore, it is desirable to ensure the location of PSS/SSS is different for TDD and FDD so that UE 116 is able to differentiate if the cell is TDD or FDD from the location of the PSS/SSS detected.

Lastly, there is also benefit by ensuring the PSS/SSS location of the extension carrier is different from the backward compatible carrier so that UE 116 is able to recognize the carrier type from the location of the PSS/SSS detected, e.g. if the OFDM symbol spacing between the PSS and SSS for the extension carrier is different from that for the backward compatible carrier (Rel-8/9/10), UE 116 is able to recognize the carrier type from the OFDM symbol spacing.

Some examples of PSS/SSS location to avoid to the DMRS pattern and/or the tracking signals are given below.

Figure 23A:
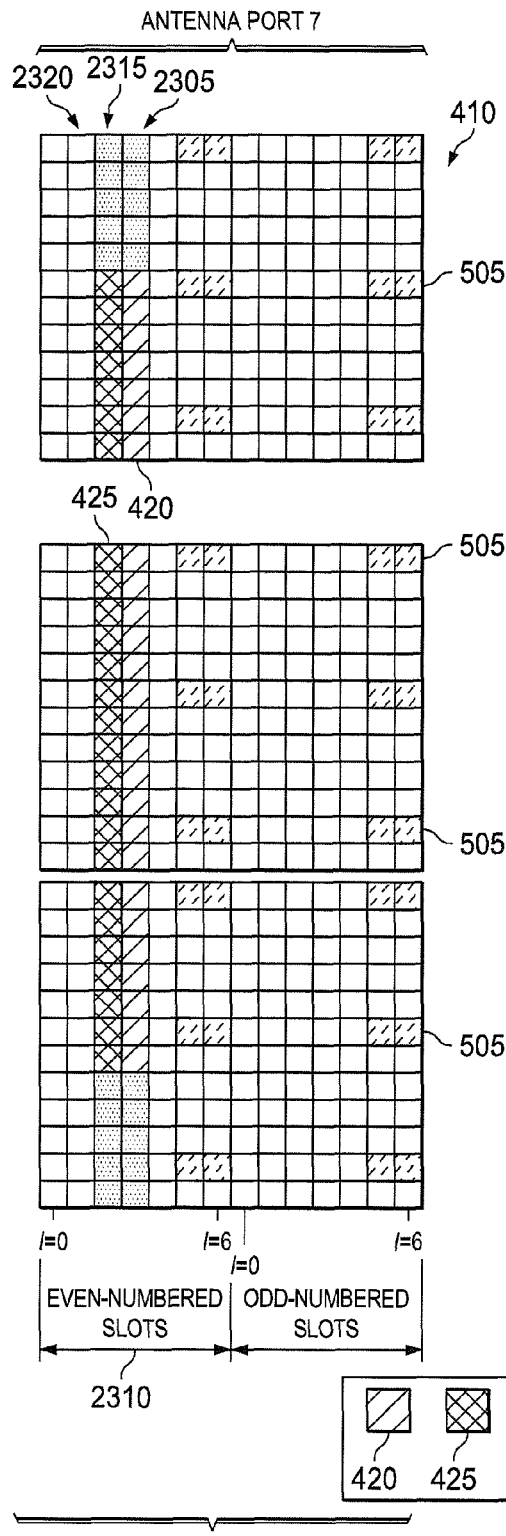
FIGS. 23A, 23B, 24A, 24B, 25A, 25B, 26A and 26B illustrate new primary synchronization signal/secondary synchronization signal locations for collision avoidance according to embodiments of the present disclosure.
Figure 23B:
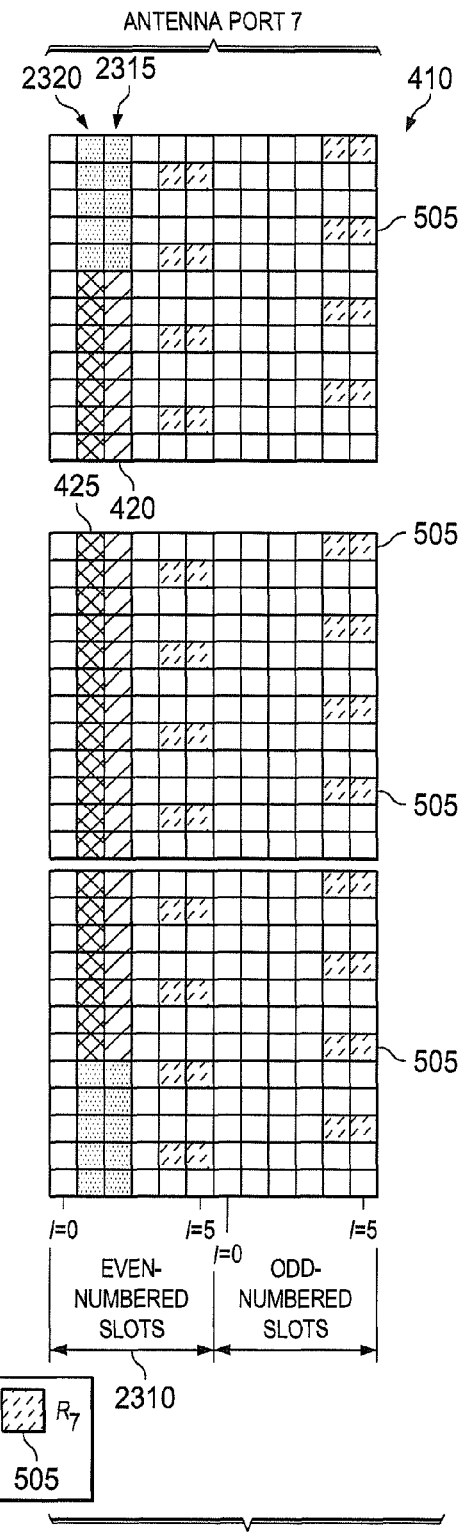

FDD (frame structure 1) and normal CP:

In one example, shown in FIG. 23A, the PSS 420 is moved to the $4^{th}$ OFDM symbol 2305 (l=3) of the first slot 2310 in subframe 0 and subframe 5 of a radio frame and the SSS 425 can be moved to the $3^{rd}$ OFDM symbol 2315 (l=2) of the first slot 2310 in subframe 0 and subframe 5 of a radio frame.

In another example, the PSS 420 is moved to the $3^{rd}$ OFDM symbol 2315 (l=2) of the first slot 2310 in subframe 0 and subframe 5 of a radio frame and the SSS 425 is moved to the 2nd OFDM symbol 2320 (l=1) of the first slot 2310 in subframe 0 and subframe 5 of a radio frame.

The design avoids collision between the PSS/SSS and Rel-10 DMRS, CSI-RS (if configured) and tracking signal based on CRS port 0 and/or 1 (if configured).

FDD (frame structure 1) and extended CP:

In one example, the PSS 420 is moved to the $4^{th}$ OFDM symbol 2305 (l=3) of the first slot 2310 in subframe 0 and subframe 5 of a radio frame and the SSS 425 is moved to the $3^{rd}$ OFDM symbol 2315 (l=2) of the first slot 2310 in subframe 0 and subframe 5 of a radio frame.

In another example, if the tracking signal exists and assumes the location of CRS port 0 in the same subframe as the PSS/SSS, in order to also avoid collision with the tracking signals, the PSS 420 is moved to the 2nd OFDM symbol 2315 (l=1) of the first slot 2310 in subframe 0 and subframe 5 of a radio frame and the SSS 425 is moved to the $3^{rd}$ OFDM symbol 2315 (l=2) of the first slot 2310 in subframe 0 and subframe 5 of a radio frame. In another example, shown in FIG. 23B, the PSS 420 is moved to the $3^{rd}$ OFDM symbol 2315 (l=2) of the first slot 2310 in subframe 0 and subframe 5 of a radio frame and the SSS 425 to the 2nd OFDM symbol 2320 (l=1) of the first slot 2310 in subframe 0 and subframe 5 of a radio frame.

The above designs avoid collision between the PSS/SSS and Rel-10 DMRS, CSI-RS (if configured) and tracking signal based on CRS port 0 and/or 1 (if configured).

Figures 24A, 24B:
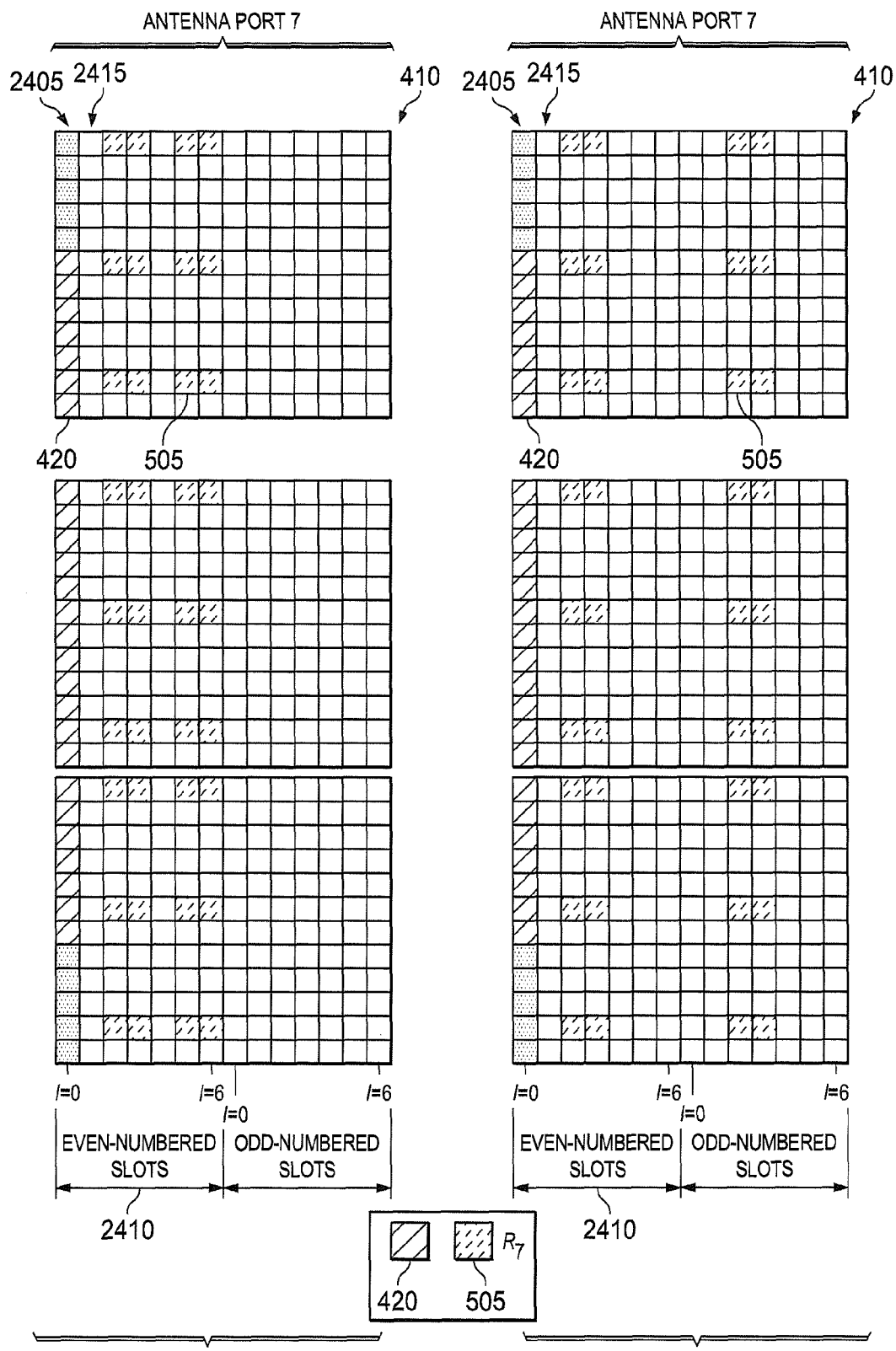

FIGS. 24A and 24B illustrate a TDD (frame structure 2) for normal CP and extended CP, respectively, according to embodiments of the present disclosure. The embodiments of the TDD frame structures for normal CP and extended CP.

If the PSS 420 is located in a special subframe, such as for normal CP, in order to avoid collision with the Rel-10 DMRS in the special subframe, the PSS 420 is moved to the first OFDM symbol 2405 (l=0 of first slot 2410) of subframe 1 and/or subframe 6 (TDD PSS example 1). In another example (TDD PSS example 2), the PSS 420 is moved to the second OFDM symbol 2415 (l=1 of first slot 2410) of subframe 1 and/or subframe 6. TDD PSS example 2 may avoid collision with tracking RS based on CRS port 0 if exists in the same subframe.

For extended CP, the Rel-10 DMRS does not collide with the PSS 420, therefore one design option is to maintain the location of PSS for extended CP. However, to maintain commonality between the extended CP and the normal CP, another design option is to move the PSS 420 location in a similar way as that for normal CP, that is, for TDD PSS example 1, the PSS 420 is moved to the first OFDM symbol 2405 (l=0 of first slot 2410) of subframe 1 and/or subframe 6 (TDD PSS example 1). For TDD PSS example 2, the PSS 420 is moved to the second OFDM symbol 2415 (l=1 of first slot) of subframe 1 and/or subframe 6.

If the PSS 420 is located in a normal subframe: the Rel-10 DMRS does not collide with the PSS 420 (as shown in FIG. 10 for the normal CP), hence one design option is to keep the Rel-10 PSS 420 location. Another design option is to move the location of PSS 420 similar to that of the special subframe, to maintain commonality of the PSS 420 location between the normal subframe and the special subframe. This applies for both normal CP and extended CP.

Figures 25A, 25B:
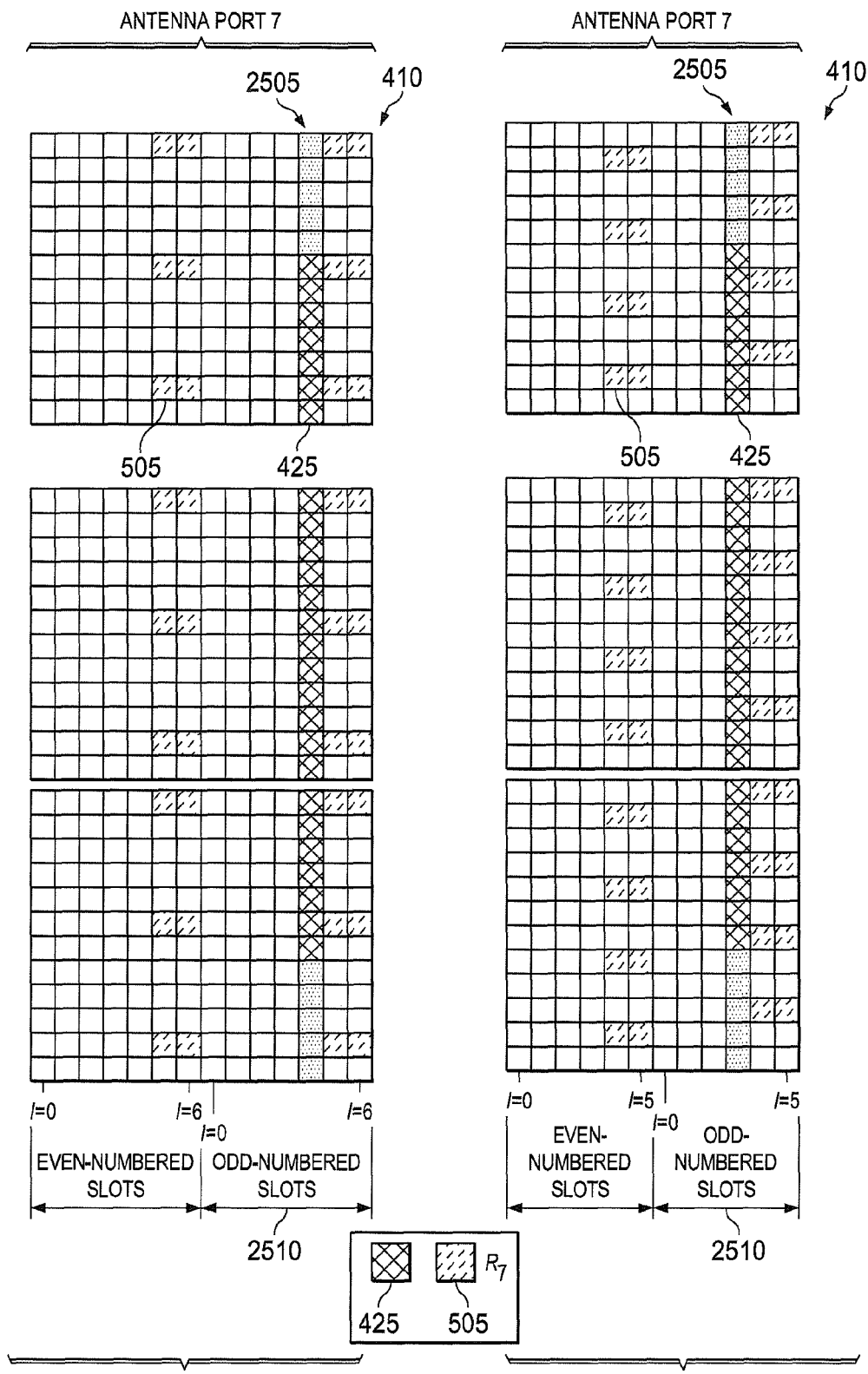

In certain embodiments, for TDD SSS example 1 as shown in FIG. 25A for normal CP and FIG. 25B for extended CP, the SSS 425 location is moved to avoid collision with the DMRS. In one example (TDD SSS example 1), the SSS 425 is moved to the third last OFDM symbol 2505 (l=$N_{symb}^{DL}$−3 of the second slot 2510) of subframe 0 and subframe 5, where $N_{symb}^{DL}$ is the number of OFDM symbols in a slot. Combining TDD SSS example 1 and TDD PSS example 1 (FIGS. 24A and 24B), this combination has the advantage of maintaining the 3 OFDM symbol spacing between the PSS 420 and the SSS 425 as in Rel-8/9/10 which may be beneficial for implementation. Potential collision with tracking signal (if exists and configured) and CSI-RS (if configured) can be avoided by careful network configuration such that these signals do not exist in the same subframe. Furthermore, the collision with CSI-RS can also be handled as the existing Rel-10 behavior, that is, UE 116 assumes that CSI-RS are not be transmitted in subframes where transmission of a CSI-RS would collide with transmission of synchronization signals.

Figure 26A:
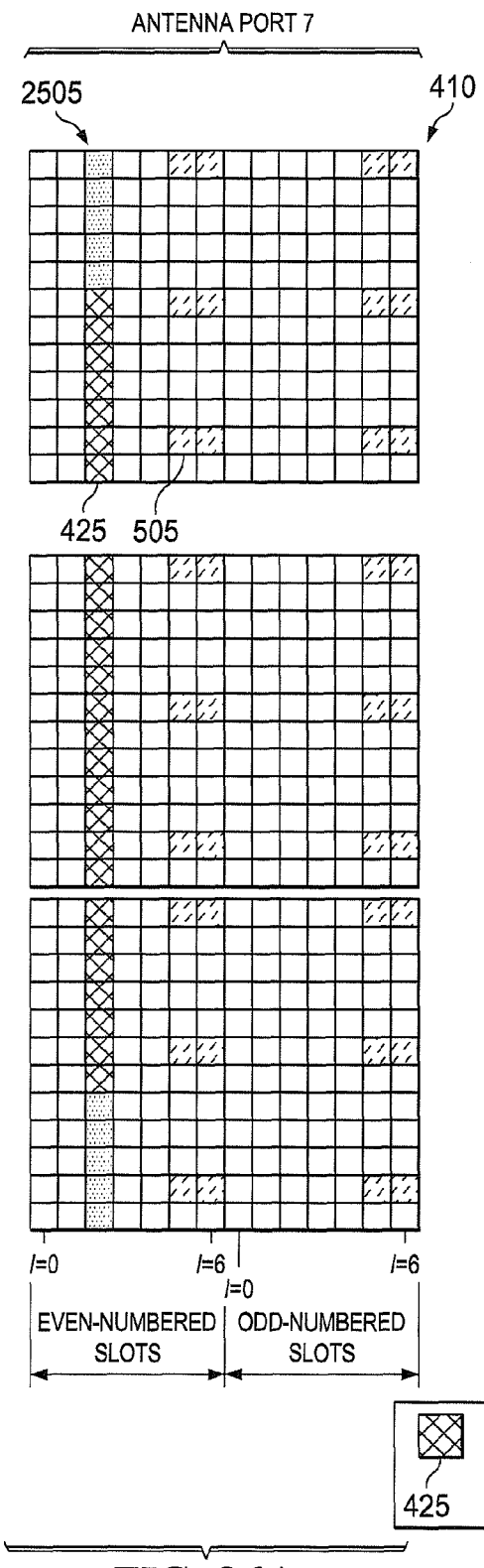
Figure 26B:
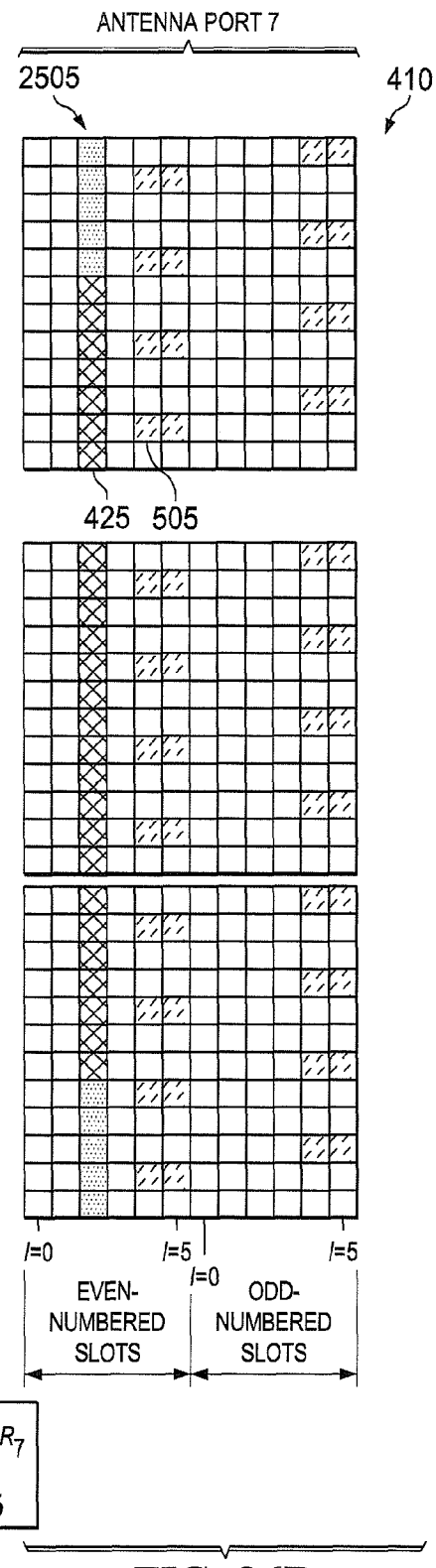

In another example, as shown in FIGS. 26A and 26B, for SSS 425 location (TDD SSS example 2), the SSS 425 is moved to the 3$^{rd}$ OFDM symbol 2605 (l=2) of subframe 0 and subframe 5 of a radio frame. TDD SSS example 2 may avoid collision with CSI-RS if exists in the same subframe. Combining TDD SSS example 2 and TDD PSS example 1 or 2 (FIGS. 24A and 24B) allows UE 116 to recognize the carrier type from the locations of PSS 420 and SSS 425. Furthermore, different spacing of PSS 420 and SSS 425 from that of the Rel-8/9/10 also prevent legacy UEs from mistaking the extension carrier as a backward compatible carrier during cell-search procedure.

In certain embodiments, the PDSCH transmitted in the same PRB(s) as the PSS/SSS are rate matched around the location of PSS/SSS. In certain embodiments, UE 116 is configured to implicitly determine the configurability of the PSS/SSS location. In certain embodiments, UE 116 explicitly determines the configurability of the PSS/SSS location.

In certain embodiments, (Option 1): Implicit configuration is performed according to carrier type. The PSS/SSS location for a component carrier is implicitly configured depending upon the carrier type. When configured with a component carrier, UE 116 assumes the following PSS/SSS location depending on the type of the component carrier:

If the carrier type is a first carrier type, UE 116 uses a first PSS/SSS location.

If the carrier type is a second carrier type, UE 116 uses a second PSS/SSS location.

For cell detection by UE 116:

If UE 116 detects a first PSS/SSS location, the carrier type is a first carrier type.

If UE 116 detects a second PSS/SSS location, the carrier type is a second carrier type.

In certain embodiments, the first and the second carrier types are Rel-8 compatible carrier type and the new carrier type. In certain embodiments, the first and the second PSS/SSS locations are the Rel-8/9/10 PSS/SSS locations and a new DM PSS/SSS location whose examples are illustrated herein above with respect to FIGS. 23A-26B, respectively. Furthermore, in certain embodiments, the carrier type of the component carrier is transmitted to UE 116 by UE-specific signaling in the RRC layer or via a broadcast signaling. When UE 116 is configured as a secondary cell, an RRC configuration configuring the secondary cell includes an information field indicating the carrier type. For example, when the information field is 1, the secondary cell is the first carrier type; when the information field is 0, the secondary cell is the second carrier type.

In certain embodiments (Option 2): Explicit configuration is performed according network signaling. A PSS/SSS location for a component carrier is explicitly configured by an RRC signaling. When configured with a component carrier, UE 116 uses the following PSS/SSS location depending on the RRC signaling:

When no RRC signaling associated with the PSS/SSS location is received, UE 116 uses a first PSS/SSS location.

When an RRC signaling associated with the PSS/SSS location is received,

UE 116 uses the first PSS/SSS location if an information field configuring the PSS/SSS location indicates to use the first PSS/SSS location.

UE 116 uses a second PSS/SSS location if the information field configuring the PSS/SSS location indicates to use the second PSS/SSS location.

In certain embodiments, the first and the second PSS/SSS location are the Rel-8/9/10 PSS/SSS location and a new PSS/SSS location whose examples are illustrated herein above with respect to FIGS. 23-26, respectively.

In certain embodiments, the tracking signal (e.g., based on CRS port 0 or CSI-RS port 15) location for time and frequency synchronization purpose is fixed and predefined, i.e. located in a predefined subframe index and/or with predefined periodicity. In one example, the location of the tracking signals is the same as that the location of the SSS 425, i.e. in subframe 0 and in subframe 5.

In certain embodiments, SSS 425 only mapping is performed. BS 102 repeatedly maps the full-length SSS sequence (i.e., length 63) on N OFDM symbols for extension carriers introduced in Rel-11, one full-length sequence per OFDM symbol, where N is e.g., 1 or 2. Frequency location of the SSS can be identical to that of the backward compatible carriers, i.e., the SSS 425 are transmitted in the center 6 PRBs.

In the event that the extension carriers do not carry PSS 420, SSS 425 only mapping ensures that legacy UEs fail in camping on the extension carriers, because the legacy UEs cannot detect PSS 420 in the extension carriers.

For example first consider N=1.

In one method, the SSS 425 is mapped onto the same time-frequency location as the legacy SSS. For example, in FDD, the SSS is mapped onto the center 6 PRBs on the second last OFDM symbol in subframes 0 and 5.

In another method, the SSS 425 is mapped on a different OFDM symbol from the OFDM symbol which the legacy specification maps the SSS 425, e.g., to avoid DMRS 505 and/or TRS(CRS) collision. Some examples for the OFDM symbol numbers to map the SSS 425 are illustrated herein above with respect to FIGS. 23-26, respectively.

We next consider N=2. Mapping SSS 425 twice in two different OFDM symbols in a same subframe, UE 116 can acquire a more accurate synchronization, which could be as good as the PSS/SSS mapping.

In one method, a first and a second SSS 425 are mapped onto the same time-frequency location as the legacy PSS and SSS. For example, in FDD, the SSS 425 is mapped onto the center 6 PRBs on the last and the second last OFDM symbols in subframes 0 and 5.

In another method, the SSS 425 is mapped on different OFDM symbols from the OFDM symbols which the legacy specification maps the PSS/SSS, e.g., to avoid DMRS and/or TRS(CRS) collision. For example, the SSS 425 can be mapped onto the two OFDM symbols where PSS 425 and SSS 425 are mapped as described herein above with respect to FIGS. 23-26, respectively.

Figure 27A:
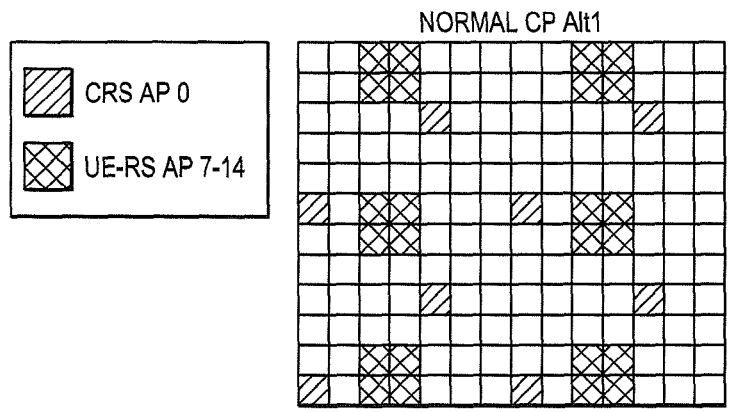
FIGS. 27A, 27B, 27C and 28 illustrate alternative new UE-RS patterns for NCT serving cells according to embodiments of the present disclosure.
Figure 27B:
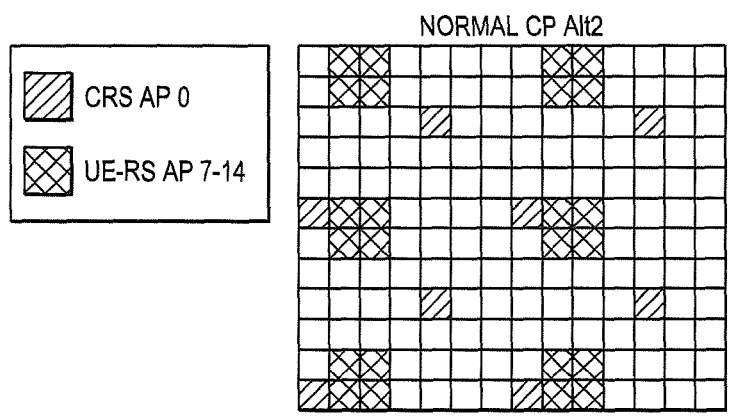
Figure 27C:
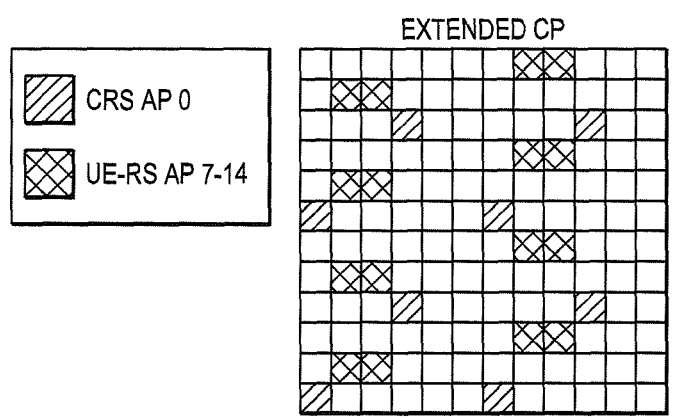

FIGS. 27A through 27C illustrate alternative new UE-RS patterns for NCT serving cells according to embodiments of the present disclosure. The embodiments of the new UR-RS patterns for NCT serving cells is for illustration only. Other embodiments could be used without departing from the scope of this disclosure.

One major concern of introducing a new UE-RS pattern for NCT is that UE 116 is required to implement different channel estimators for the NCT from the backward compatible carrier.

An alternative way to mitigate this concern is to design the new UE-RS pattern as a time-shifted version of the legacy UE-RS pattern (UE-RS design 1). In that case, UE 116 can efficiently implement the channel estimators for the new UE-RS pattern by modifying the legacy channel estimator a little bit. In FIGS. 27A through 27C, the alternative mapping UE-RS patterns in the NCT serving cells are designed according to the time-shifting method, where the time shift is chosen to guarantee no collision of UE-RS and PSS/SSS/CRS AP 0 (or TRS).

However, the new UE-RS pattern creates an issue that the some legacy CSI-RS (shown in FIGS. 4A-1 and 4A-2) collide with the new UE-RS. To resolve the new UE-RS and CSI-RS collision, certain embodiments include a design for a new CSI-RS mapping pattern that is used for NCT where the new UE-RS pattern is used.

An alternative way of designing the new UE-RS patterns for the NCT is to aim for the performance optimization by placing UE-RS REs close to the four corners of each PRB pair (UE-RS design 2: Aiming for performance optimization, assuming a fixed location of CRS port 0 (or TRS)).

Figure 28:
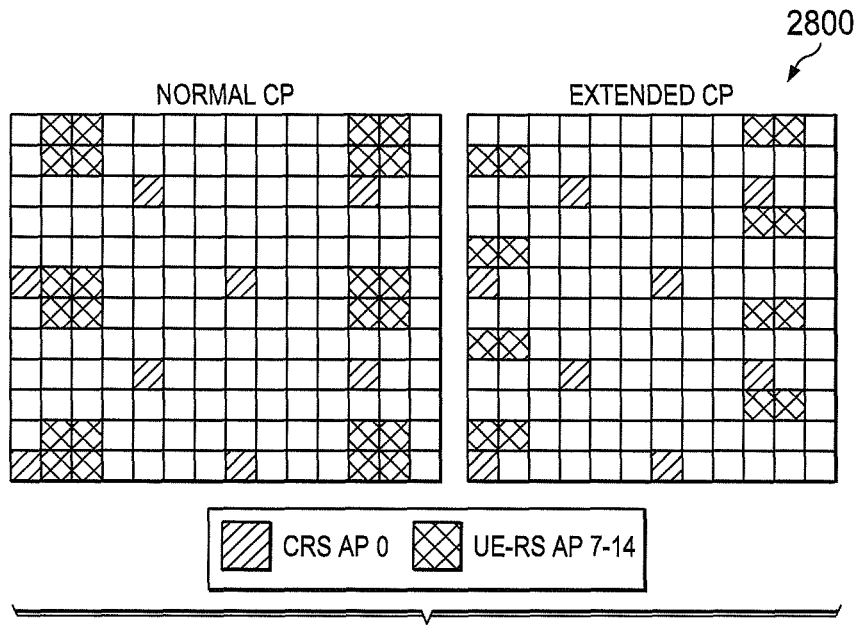
Figure 29A:
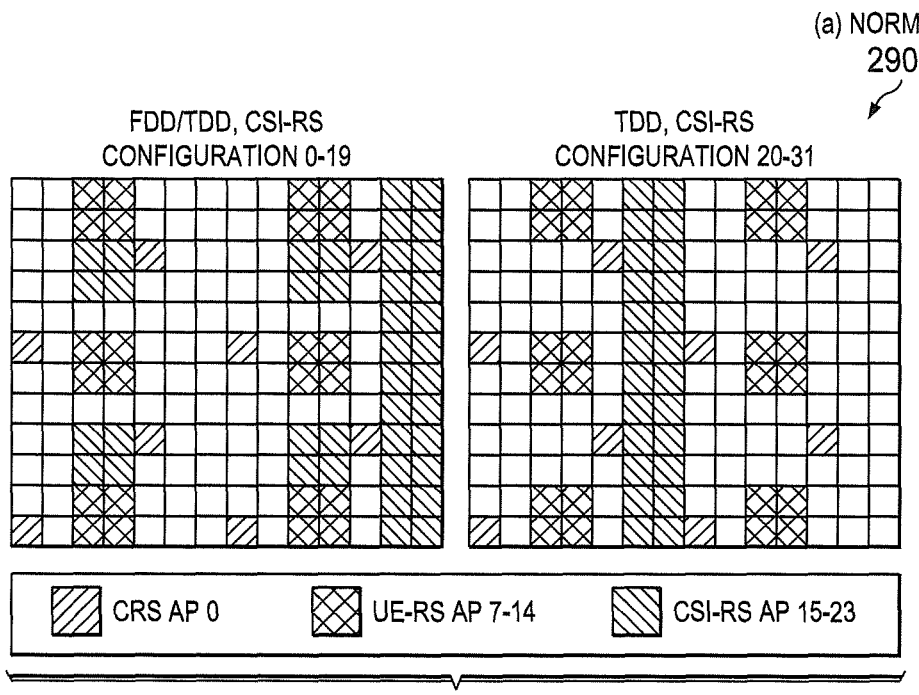
FIGS. 29A, 29B, 30A and 30B illustrate alternative CSI-RS mapping for NCT according to embodiments of the present disclosure.
Figure 29B:
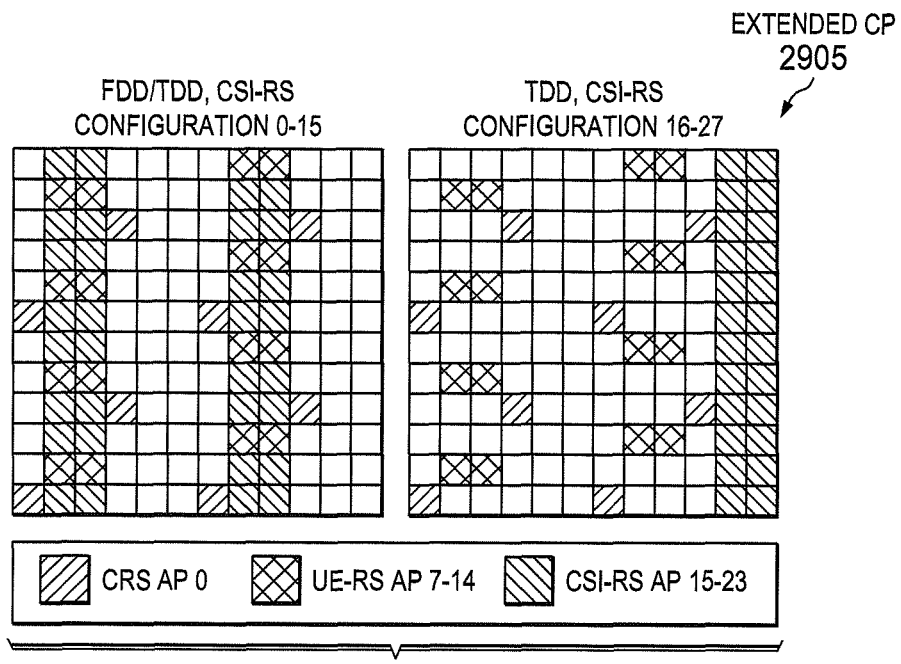
Figure 30A:
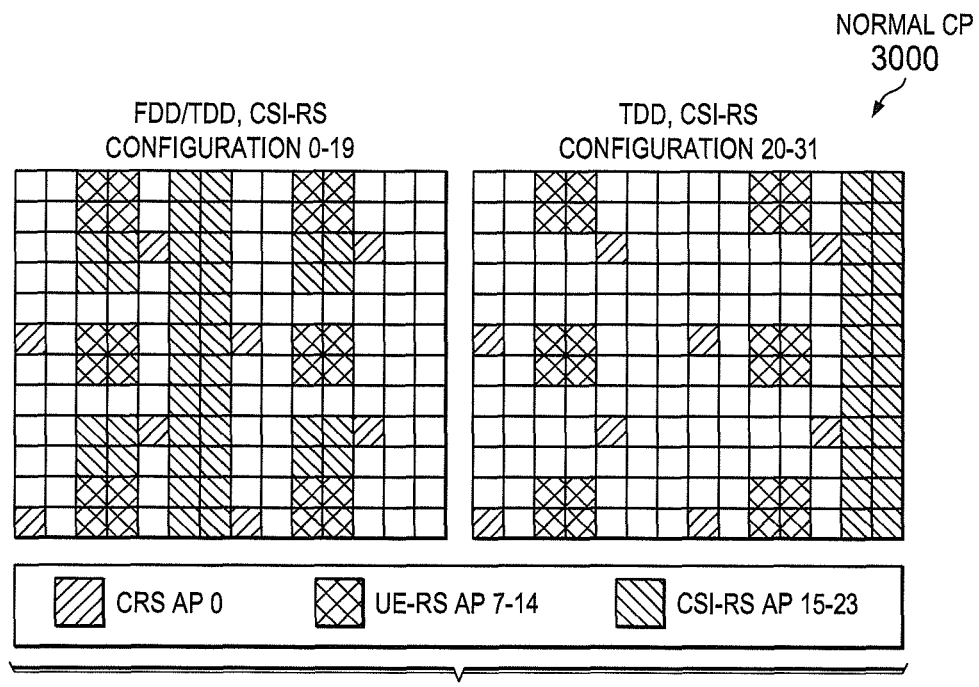
Figure 30B:
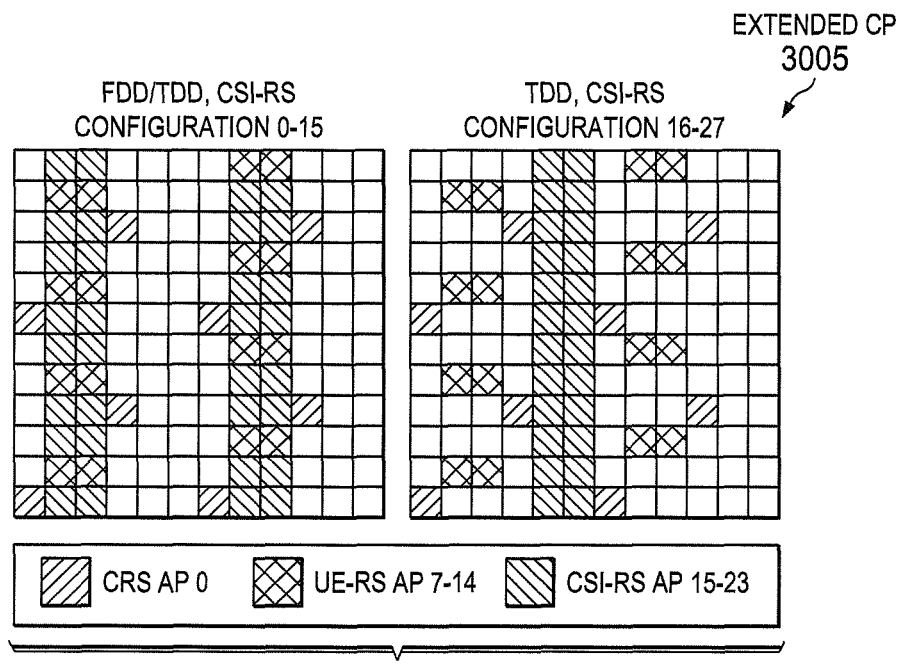

In other UE-RS designs, the OFDM symbols with CRS (or TRS) were not used for UE-RS mapping because the CRS (or TRS) can collide with UE-RS with cell-specific frequency-domain CRS (or TRS) shifts. In case the cell-specific CRS (or TRS) shift is not disabled in the NCT serving cell, the OFDM symbols with CRS (or TRS) can be used for UE-RS mapping, whereby the four corners can be covered better. FIG. 28 illustrates this alternative for UE-RS mapping patterns 2800.

When this UE-RS mapping 2800 design is used, the legacy position of CSI-RS does not collide with the new UE-RS, and the legacy CSI-RS mapping can be kept.

CSI-RS Design for UE-RS Design 1:

In certain embodiments, a UE is configured to receive PDSCHs in an NCT serving cell, where the UE-RS are mapped according to UE-RS design 1 (e.g., FIGS. 27A through 27C).

When a CSI-RS configuration number is configured for the NCT serving cell, UE 116 receives CSI-RS in different time locations than the legacy CSI-RS RE locations. Furthermore, to increase the reuse of CSI-RS for TDD, in certain embodiments, the CSI-RS configuration numbers 20-31 for normal CP subframes are used for indicating orthogonal CSI-RS locations to the CSI-RS locations indicated by CSI-RS configuration numbers 0-19.

FIGS. 29A, 29B, 30A and 30B illustrate alternative CSI-RS mapping for NCT according to embodiments of the present disclosure. The embodiments of the CSI-RS mapping shown in FIGS. 29A, 29B, 30A and 30B are for illustration only. Other embodiments could be used without departing from the scope of this disclosure.

One alternative is the alternative CSI-RS mapping pattern for normal CP 2900 and alternative CSI-RS mapping pattern for extended CP 2905. The corresponding CSI-RS mapping tables are designed in TABLE 4 and TABLE 5. In this case, l=l'+l", for any CSI-RS configurations:

For each entry with l'=2 in TABLE 1, l' is replaced with l'=5 in TABLE 4.

For each entry with l'=5 in TABLE 1, l' is replaced with l'=2 in TABLE 4.

For each entry with l'=1 in TABLE 2, l' is replaced with l'=4 in TABLE 5.

For each entry with l'=4 in TABLE 2, l' is replaced with l'=1 in TABLE 5.

Another alternative is the alternative CSI-RS mapping pattern for normal CP 3000 and the alternative CSI-RS mapping pattern for extended CP 3005. In this case, l=l'+l", for any CSI-RS configurations:

For each entry with l'=2 and $n_s$ mod 2=0 in TABLE 1, l' and $n_s$ mod 2 are replaced with l'=5 $n_s$ mod 2=0 in new table 1A.

For each entry with l'=5 in TABLE 1, l' is replaced with in the new table 1A.

For each entry with l'=1 in TABLE 2, l' is replaced with l'=5 in new table 2A.

For each entry with l'=4 and $n_s$ mod 2=1 in TABLE 2, l' and $n_s$ mod 2 are replaced with l'=4 and $n_s$ mod 2=0 in the new table 2A.

TABLE 1A

Mapping from CSI reference signal configuration to (k', l') for normal cyclic prefix

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 2) | 0 | (9, 2) | 0 | (9, 2) | 0 |
| | 1 | (11, 5) | 1 | (11, 5) | 1 | (11, 5) | 1 |

TABLE 1A-continued

Mapping from CSI reference signal configuration to (k', l') for normal cyclic prefix

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
|  | 2 | (9, 5) | 1 | (9, 5) | 1 | (9, 5) | 1 |
|  | 3 | (7, 5) | 1 | (7, 5) | 1 | (7, 5) | 1 |
|  | 4 | (9, 2) | 1 | (9, 2) | 1 | (9, 2) | 1 |
|  | 5 | (8, 2) | 0 | (8, 2) | 0 |  |  |
|  | 6 | (10, 5) | 1 | (10, 5) | 1 |  |  |
|  | 7 | (8, 5) | 1 | (8, 5) | 1 |  |  |
|  | 8 | (6, 5) | 1 | (6, 5) | 1 |  |  |
|  | 9 | (8, 2) | 1 | (8, 2) | 1 |  |  |
|  | 10 | (3, 2) | 0 |  |  |  |  |
|  | 11 | (2, 2) | 0 |  |  |  |  |
|  | 12 | (5, 5) | 1 |  |  |  |  |
|  | 13 | (4, 5) | 1 |  |  |  |  |
|  | 14 | (3, 5) | 1 |  |  |  |  |
|  | 15 | (2, 5) | 1 |  |  |  |  |
|  | 16 | (1, 5) | 1 |  |  |  |  |
|  | 17 | (0, 5) | 1 |  |  |  |  |
|  | 18 | (3, 2) | 1 |  |  |  |  |
|  | 19 | (2, 2) | 1 |  |  |  |  |
| Frame structure type 2 only | 20 | (11, 5) | 0 | (11, 5) | 0 | (11, 5) | 0 |
|  | 21 | (9, 5) | 0 | (9, 5) | 0 | (9, 5) | 0 |
|  | 22 | (7, 5) | 0 | (7, 5) | 0 | (7, 5) | 0 |
|  | 23 | (10, 5) | 0 | (10, 5) | 0 |  |  |
|  | 24 | (8, 5) | 0 | (8, 5) | 0 |  |  |
|  | 25 | (6, 5) | 0 | (6, 5) | 0 |  |  |
|  | 26 | (5, 5) | 0 |  |  |  |  |
|  | 27 | (4, 5) | 0 |  |  |  |  |
|  | 28 | (3, 5) | 0 |  |  |  |  |
|  | 29 | (2, 5) | 0 |  |  |  |  |
|  | 30 | (1, 5) | 0 |  |  |  |  |
|  | 31 | (0, 5) | 0 |  |  |  |  |

TABLE 2A

Mapping from CSI reference signal configuration to (k', l') for extended cyclic prefix

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 1) | 0 | (11, 1) | 0 | (11, 1) | 0 |
|  | 1 | (9, 1) | 0 | (9, 1) | 0 | (9, 1) | 0 |
|  | 2 | (10, 1) | 1 | (10, 1) | 1 | (10, 1) | 1 |
|  | 3 | (9, 1) | 1 | (9, 1) | 1 | (9, 1) | 1 |
|  | 4 | (5, 1) | 0 | (5, 1) | 0 |  |  |
|  | 5 | (3, 1) | 0 | (3, 1) | 0 |  |  |
|  | 6 | (4, 1) | 1 | (4, 1) | 1 |  |  |
|  | 7 | (3, 1) | 1 | (3, 1) | 1 |  |  |
|  | 8 | (8, 1) | 0 |  |  |  |  |
|  | 9 | (6, 1) | 0 |  |  |  |  |
|  | 10 | (2, 1) | 0 |  |  |  |  |
|  | 11 | (0, 1) | 0 |  |  |  |  |
|  | 12 | (7, 1) | 1 |  |  |  |  |
|  | 13 | (6, 1) | 1 |  |  |  |  |
|  | 14 | (1, 1) | 1 |  |  |  |  |
|  | 15 | (0, 1) | 1 |  |  |  |  |
| Frame structure type 2 only | 16 | (11, 4) | 1 | (11, 4) | 1 | (11, 4) | 1 |
|  | 17 | (10, 4) | 1 | (10, 4) | 1 | (10, 4) | 1 |
|  | 18 | (9, 4) | 1 | (9, 4) | 1 | (9, 4) | 1 |
|  | 19 | (5, 4) | 1 | (5, 4) | 1 |  |  |
|  | 20 | (4, 4) | 1 | (4, 4) | 1 |  |  |
|  | 21 | (3, 4) | 1 | (3, 4) | 1 |  |  |
|  | 22 | (8, 4) | 1 |  |  |  |  |
|  | 23 | (7, 4) | 1 |  |  |  |  |
|  | 24 | (6, 4) | 1 |  |  |  |  |
|  | 25 | (2, 4) | 1 |  |  |  |  |

TABLE 2A-continued

Mapping from CSI reference signal configuration to (k', l') for extended cyclic prefix

| CSI reference signal configuration | Number of CSI reference signals configured | | | | | |
|---|---|---|---|---|---|---|
| | 1 or 2 | | 4 | | 8 | |
| | (k', l') | $n_s \bmod 2$ | (k', l') | $n_s \bmod 2$ | (k', l') | $n_s \bmod 2$ |
| 26 | (1, 4) | 1 | | | | |
| 27 | (0, 4) | 1 | | | | |

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. For use in a wireless communications network, a base station configured to communicate with a plurality of subscriber stations, the base station comprising:
   a transmit path configured to transmit data, reference signals, synchronization signals and control elements to at least one of the plurality of user equipments (UEs); and
   processing circuitry configured to configure demodulation reference signal (DMRS) parameters for each of a plurality of physical resource blocks (PRBs) to avoid a collision between the DMRS and at least one of the synchronization signals in a middle 6 resource blocks (RBs) of a system bandwidth.

2. The base station as set forth in claim 1, wherein the processing circuitry is configured to puncture a portion of the DMRS that collides with the synchronization signals.

3. The base station as set forth in claim 1, wherein the transmit path is configured to transmit using a Frequency Division Duplexing (FDD) and wherein the processing circuitry is configured to reuse a Time Division Duplexing (TDD) DMRS to avoid a collision with the synchronization signals.

4. The base station as set forth in claim 1, wherein the processing circuitry is configured to at least one of:
   shift the DMRS to avoid a collision with the synchronization signals; and
   use a new DMRS to avoid the collision with the synchronization signals.

5. The base station as set forth in claim 1, wherein the processing circuitry is signal the DMRS parameters using at least one of: a radio resource control (RRC) message and a broadcast message.

6. The base station as set forth in claim 1, wherein the processing circuitry is configured to adjust a location of at least one of the synchronization signals.

7. For use in a wireless communications network, a method for configuring downlink modulation reference signals (DMRS), the method comprising:
   transmitting data, reference signals, synchronization signals and control elements to at least one of the plurality of subscriber stations; and
   configuring DMRS parameters to avoid a collision between the DMRS and at least one of the synchronization signals in a middle 6 resource blocks (RBs) of a system bandwidth.

8. The method as set forth in claim 7, wherein configuring comprises puncturing a portion of the DMRS that collides with the synchronization signals.

9. The method as set forth in claim 7, wherein the transmit path is configured to transmit using a Frequency Division Duplexing (FDD) and wherein reusing a Time Division Duplexing (TDD) DMRS to avoid a collision with the synchronization signals.

10. The method as set forth in claim 7, wherein configuring comprises at least one of:
    shifting the DMRS to avoid a collision with the synchronization signals; and
    configuring a new DMRS to avoid the collision with the synchronization signals.

11. The method as set forth in claim 7, wherein configuring comprises signaling a DMRS configuration using at least one of: a radio resource control (RRC) message and a broadcast message.

12. The method as set forth in claim 7, wherein configuring comprises adjusting a location of at least one of the synchronization signals.

13. For use in a wireless communications network, a subscriber station configured to communicate with at least one base station, the subscriber station comprising:
    a receiver configured to receive data, reference signals, synchronization signals and control elements from the base station; and
    processing circuitry configured to read physical resource blocks (PRBs) containing demodulation reference signals (DMRS) parameters that have been configured to avoid a collision between the DMRS and at least one of the synchronization signals in the middle 6 resource blocks (RBs) of a system bandwidth.

14. The subscriber station as set forth in claim 13, wherein a portion of the DMRS that collides with the synchronization signals is punctured and wherein the processing circuitry is configured to not expect the DMRS that collides with the synchronization signals.

15. The subscriber station as set forth in claim 13, wherein the receive path is configured to receive using a Frequency Division Duplexing (FDD) and wherein a Time Division Duplexing (TDD) DMRS is reused to avoid a collision with the synchronization signals.

16. The subscriber station as set forth in claim 13, wherein the DMRS is shifted to avoid a collision with the synchronization signals or a new DMRS is configured to avoid the collision with the synchronization signals.

17. The subscriber station as set forth in claim 13, wherein the processing circuitry is configured to implicitly determine the DMRS configuration.

18. The subscriber station as set forth in claim 13, wherein when no radio resource control (RRC) signaling associated with the DMRS parameters in the middle 6RBs is received, the processing circuitry is configured to use a first DMRS parameters.

19. The subscriber station as set forth in claim 13, wherein the processing circuitry is configured to read a radio resource control (RRC) signaling associated with the DMRS parameters in the middle 6RBs is received to determine DMRS parameters.

20. The subscriber station as set forth in claim 13, a location of at least one of the synchronization signals is adjusted.

* * * * *